(12) United States Patent
Soucie et al.

(10) Patent No.: US 10,961,778 B2
(45) Date of Patent: Mar. 30, 2021

(54) BOAT OR RECREATIONAL VEHICLE LADDER APPARATUS

(71) Applicant: BoBo Ladders LLC, Moberly, MO (US)

(72) Inventors: Wayne Lawrence Soucie, Columbia, MO (US); Michael Herbert Schmidt, Moberly, MO (US); Jeffrey Earl Tayon, Moberly, MO (US); Larry Brian Champ, Cairo, MO (US)

(73) Assignee: Bobo Ladders LLC, Moberly, MO (US)

( * ) Notice: Subject to any disclaimer, the term of this patent is extended or adjusted under 35 U.S.C. 154(b) by 58 days.

(21) Appl. No.: 16/286,706

(22) Filed: Feb. 27, 2019

(65) Prior Publication Data

US 2019/0186201 A1    Jun. 20, 2019

Related U.S. Application Data

(62) Division of application No. 15/672,521, filed on Aug. 9, 2017, now Pat. No. 10,858,887.

(Continued)

(51) Int. Cl.
*E06C 1/36* (2006.01)
*B60R 3/02* (2006.01)
(Continued)

(52) U.S. Cl.
CPC .................. *E06C 1/36* (2013.01); *B60R 3/02* (2013.01); *E06C 5/02* (2013.01); *E06C 5/04* (2013.01);
(Continued)

(58) Field of Classification Search
CPC ....................................................... E06C 7/183
See application file for complete search history.

(56) References Cited

U.S. PATENT DOCUMENTS

| 1,525,515 A | 2/1925 | William |
| 2,876,047 A | 3/1959 | La Plante |

(Continued)

FOREIGN PATENT DOCUMENTS

| CA | 2741236 A1 | 11/2012 | |
| DE | 202017000453 U1 * | 2/2017 | ............. E06C 1/387 |

(Continued)

OTHER PUBLICATIONS

"Overton's Removable Telescoping Pontoon Boat Ladder, 4-Step," www.overtons.com, Jul. 20, 2016, 1 page.

(Continued)

*Primary Examiner* — Alvin C Chin-Shue
(74) *Attorney, Agent, or Firm* — Harness, Dickey & Pierce, PLC

(57) ABSTRACT

A boat or recreational vehicle ladder apparatus is provided. One aspect of the present ladder apparatus includes an elongated extension handle including a slot adjacent a lower end thereof. Another aspect of a boat or recreational vehicle ladder apparatus provides a snap-on step tread which can be mounted to a dual-tubular ladder step structure. Another aspect of a boat or recreational vehicle ladder apparatus employs a laterally expandable ladder step which can be retrofit onto an existing ladder. A further aspect employs clasps or hooks to attach and retain a ladder step to generally vertical ladder rails in a tool-free and fastener-free manner.

11 Claims, 52 Drawing Sheets

Related U.S. Application Data

(60) Provisional application No. 62/447,021, filed on Jan. 17, 2017, provisional application No. 62/373,514, filed on Aug. 11, 2016.

(51) Int. Cl.

| | | |
|---|---|---|
| *E06C 5/04* | (2006.01) | |
| *E06C 7/08* | (2006.01) | |
| *E06C 7/18* | (2006.01) | |
| *E06C 5/02* | (2006.01) | |
| *B60R 3/00* | (2006.01) | |
| *E06C 9/02* | (2006.01) | |

(52) U.S. Cl.
CPC ............... *E06C 7/08* (2013.01); *E06C 7/081* (2013.01); *E06C 7/083* (2013.01); *E06C 7/182* (2013.01); *B60R 3/005* (2013.01); *E06C 9/02* (2013.01)

(56) References Cited

U.S. PATENT DOCUMENTS

| | | | |
|---|---|---|---|
| 3,089,269 | A | 5/1963 | McKiernan |
| 3,339,913 | A | 9/1967 | Anderson |
| 3,399,783 | A | 9/1968 | Injeski |
| 3,804,200 | A | 4/1974 | Sandberg |
| 3,891,053 | A | 6/1975 | Burton |
| 4,002,223 | A | 1/1977 | Bernkrant |
| 4,023,332 | A | 5/1977 | Achenbach et al. |
| 4,241,807 | A | 12/1980 | McKenna et al. |
| 4,338,827 | A * | 7/1982 | Hooker ............... G05G 1/085 74/545 |
| 4,519,153 | A | 5/1985 | Moon et al. |
| 4,637,492 | A | 1/1987 | Herr |
| 4,653,416 | A | 3/1987 | Debarge |
| D298,739 | S * | 11/1988 | Richards, Jr. ............... D22/110 |
| 5,024,292 | A | 6/1991 | Gilbreath et al. |
| 5,076,526 | A * | 12/1991 | Zane ............... B62H 5/00 248/314 |
| D331,219 | S * | 11/1992 | Barbour ............... D12/317 |
| 5,405,113 | A * | 4/1995 | Jaw ............... B62J 11/00 224/425 |
| 5,515,806 | A | 5/1996 | McCabe |
| 5,645,140 | A | 7/1997 | Mouneimneh |
| 5,664,904 | A * | 9/1997 | Hapgood ............... F16B 7/0433 248/230.4 |
| 5,829,380 | A | 11/1998 | Smith |
| 5,927,141 | A | 7/1999 | Walsten |
| 5,986,194 | A | 11/1999 | Schwartz et al. |
| 6,131,699 | A | 10/2000 | Leak, Jr. |
| 6,619,428 | B2 | 9/2003 | Ellis |
| 6,789,648 | B2 | 9/2004 | Cook |
| 6,904,863 | B2 | 6/2005 | Mardikian et al. |
| 7,066,299 | B1 | 6/2006 | Fleming |
| 7,182,175 | B1 | 2/2007 | Schmitt et al. |
| 7,322,442 | B2 | 1/2008 | Clark et al. |
| 7,401,198 | B2 | 7/2008 | Johnston et al. |
| 7,410,031 | B2 | 8/2008 | Jensen |
| 7,992,681 | B2 | 8/2011 | Anderson et al. |
| 8,141,839 | B2 | 3/2012 | Buchner |
| 8,430,052 | B2 | 4/2013 | Nihra et al. |
| 8,636,110 | B2 * | 1/2014 | Ebbenga ............... B60D 1/58 182/106 |
| 8,640,826 | B1 | 2/2014 | Beilstein |
| 8,657,070 | B2 | 2/2014 | O'Brien et al. |
| 9,067,647 | B2 | 6/2015 | Neese |
| 9,500,029 | B1 | 11/2016 | Mullins et al. |
| 9,932,771 | B1 * | 4/2018 | Bramwell ............... E06C 7/182 |
| 2005/0236227 | A1 * | 10/2005 | Clark ............... E06C 7/182 182/106 |
| 2006/0162636 | A1 * | 7/2006 | Lawrence ............... E02B 3/24 114/230.13 |
| 2006/0272895 | A1 | 12/2006 | Lavoie |
| 2007/0110589 | A1 | 5/2007 | Marafino |
| 2008/0190692 | A1 | 8/2008 | Feik |
| 2008/0202850 | A1 * | 8/2008 | Anderson ............... E06C 7/182 182/106 |
| 2010/0096215 | A1 | 4/2010 | McFarlane |
| 2010/0307870 | A1 | 12/2010 | Zimmerman |
| 2012/0247871 | A1 | 10/2012 | Mickens |
| 2012/0279557 | A1 | 11/2012 | Alwitt et al. |

FOREIGN PATENT DOCUMENTS

| | | | | |
|---|---|---|---|---|
| FR | 2503239 | A1 * | 10/1982 | ............... E06C 9/02 |
| FR | 3007449 | A1 | 12/2014 | |

OTHER PUBLICATIONS

"EEz-In Outboard Transom Platform with Two-Step Telescoping Ladder," www.overtons.com, Jul. 20, 2016, 1 page.
"Telescoping Drop Ladder, 2-Step," www.overtons.com, Jul. 20, 2016, 1 page.
"Dockmate Telescoping Drop Ladder With Plastic Steps, 3-Step," www.overtons.com, Jul. 20, 2016, 2 pages.
"Over Platform Telescoping Boat Ladder (316-Stainless Steel)—J," www.everythingpontoon.com, Jul. 20, 2016, 1 page.
"Dockmate Telescoping Under-Platform Ladder, (3-Step)," www.overtons.com, Jul. 20, 2016, 2 pages.
"Marine Dock Folding Ladder—J," www.everythingpontoon.com, Jul. 20, 2016, 1 page.
"Step Tread for Stainless Steel Ladders," windline.com, Aug. 2, 2016, 5 pages.
"Interfab Zoomerang Slide Ladder Tread," www.interfab.com, published Jul. 20, 2016, 2 pages.
"Replacement Rubber Tread for Ladder Rung on Stromberg Carlson RV Ladder—Qty 1 Stromberg Carlson Accessories and Parts 8510-CP," www.etrailer.com, Jul. 18, 2016, 6 pages.
"Boarding Ladder Collection," www.garelick.com, published Jul. 20, 2016, 14 pages.
"Portable Boat Boarding Ladders—3 & 4 Step Boat Boarding Ladders," www.discountramps.com, Aug. 10, 2016, 2 pages.
"West Marine Portable Gunwale-Mount Boarding Ladders," www.westmarine.com, Jul. 18, 2016, 1 page.
"Spray Rails, Toe Rails and Ladder Treads," www.barbourcorp.com <http://www.barbourcorp.com>, Aug. 2, 2016, 8 pages.
"Multi Step Bushing Driver Extension Handle," www.toolsource.com, Jul. 18, 2016, 9 pages.
"56 in. ProAluminum Handle with 1-1/2-Degree Taper," www.homedepot.com, published Jul. 20, 2016, 2 pages.
"Doggy Boat Ladders by Waterdog Adventure Gear," www.getwag.com, 3 pages.
"Verical Hold Down Clamps," www.destaco.com, published on Jul. 21, 2016, 1 page.
"Extend Your Step," www.clmarine.com, Sep. 1, 2017, 2 pages.
"Guardian 10800 Safe T Ladder Extension System," www.industrialsafetyproducts.com, Sep. 1, 2017, 2 pages.
"Garelick Ladder Standoff," www.wholesalemarine.com, 4 pages.
"EEz-In Boarding Ladder," Garelick Manufacturing Company, 2 pages.
"Plastimo Ladder Stand Off," www.aproposmarine.com, 2 pages.
"Boat Boarding Ladder Treads," www.aproposmarine.com, Aug. 2, 2016, 6 pages.
"Photo of boat ladder tread," offered for sale prior to Aug. 11, 2016, 1 page.
"Photo of Boat Ladder Tread," offiered for sale prior to Aug. 11, 2012, 2 pages.
"Stainless Steel Ultra T-Bolt Clamp," www.globalindustrial.com, offered for sale prior to Aug. 11, 2016, 1 page.
Paws Aboard Doggy Boat Ladder, Paws Aboard Inc., 6 pages.
U.S. Appl. No. 16/672,521, filed Aug. 9, 2017, Orscheln, Robert Tayan, Jeffrey Soucie, Wayne Champ, Larry Schmidt, Michael Ashton, Michael Lee.
U.S. Appl. No. 16/286,813, filed Feb. 27, 2019, Champ, Larry Soucie, Wayne Tayon, Jeff Schmidt, Mike.

* cited by examiner

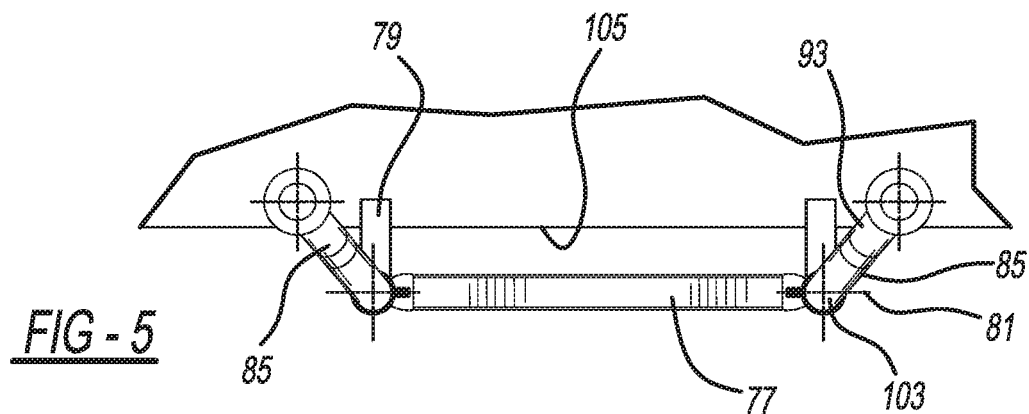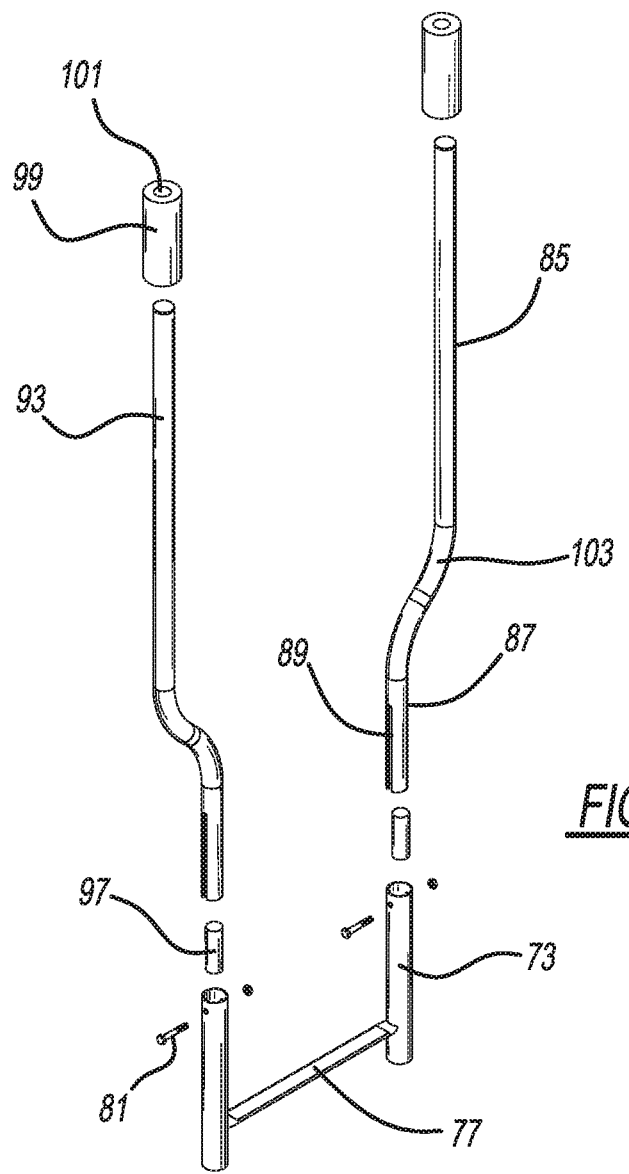

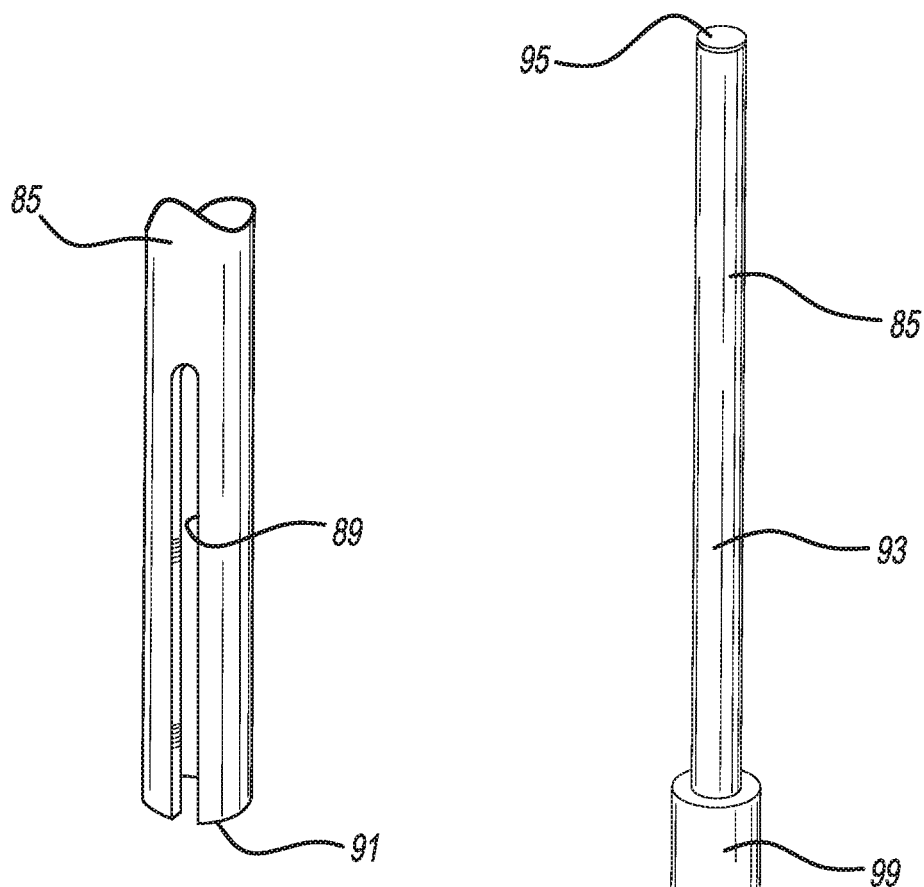
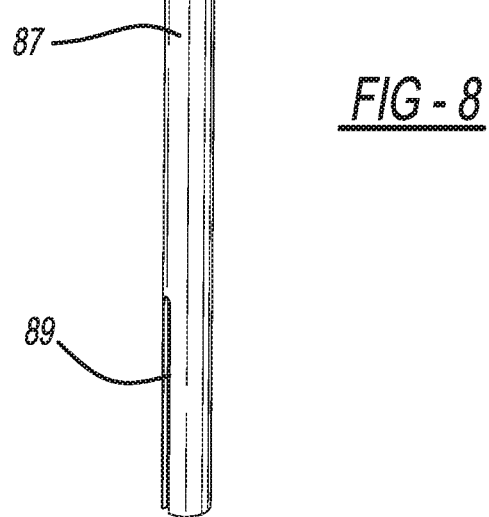

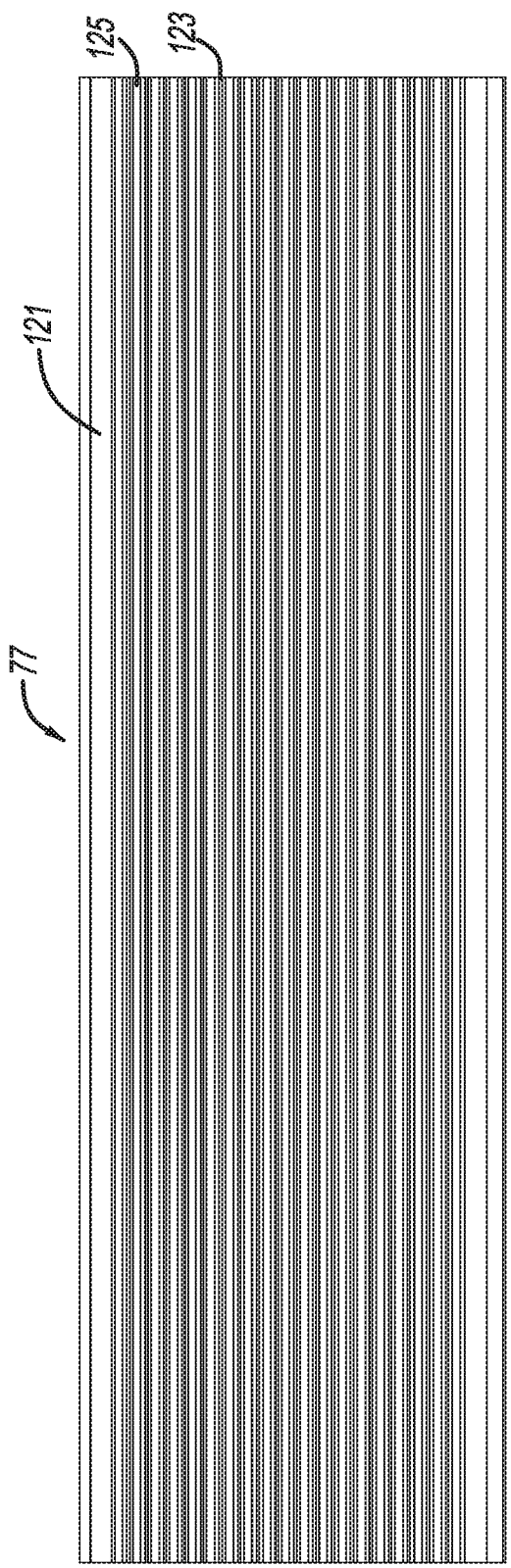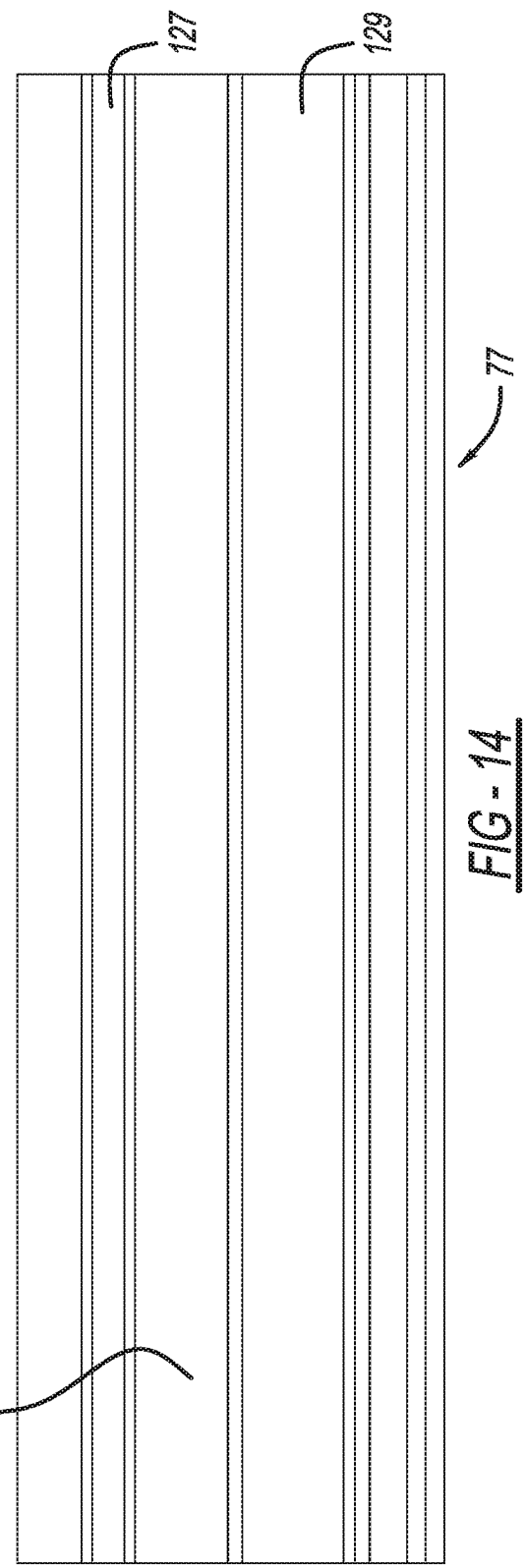

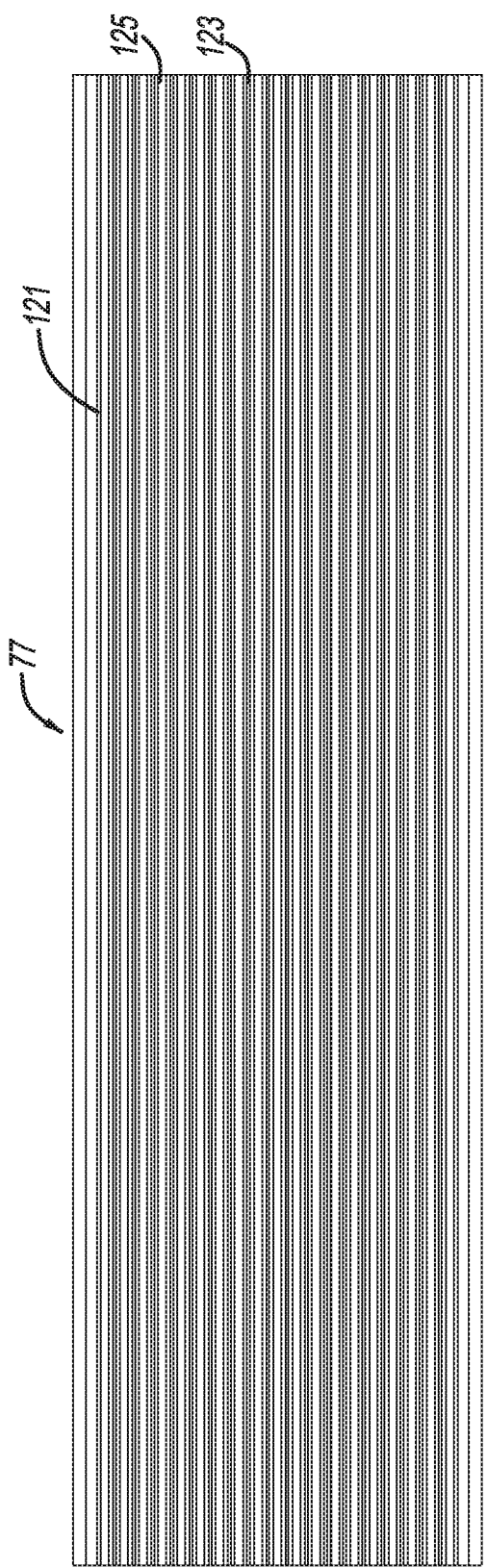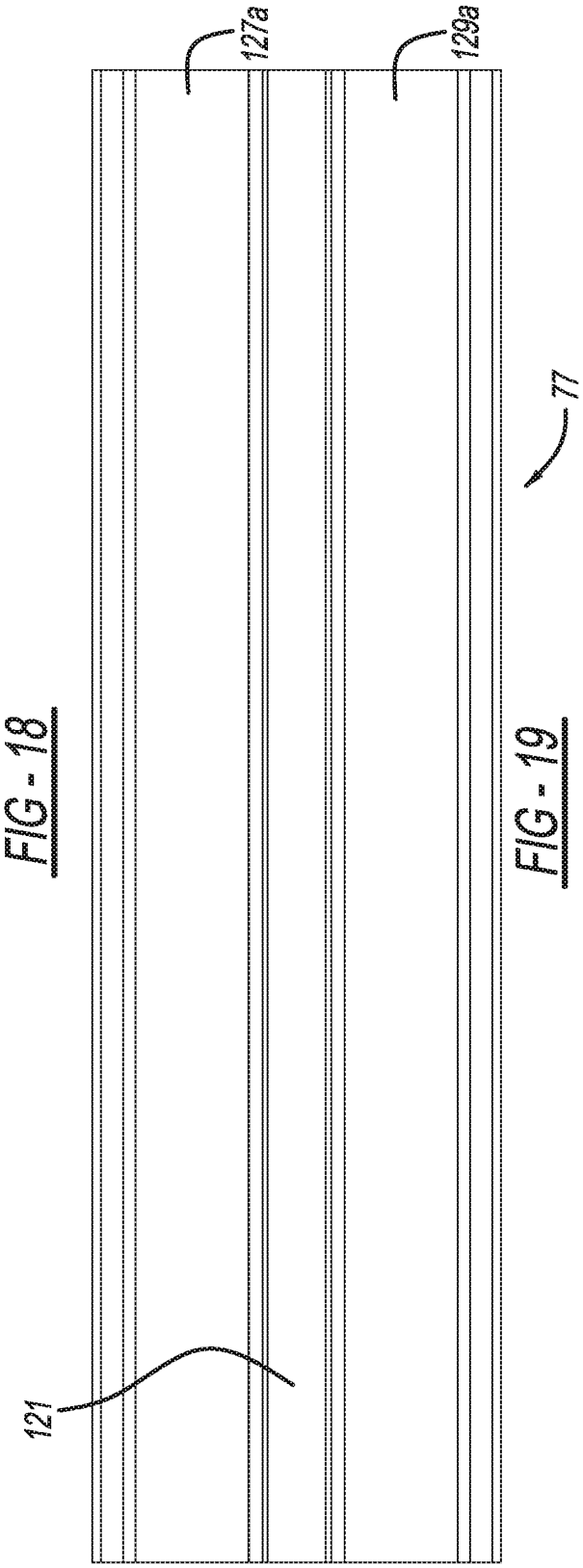

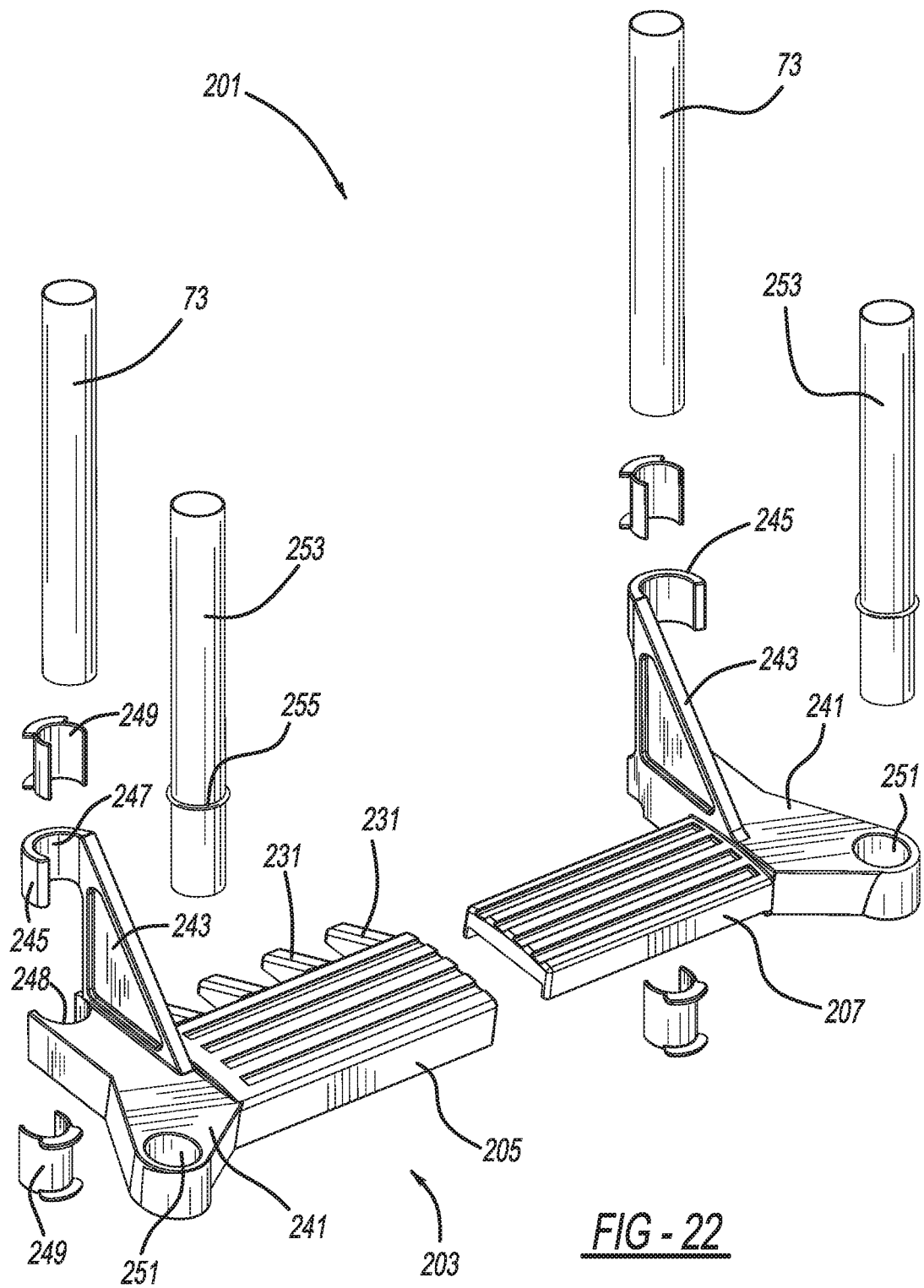

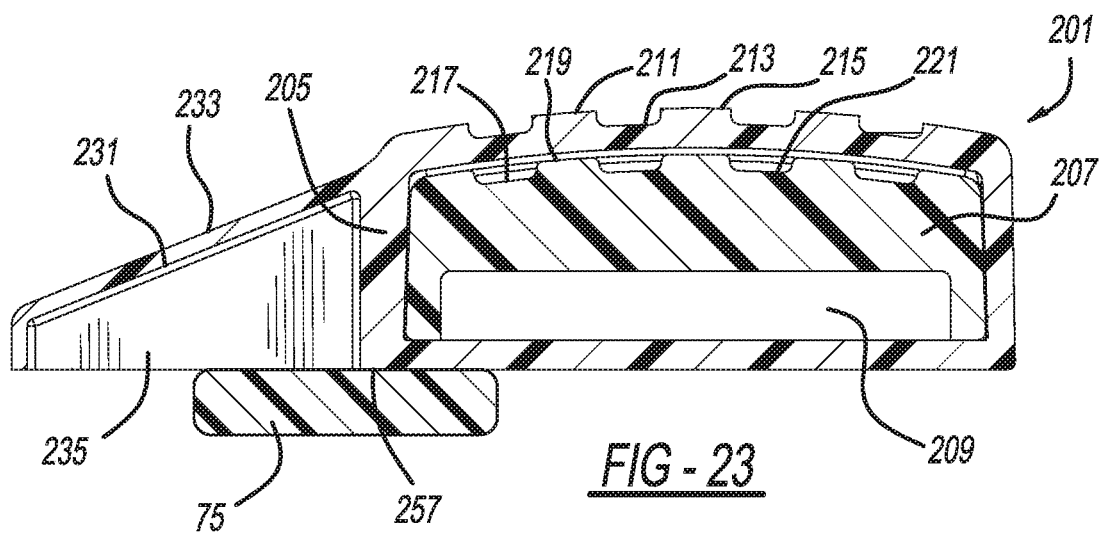
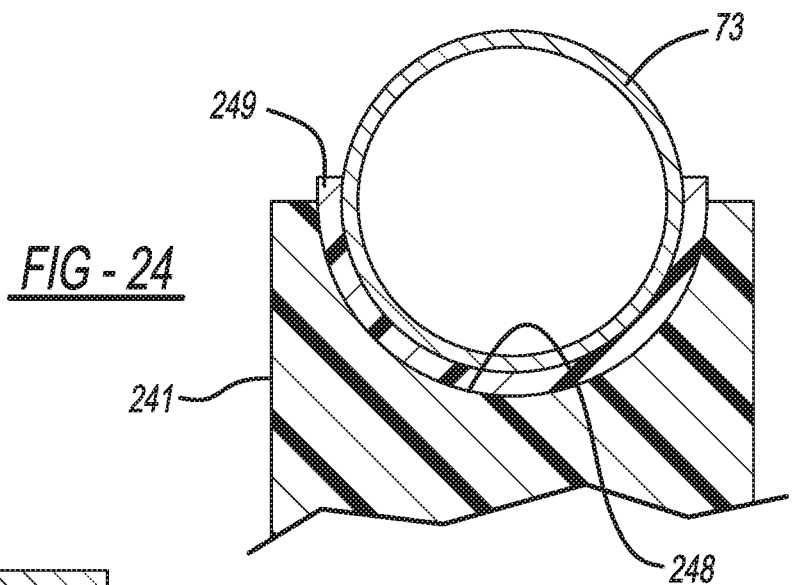
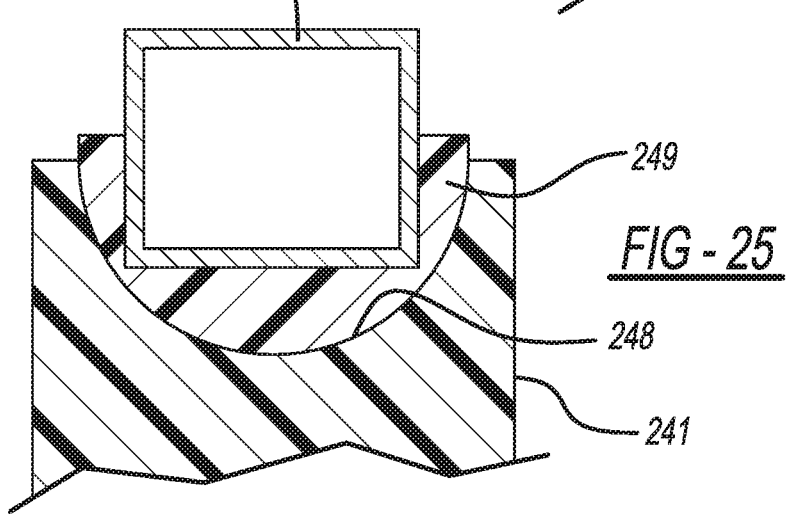

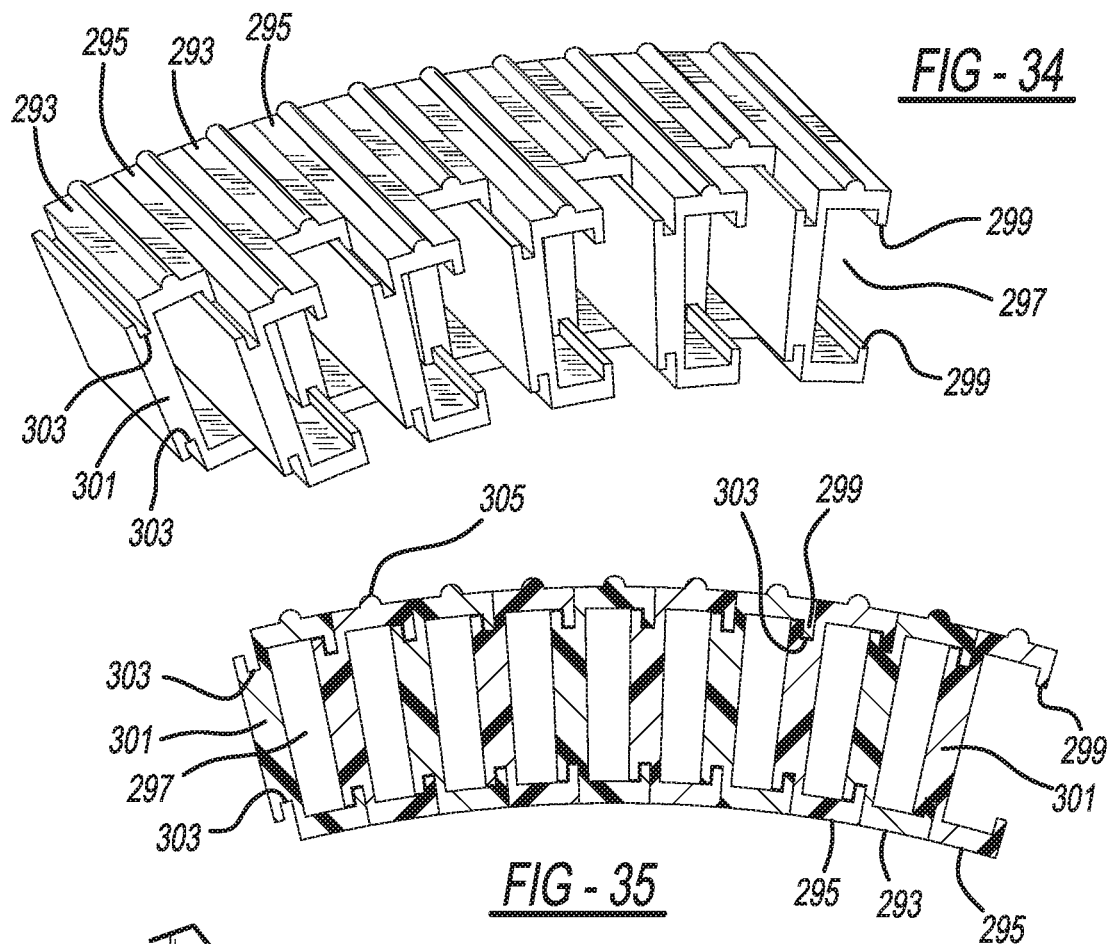
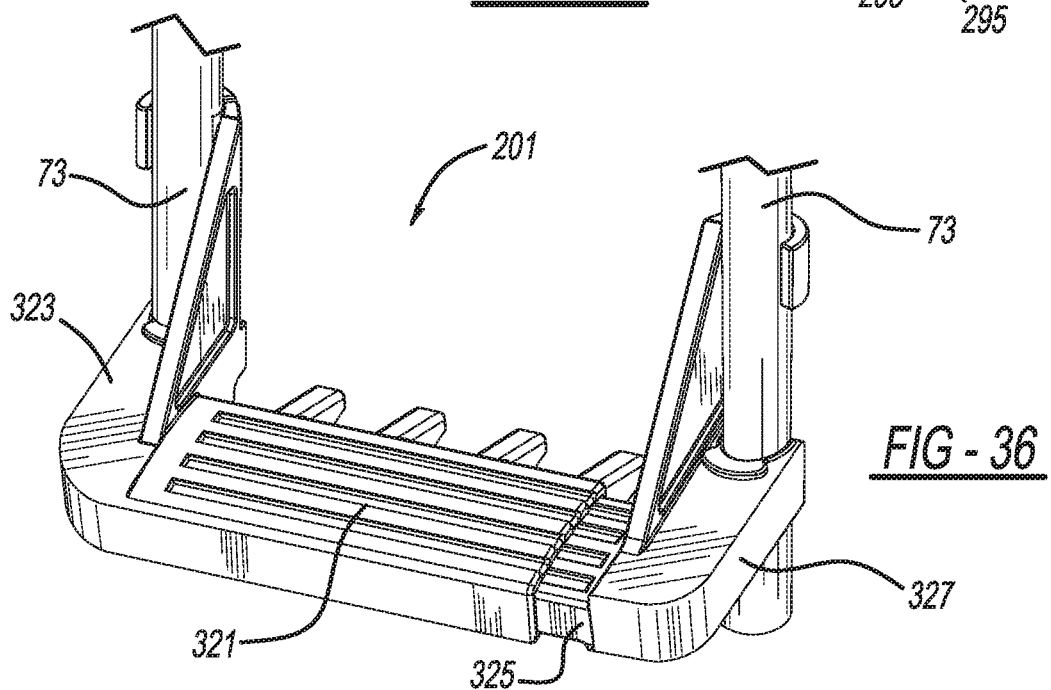

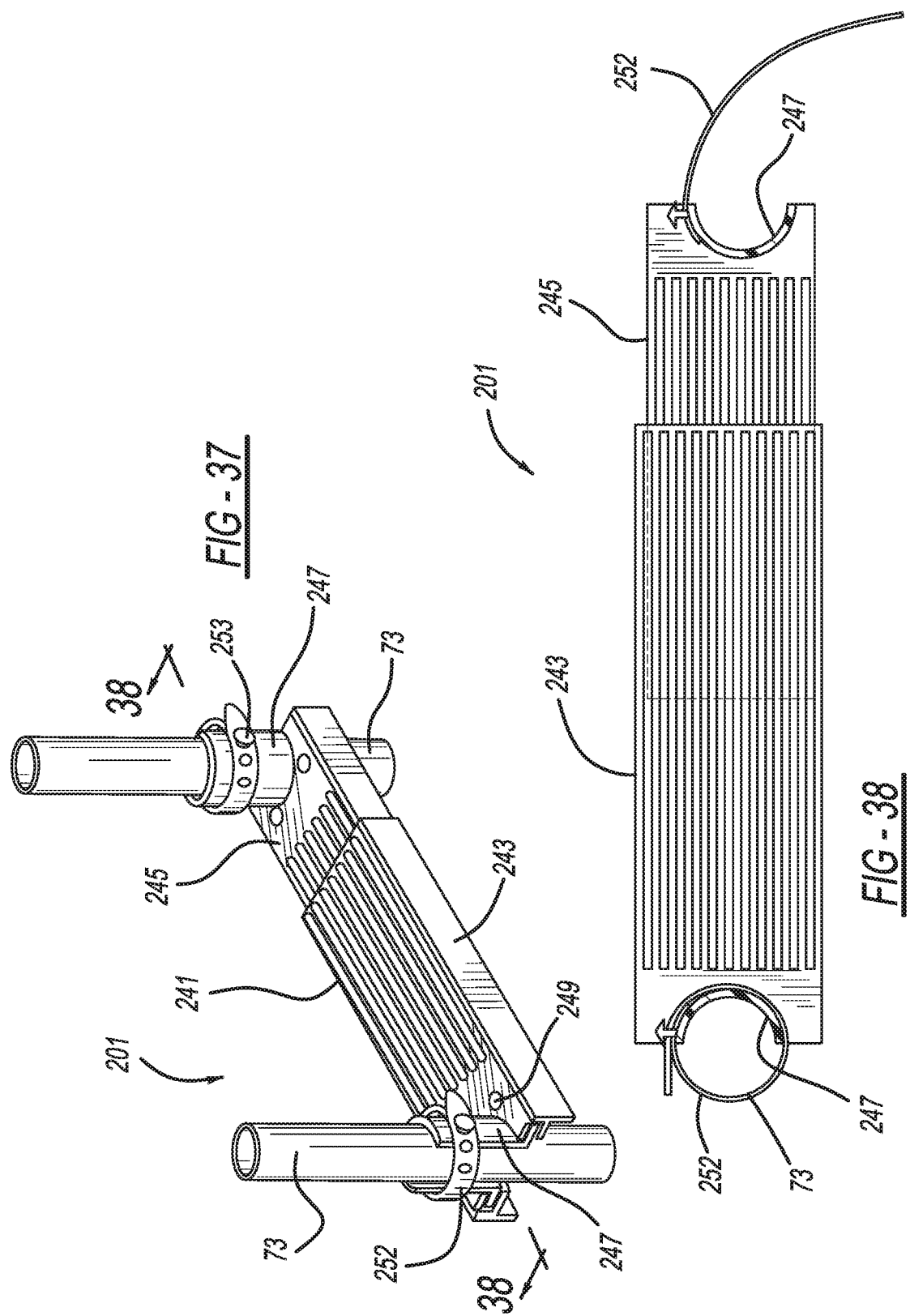

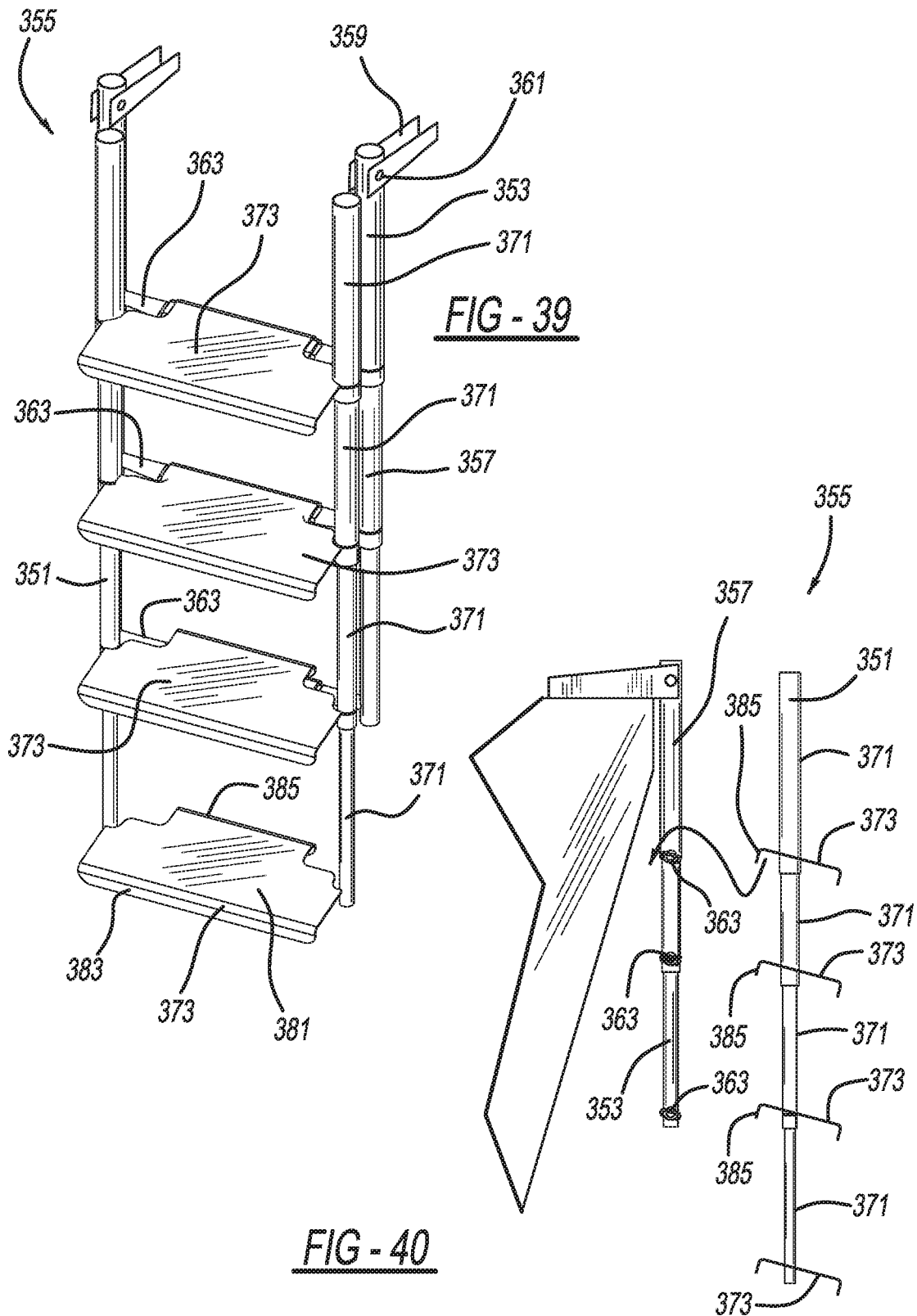

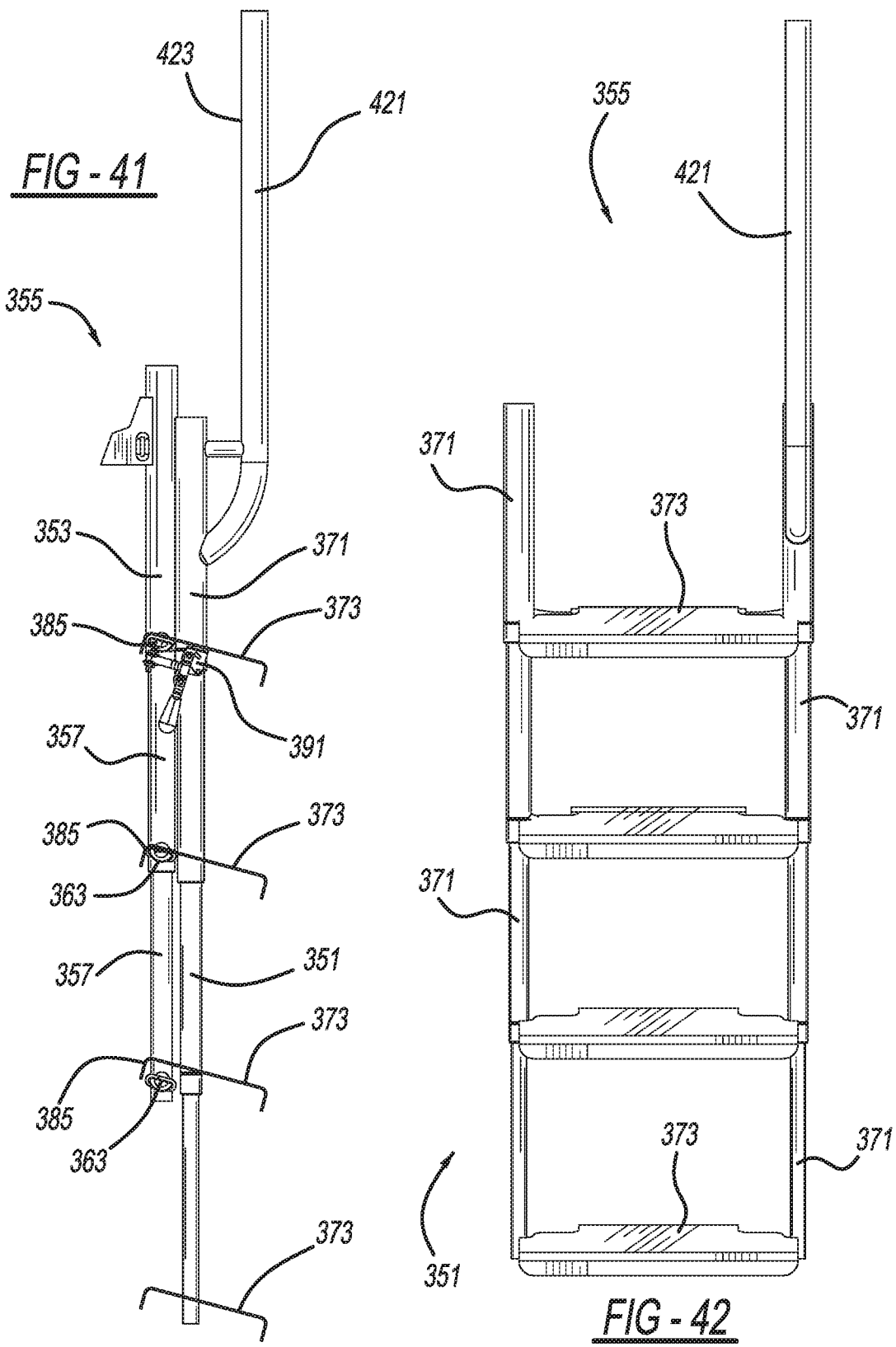

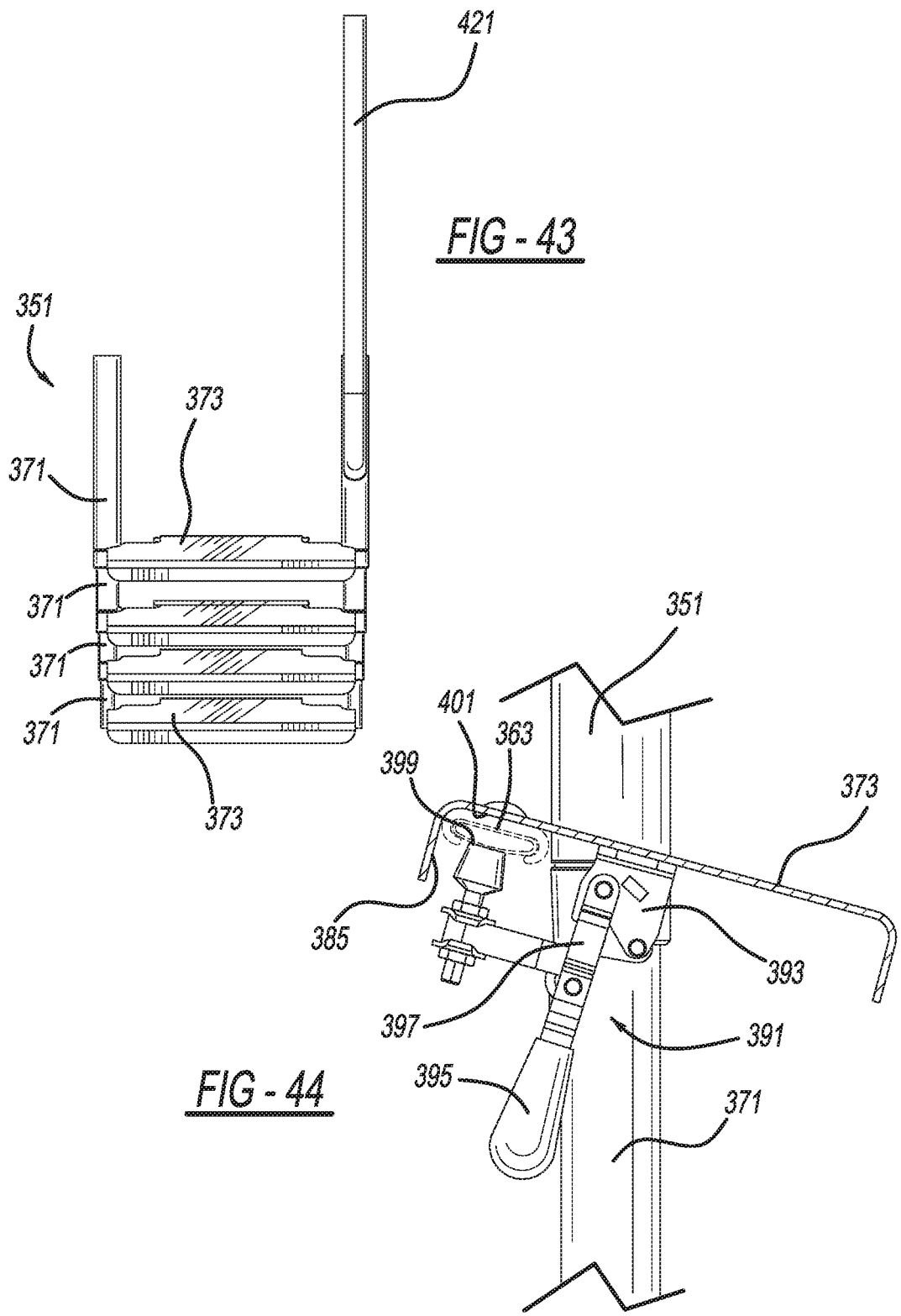

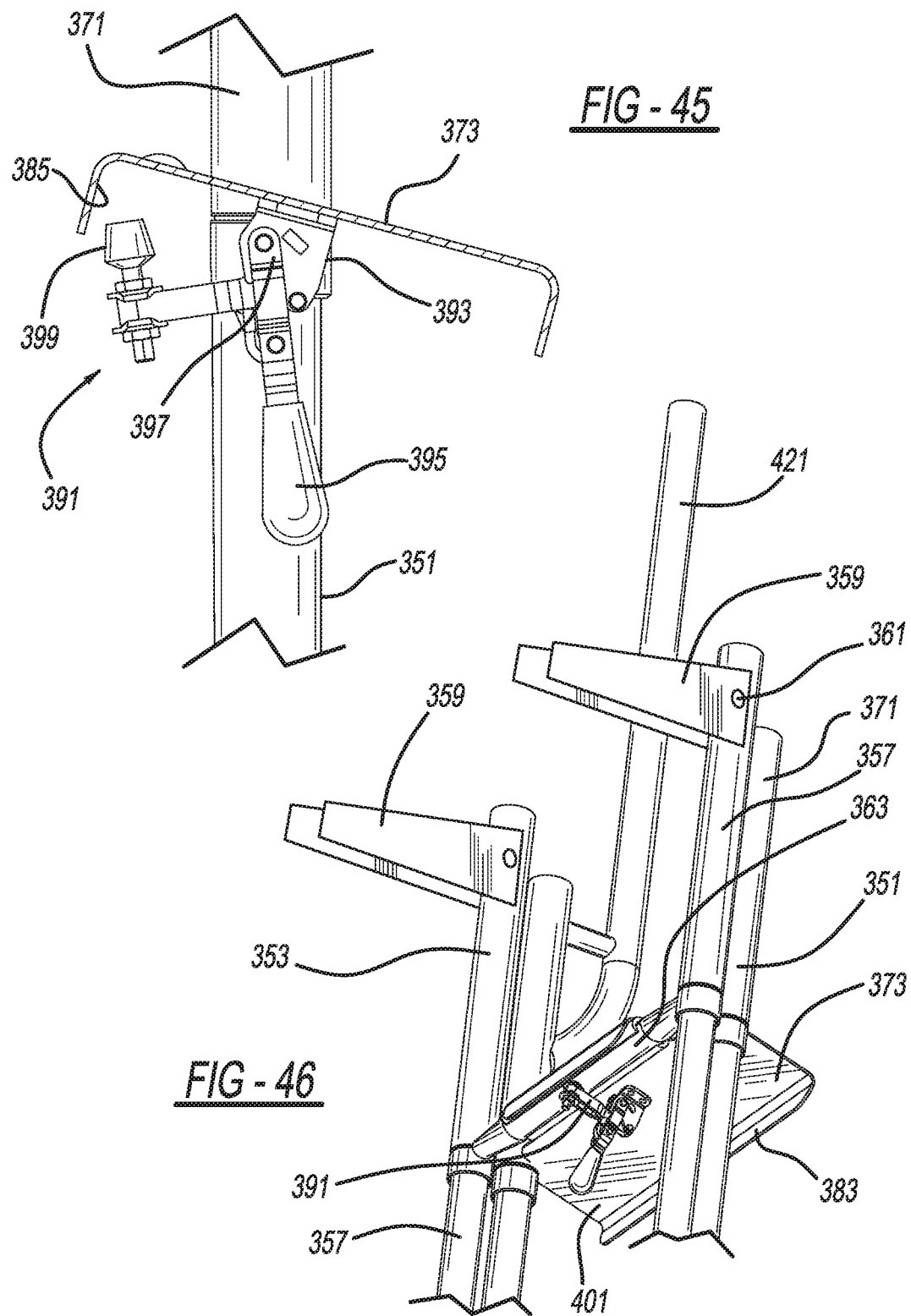

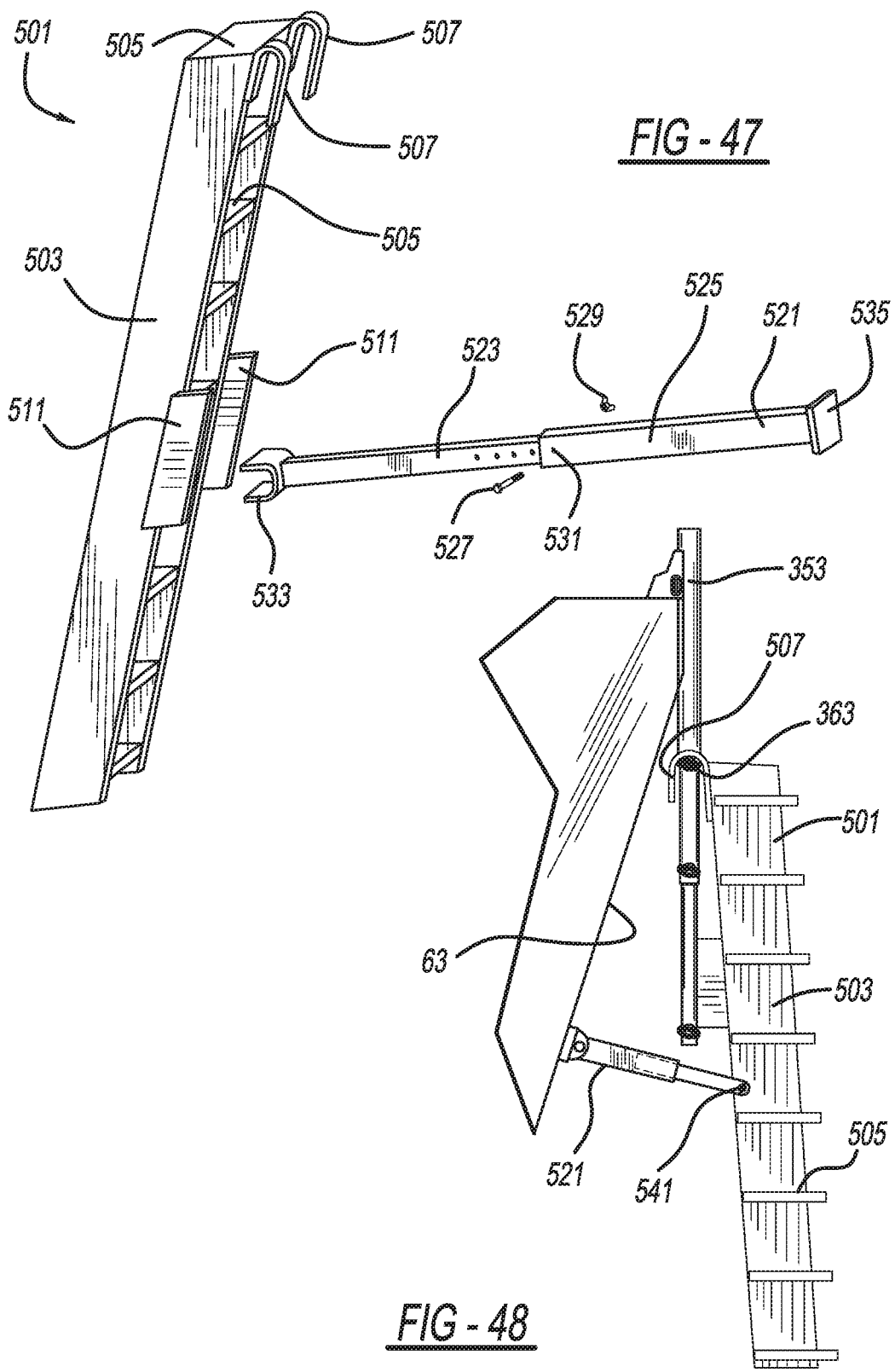

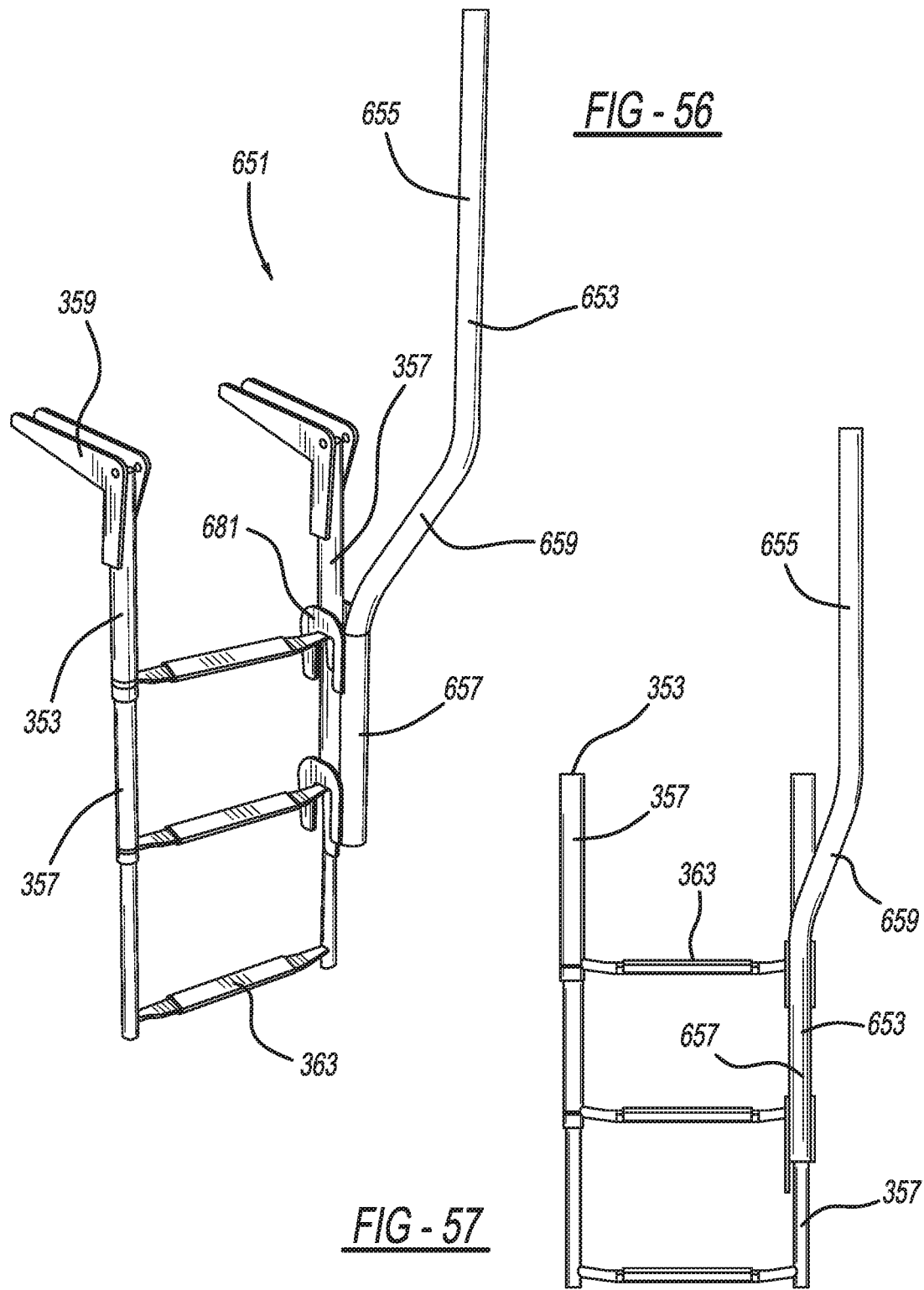

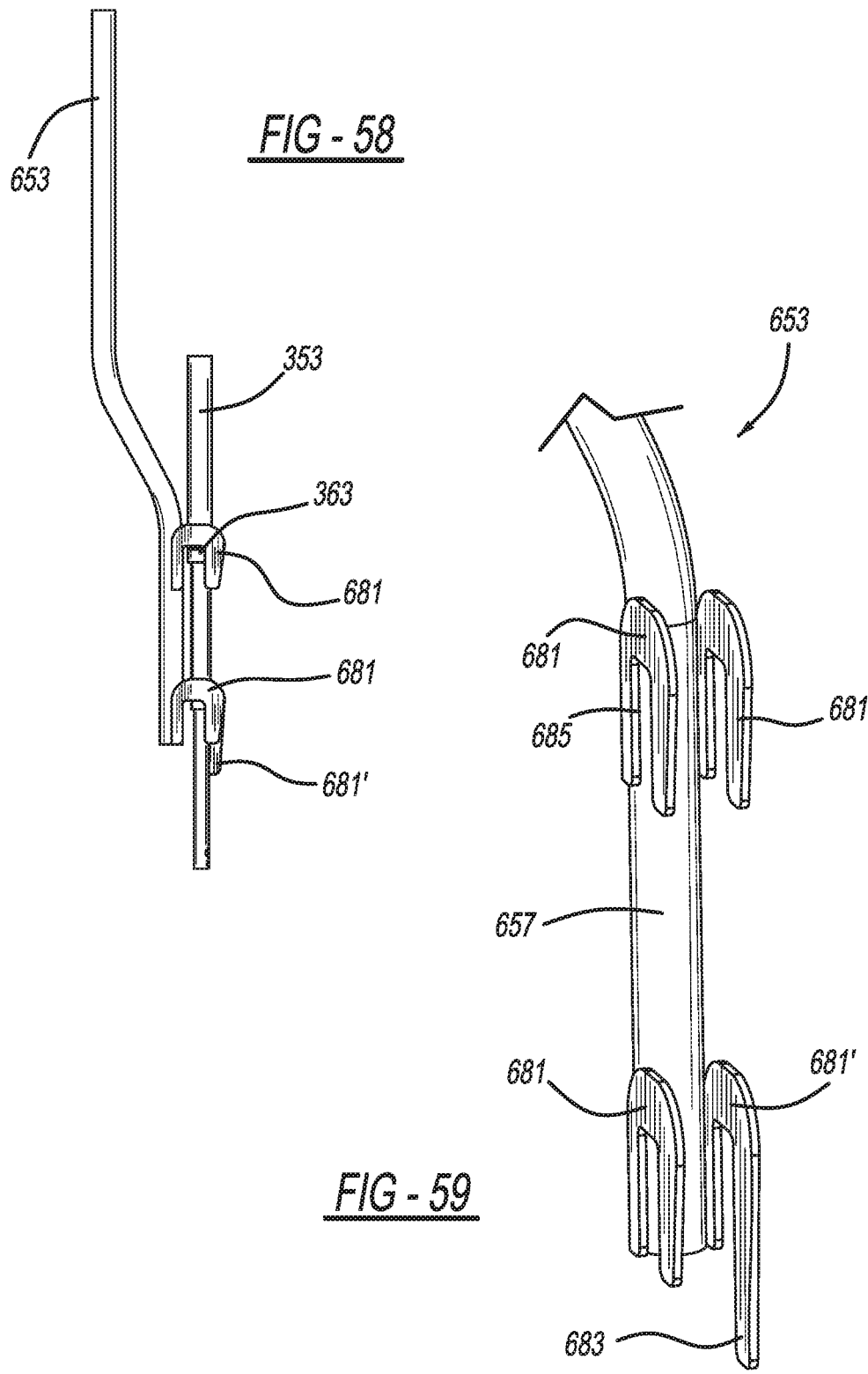

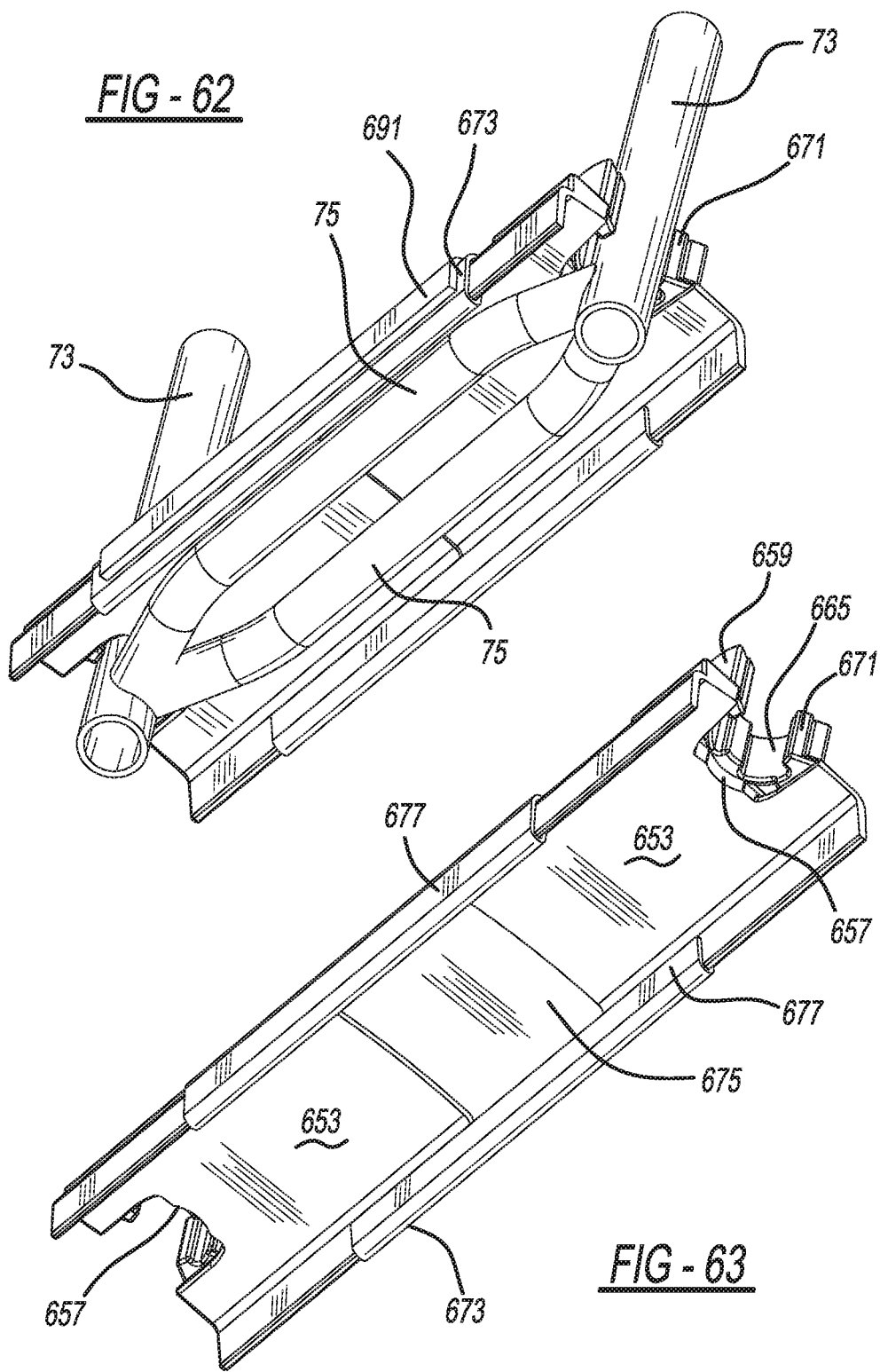

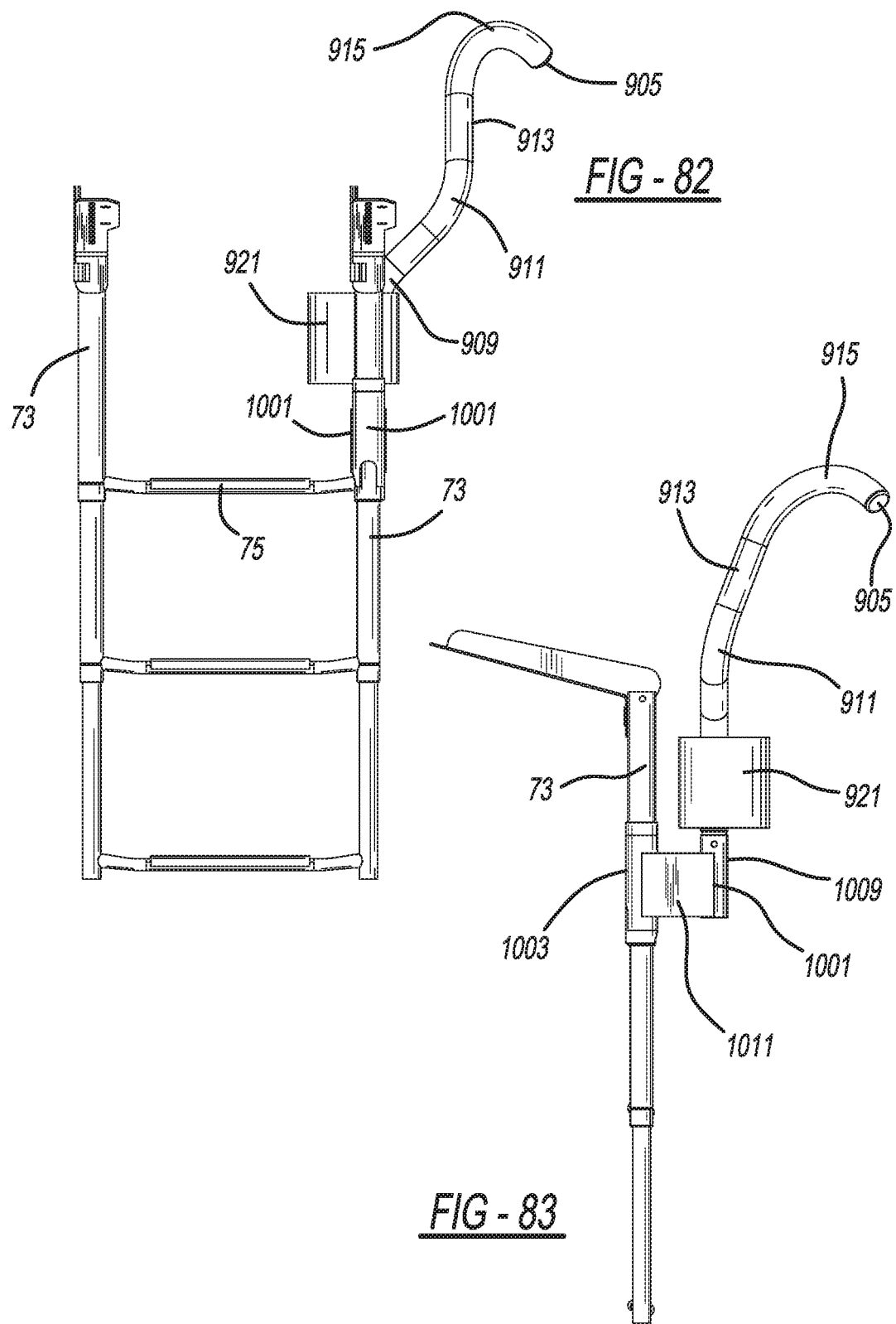

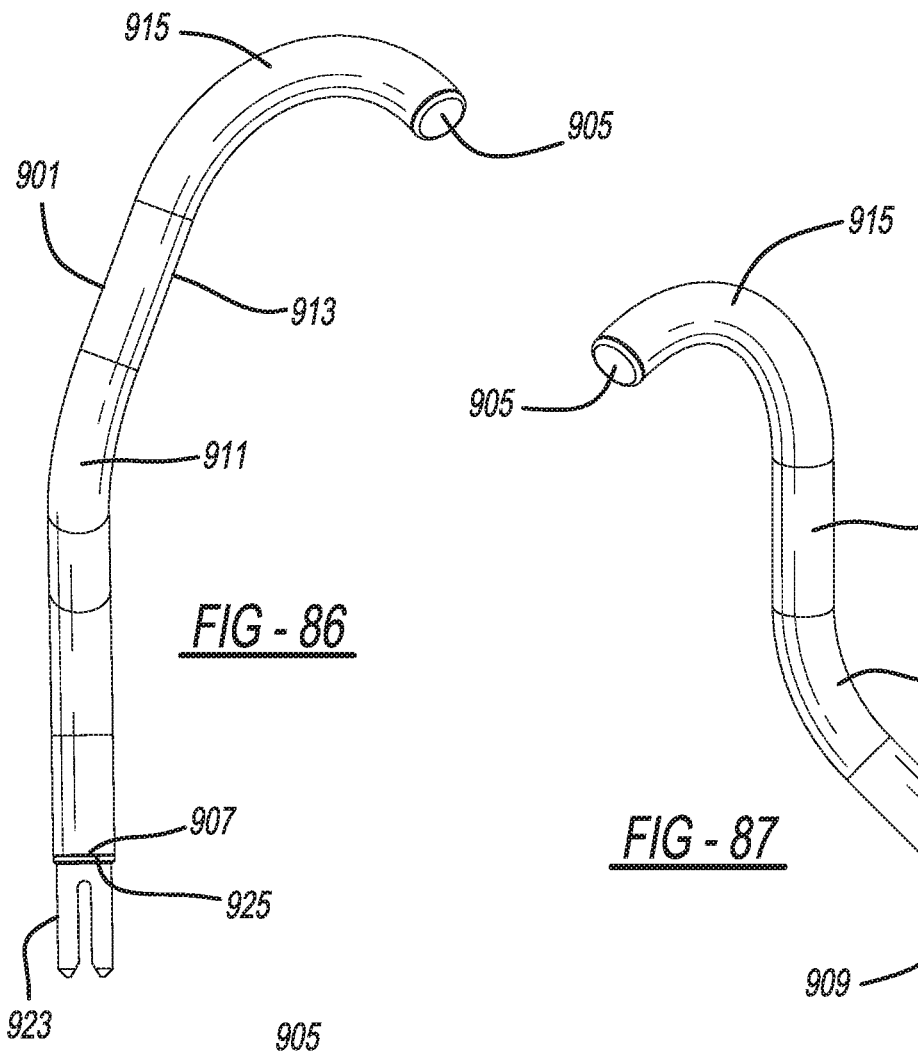

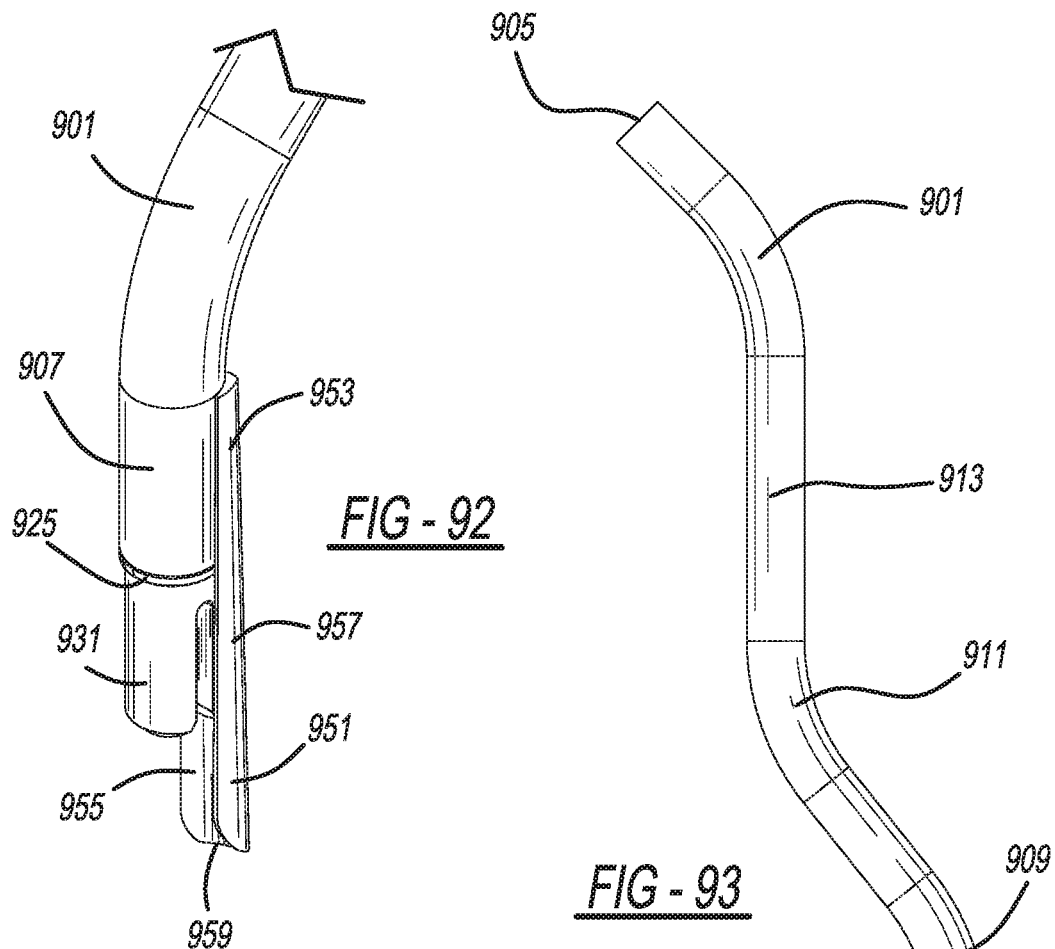
FIG - 92
FIG - 93
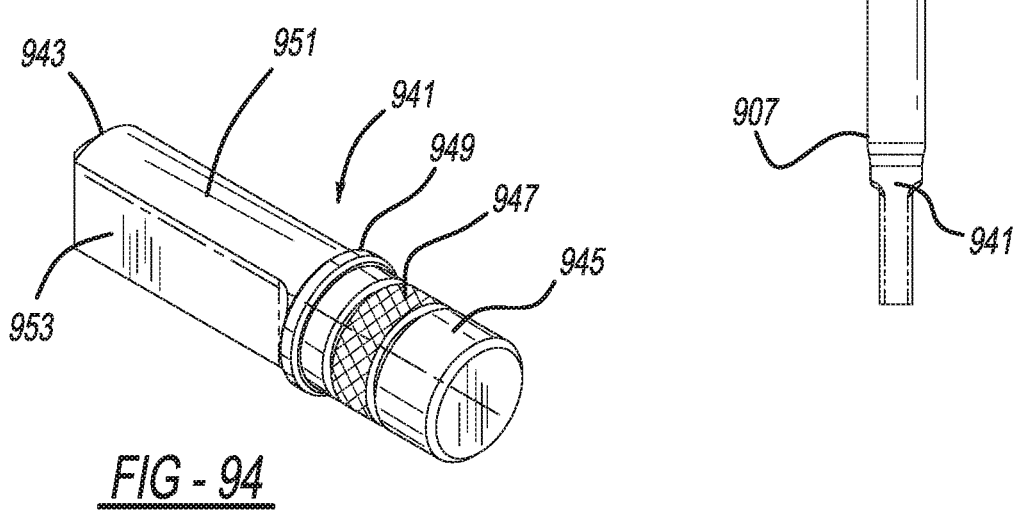
FIG - 94

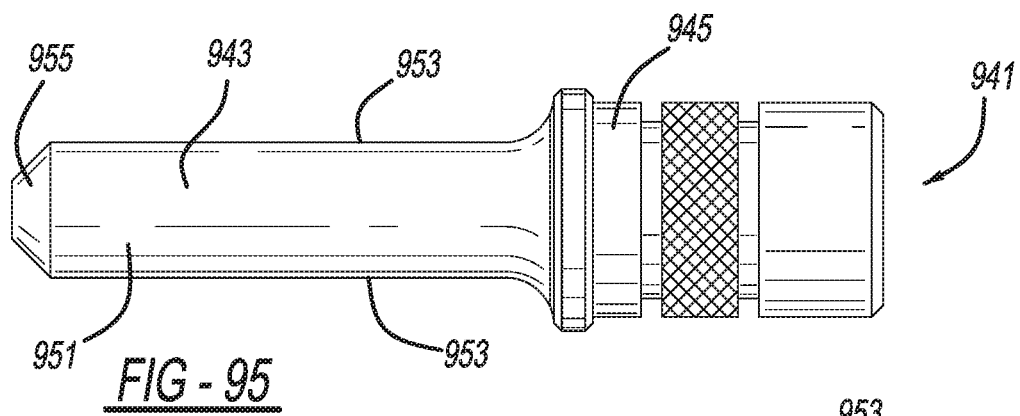
FIG - 95
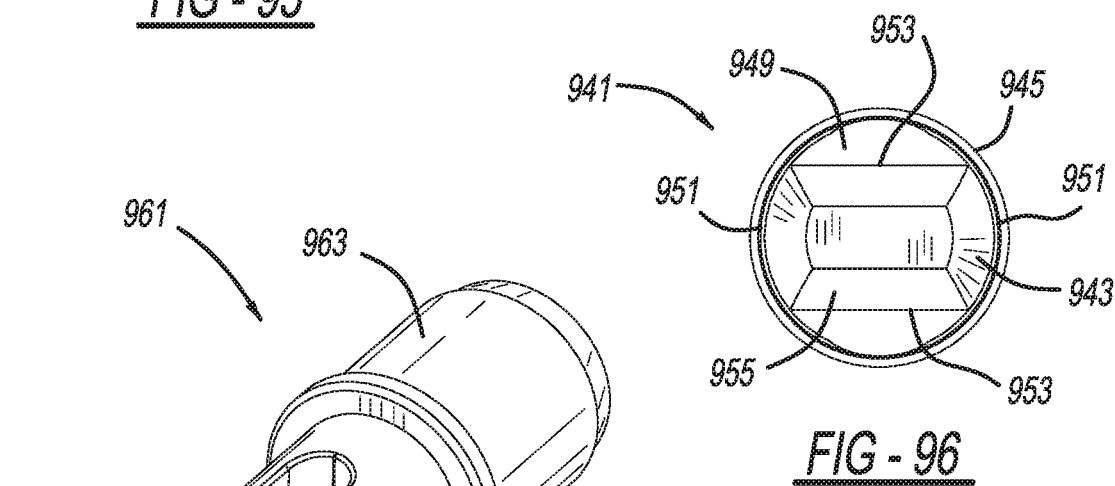
FIG - 96
FIG - 97
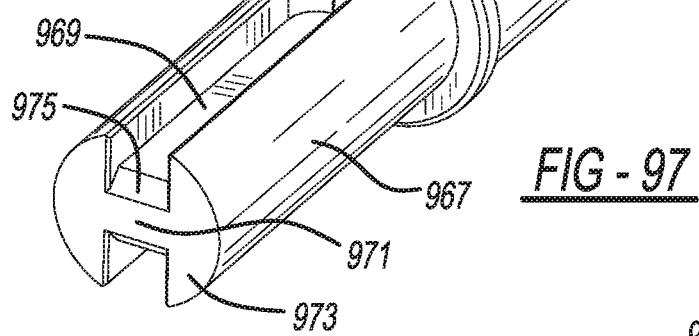
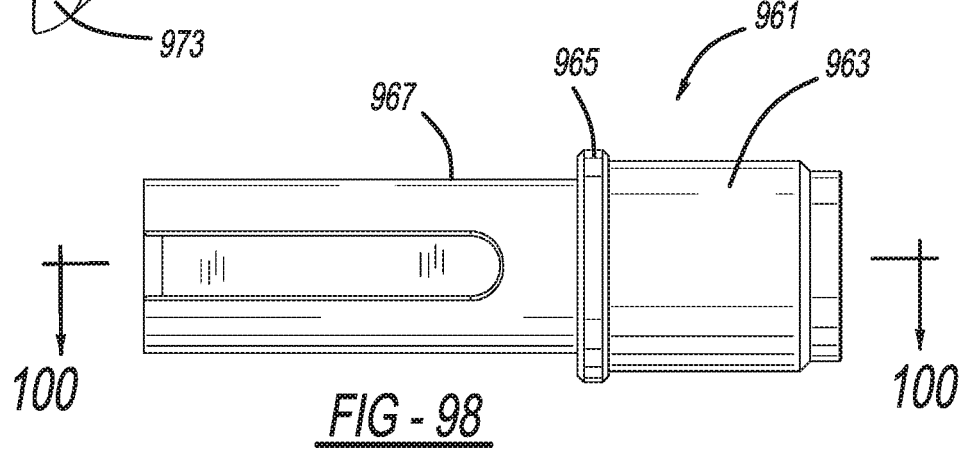
FIG - 98

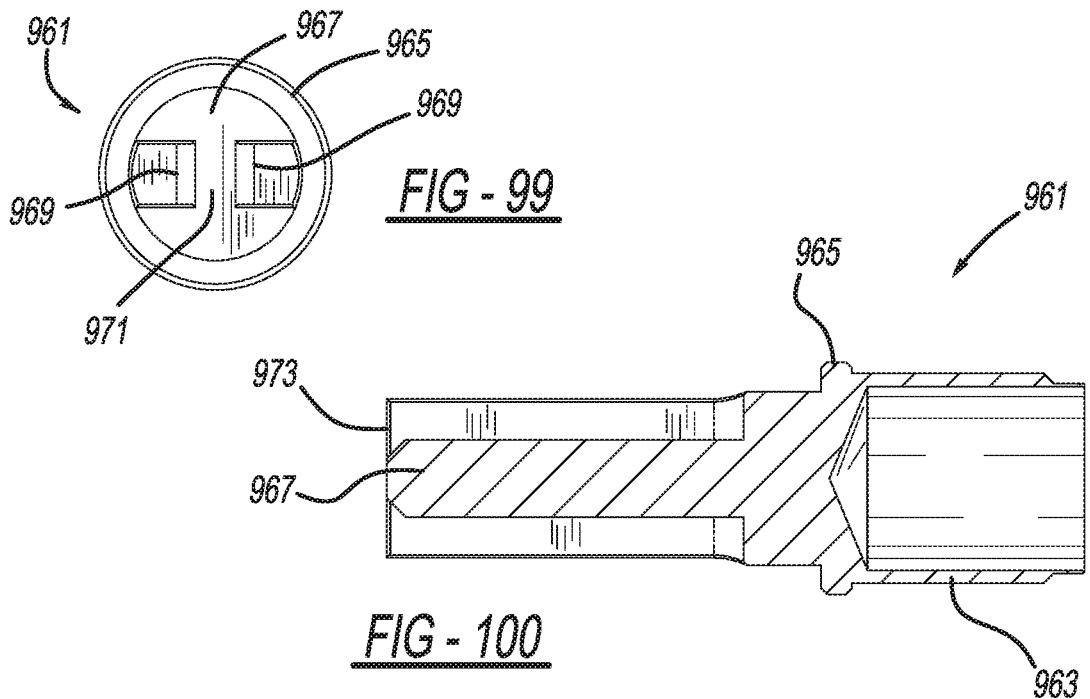
FIG - 99
FIG - 100
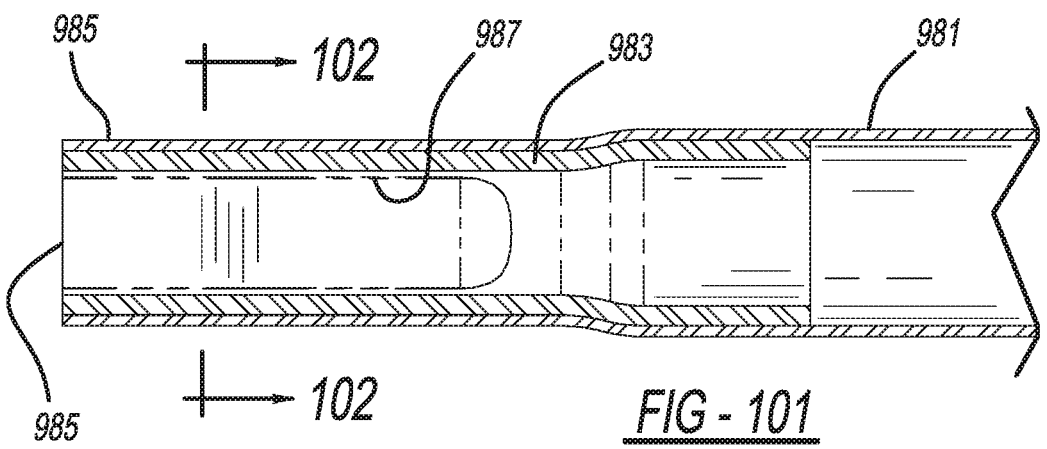
FIG - 101
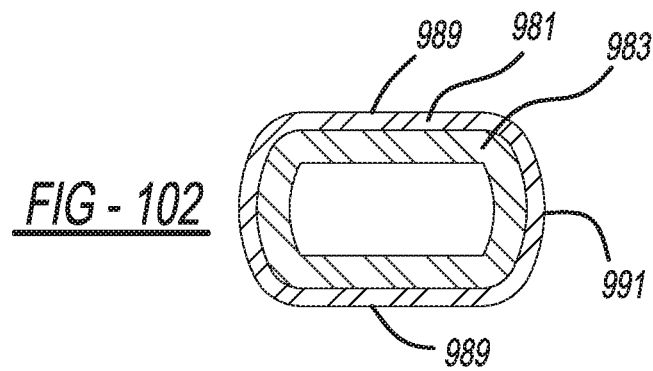
FIG - 102

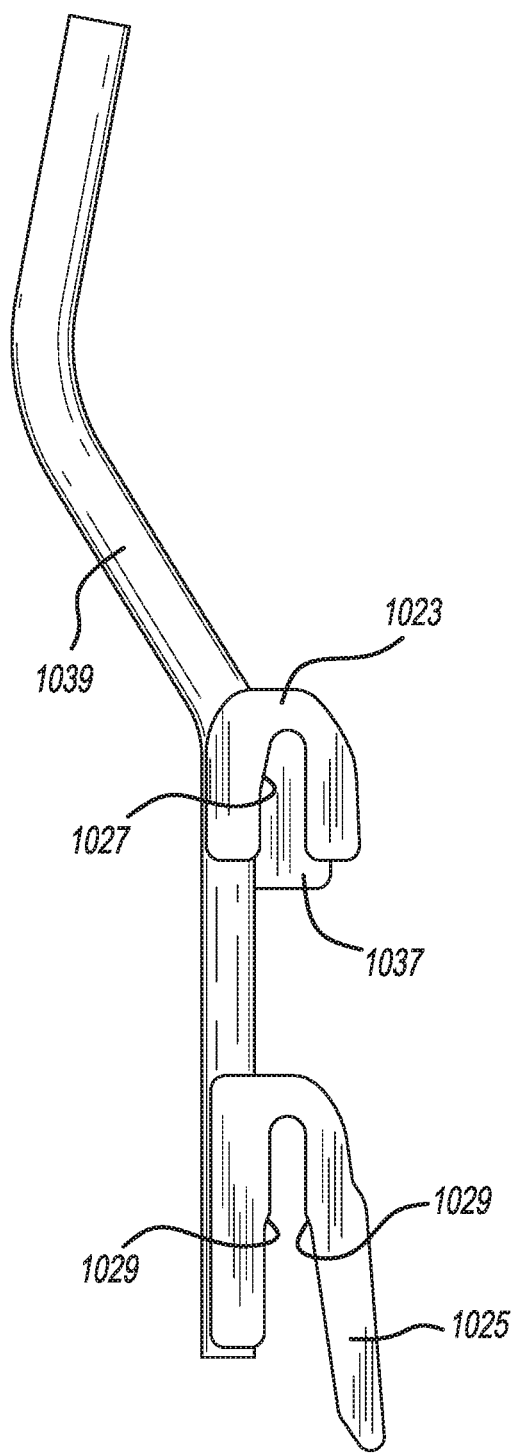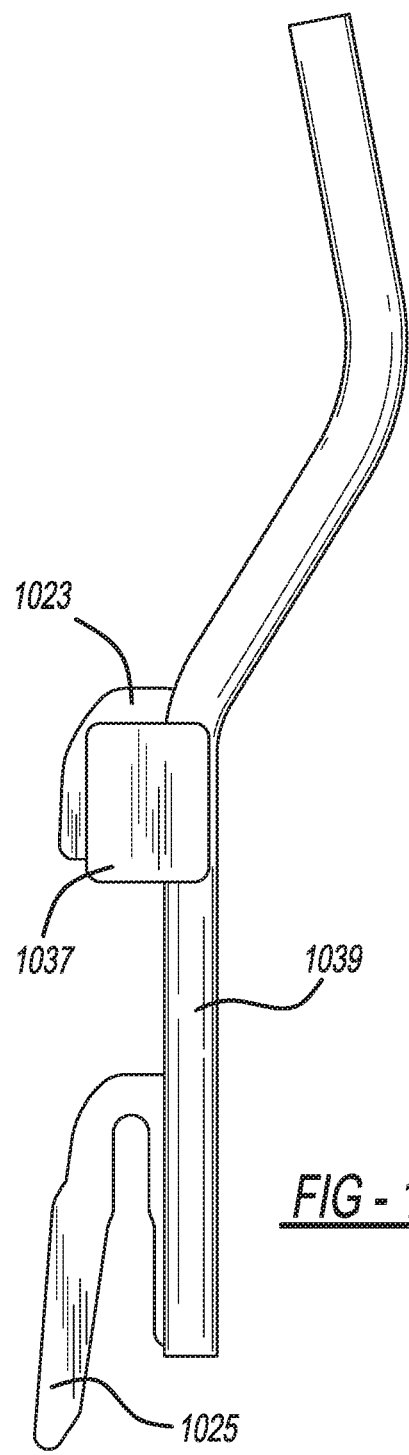
FIG - 104
FIG - 105

BOAT OR RECREATIONAL VEHICLE LADDER APPARATUS

CROSS-REFERENCE TO RELATED APPLICATIONS

This application is a divisional of U.S. Utility patent application Ser. No. 15/672,521, filed Aug. 9, 2017, which claims the benefit of U.S. Provisional Patent Application No. 62/447,021, filed on Jan. 17, 2017, and U.S. Provisional Patent Application No. 62/373,514, filed on Aug. 11, 2016, all of which are incorporated by reference herein.

BACKGROUND AND SUMMARY

The disclosure relates generally to a ladder apparatus and more specifically to a retrofit ladder apparatus for use with an existing boat or recreational vehicle ladder.

Many watercraft employ ladders to assist swimmers with exiting the water onto the watercraft. It is common for recreational boats, such as pontoon boats or even larger V-hull boats, to have a swim platform or deck adjacent a stern, to which is mounted a rotatable and telescopically collapsible swim ladder. Such a ladder can be downwardly extended in a generally vertically elongated orientation into the water or collapsed and upwardly rotated to a stowed and generally horizontal position on the swim platform or boat deck. Examples of such conventional arrangements are disclosed in the following U.S. Pat. No. 9,067,647 entitled "Portable Boat Ladder" which issued to Neese on Jun. 30, 2015; U.S. Pat. No. 7,182,175 entitled "Retractable Telescopic Boat Ladder" which issued to Schmitt et al. on Feb. 27, 2007; Design 331,219 entitled "Telescoping Boat Ladders" which issued to Barbour et al. on Nov. 24, 1992; and U.S. Patent Publication No. 2006/0272895 to Lavoie which was published on Dec. 7, 2006, all of which are incorporated by reference herein.

An additional concern is that most traditional boat ladders have no handle or too short a vertically elongated rail. This makes it very difficult for a swimmer to exit the water and enter the boat. Furthermore, the few traditional ladders with extended handles are either poorly positioned, obstruct easy stowage of the upwardly rotated ladder, or are overly complicated and expensive due to hydraulically powered actuators. An example of such a hydraulically powered handle is disclosed in U.S. Pat. No. 6,789,648 entitled "Retractable Ladder Assembly" which issued to Cook on Sep. 14, 2004, which is incorporated by reference herein.

Conventional boat ladders also suffer from uncomfortable or difficult to access ladder steps. There are three typical conventional step constructions. First, many boat ladders employ dual parallel tubes, defining a generally horizontal plane therebetween, for each step. In some instances, a polymeric tread, having a generally T or hourglass cross-sectional shape, is snapped between the pair of tubes to provide a grooved tread surface with an inboard-outboard width less than that of the collective tubes. Also, some traditional polymeric treads have a C-shape with an entirely hollow center, for mounting around the collective tops of and spanning between the dual tubes. Second, single piece rigid polymeric steps are screwed or riveted to the vertical rails. Third, single tubes are welded to or otherwise fastened between the vertical rails with an upper surface of each tube step optionally being flattened and sometimes encapsulated within a similarly shaped polymeric cover. Nevertheless, these conventional steps do not provide adequate inboard-outboard width for proper foot gripping, are too close to the boat hull for easy foot access, are slippery when wet, and/or are uncomfortable on the swimmer's bare feet.

Traditional boat ladder constructions typically have too few steps, especially below the water surface. The more steps provided, the easier it is for a swimmer to use the ladder without requiring undue upper body exertion. However, the more steps presented, the more difficult it is for the boat manufacturer to create a retracted stowage space, especially when the ladders are rotated about an attachment mounting bracket on a swim deck. Moreover, elongating conventional ladders and/or those with larger steps create weight concerns which make it more difficult for a user to upwardly rotate and stow the ladder.

Many of the preceding concerns are also presented with ladders attached to wheeled recreational vehicles ("RV"), even where some of these traditional RV ladders are stationarily and not rotatably mounted. The general term "recreational vehicle" is used herein to include a person or cargo carrying watercraft such as small or large boats or ships for any use, and wheeled recreational vehicles such as campers, fifth wheel trailers or motor homes within which a person can sleep in a prone position.

In accordance with the present invention, a boat or recreational vehicle ladder apparatus is provided. One aspect of the present ladder apparatus includes an elongated extension handle including a slot adjacent a lower end thereof. In another aspect, a ladder extension handle is provided with a flotation structure. A further aspect allows an elongated extension handle to be attached within a boat-mounted pivoting rail of an existing ladder, in a retrofit, tool-free and fastener-free manner, such that the extension handle can be easily manually removed for ladder stowage. An offset bend is provided between upstanding sections of a removable extension handle for another aspect of the ladder apparatus.

The extension handle of the present ladder apparatus advantageously achieves better leverage for a swimmer climbing up the top steps of the ladder and pulling his or her body forward into the boat. Moreover, the present extension handle is quickly and easily insertable and removable from an existing ladder rail to promote quick stowage yet be sturdy due to its insertion below the existing rail-to-bracket pivot. The offset bend option further allows for larger people to enter the boat through a larger width provided by a pair of the extension handles being spaced apart greater than the lower ladder rails.

Another aspect of a boat or recreational vehicle ladder apparatus provides a snap-on step tread which can be mounted to a dual-tubular ladder step structure. Another aspect of a ladder step allows for tool-free and fastener-free installation of a wider step onto a smaller width existing ladder step in a retrofit manner. This advantageously provides a larger and more comfortable step tread area for a user's foot. In a further aspect, a snap-on polymeric tread is provided with an angle of at least 5°, and more preferably at least 10°, above a plane through an existing step with an apex of the angle outboard of the step; this advantageously allows for easier user foot access and improved ergonomics when the user is exiting the water.

Another aspect of a boat or recreational vehicle ladder apparatus employs a laterally expandable ladder step which can be retrofit onto an existing ladder. A further aspect employs clasps or hooks to attach and retain a ladder step to generally vertical ladder rails in a tool-free and fastener-free manner. In another aspect, a ladder step is laterally telescopic.

The present step advantageously provides a larger step surface. Moreover, the present step allows for adjustment between differently spaced apart existing ladder rails and/or to attach to different diameter rails, especially when employed with differing diameter telescopic rail sections. Another advantage is that the present step can be quickly removed from the ladder rails for stowage.

Another aspect of a boat or recreational vehicle ladder apparatus employs a hook between a retrofit supplemental ladder for placement upon an existing ladder. In a further aspect, a hook extends from an inboard edge of a foot tread surface of a step. An additional aspect provides a hook extending from each step in at least two different telescopic sections of a retrofit ladder. Yet another aspect employs an adjustable length standoff between a ladder and a boat surface. The present ladder apparatus is advantageous over conventional devices in that the present ladder apparatus provides an additional quantity of steps to allow easier use thereof while also being easily removable for stowage of both the retrofit ladder and the existing ladder. Further advantages of the present invention will become apparent from the following description and appended claims taken in conjunction with the accompanying drawings.

BRIEF DESCRIPTION OF THE DRAWINGS

FIG. 5 is a top elevational view showing a second embodiment of the extension handles employed with the ladder apparatus;

FIG. 6 is an exploded perspective view showing the first embodiment handle extensions employed with the ladder apparatus;

FIG. 7 is an enlarged perspective view, taken within circle 7 of FIG. 3, showing a coupling end employed with the first, second and third embodiment extension handles of the ladder apparatus;

FIG. 8 is a perspective view showing a third embodiment of the extension handle employed with the ladder apparatus;

FIG. 13 is a top elevational view showing the first embodiment step employed with the ladder apparatus;

FIG. 14 is a bottom elevational view showing the first embodiment step employed with the ladder apparatus;

FIG. 18 is a top elevational view showing the second embodiment step employed with the ladder apparatus;

FIG. 19 is a bottom elevational view showing the second embodiment step employed with the ladder apparatus;

FIG. 22 is an exploded perspective view showing the first embodiment expandable step employed with the ladder apparatus;

FIG. 23 is a cross-sectional view, taken along line 23-23 of FIG. 21, showing the first embodiment expandable step employed with the ladder apparatus;

FIG. 24 is a cross-sectional view, taken along line 24-24 of FIG. 21, showing the first embodiment expandable step employed with the ladder apparatus;

FIG. 25 is a cross-sectional view, similar to that of FIG. 24, showing an alternate embodiment of an expandable step employed with the ladder apparatus;

FIG. 34 is a perspective view showing alternating beams of the fourth embodiment expandable step employed with the ladder apparatus;

FIG. 35 is a cross-sectional view, taken along line 35-35 of FIG. 32, showing the fourth embodiment expandable step employed with the ladder apparatus;

FIG. 36 is a perspective view showing a fifth embodiment of an expandable step employed with the ladder apparatus;

FIG. 37 is a sixth embodiment of an expandable step employed with the ladder apparatus;

FIG. 38 is a cross-sectional view, taken along line 38-38 of FIG. 37, showing the sixth embodiment expandable step employed with the ladder apparatus;

FIG. 39 is a perspective view showing a first embodiment of a ladder apparatus employing a telescopic retrofit supplemental ladder mounted to an existing original telescopic ladder;

FIG. 40 is a diagrammatic side view showing the first embodiment telescopic retrofit ladder and the existing telescopic ladder employed with the ladder apparatus;

FIG. 41 is a side elevational view showing a second embodiment of a ladder apparatus employing a telescopic retrofit supplemental ladder mounted to an existing original telescopic ladder;

FIG. 42 is a rear elevational view showing the second embodiment telescopic retrofit ladder employed with the ladder apparatus;

FIG. 43 is a rear elevational view showing the second embodiment telescopic retrofit ladder employed with the ladder apparatus, in a collapsed position;

FIG. 44 is a partially fragmented side elevational view showing a clamp employed with any of the embodiments of the telescopic retrofit ladder employed with the ladder apparatus, in a clamped orientation;

FIG. 45 is a partially fragmentary side elevational view showing the clamp of the telescopic retrofit ladder employed with the ladder apparatus, in an unclamped orientation;

FIG. 46 is a bottom perspective view showing the clamp of the telescopic retrofit ladder employed with the ladder apparatus, in the clamped orientation;

FIG. 47 is a partially exploded perspective view showing a third embodiment retrofit ladder employed with the ladder apparatus;

FIG. 48 is a diagrammatic side view showing the third embodiment retrofit ladder employed with the ladder apparatus;

FIG. 56 is a perspective view showing another embodiment of an extension handle employed with the ladder apparatus;

FIG. 57 is a rear elevational view showing the FIG. 56 embodiment employed with the ladder apparatus;

FIG. 58 is a side elevational view showing the FIG. 56 embodiment employed with the ladder apparatus;

FIG. 59 is an enlarged and fragmentary perspective view showing the FIG. 56 embodiment employed with the ladder apparatus;

FIG. 62 is a bottom perspective view showing the FIG. 60 embodiment expandable step employed with the ladder apparatus, shown in a contracted position;

FIG. 63 is a bottom perspective view showing the FIG. 60 embodiment expandable step employed with the ladder apparatus, shown in an expanded position;

FIG. 82 is a rear elevational view showing the FIG. 81 embodiment extension handle employed with the ladder apparatus;

FIG. 83 is a side elevational view showing the FIG. 81 embodiment extension handle employed with the ladder apparatus;

FIG. 86 is a rear elevational view showing the extension handle of the FIG. 81 embodiment employed with the ladder apparatus;

FIG. 87 is a side elevational view showing the extension handle of the FIG. 81 embodiment employed with the ladder apparatus;

FIG. 88 is a bottom elevational view showing the extension handle of the FIG. 81 embodiment employed with the ladder apparatus;

FIG. 92 is a perspective view showing another embodiment of an extension handle employed with a ladder apparatus;

FIG. 93 is a side elevational view showing another embodiment of an extension handle employed with a ladder apparatus;

FIG. 94 is a perspective view showing an end socket insert of the FIG. 93 embodiment extension handle employed with the ladder apparatus;

FIG. 95 is a side elevational view showing the end socket insert of the FIG. 93 embodiment extension handle employed with the ladder apparatus;

FIG. 96 is a bottom elevational view showing the end socket insert of the FIG. 93 embodiment extension handle employed with the ladder apparatus;

FIG. 97 is a perspective view showing an end socket insert of another embodiment of an extension handle employed with a ladder apparatus;

FIG. 98 is a side elevational view showing the end socket insert of the FIG. 97 embodiment extension handle employed with the ladder apparatus;

FIG. 99 is a bottom elevational view showing the end socket insert of the FIG. 97 embodiment extension handle employed with the ladder apparatus;

FIG. 100 is a longitudinal-sectional view, taken along line 100-100 of FIG. 98, showing the end socket insert of the FIG. 97 embodiment extension handle employed with the ladder apparatus;

FIG. 101 is a longitudinal-sectional view showing another embodiment of an extension handle employed with a ladder apparatus;

FIG. 102 is a cross-sectional view, taken along line 102-102 of FIG. 101, showing the FIG. 101 embodiment extension handle employed with the ladder apparatus;

FIG. 104 is a side elevational view showing the FIG. 103 embodiment extension handle employed with the ladder apparatus;

FIG. 105 is a side elevational view, opposite that of FIG. 104, showing the FIG. 103 embodiment extension handle employed with the ladder apparatus;

DETAILED DESCRIPTION

Figure 1:
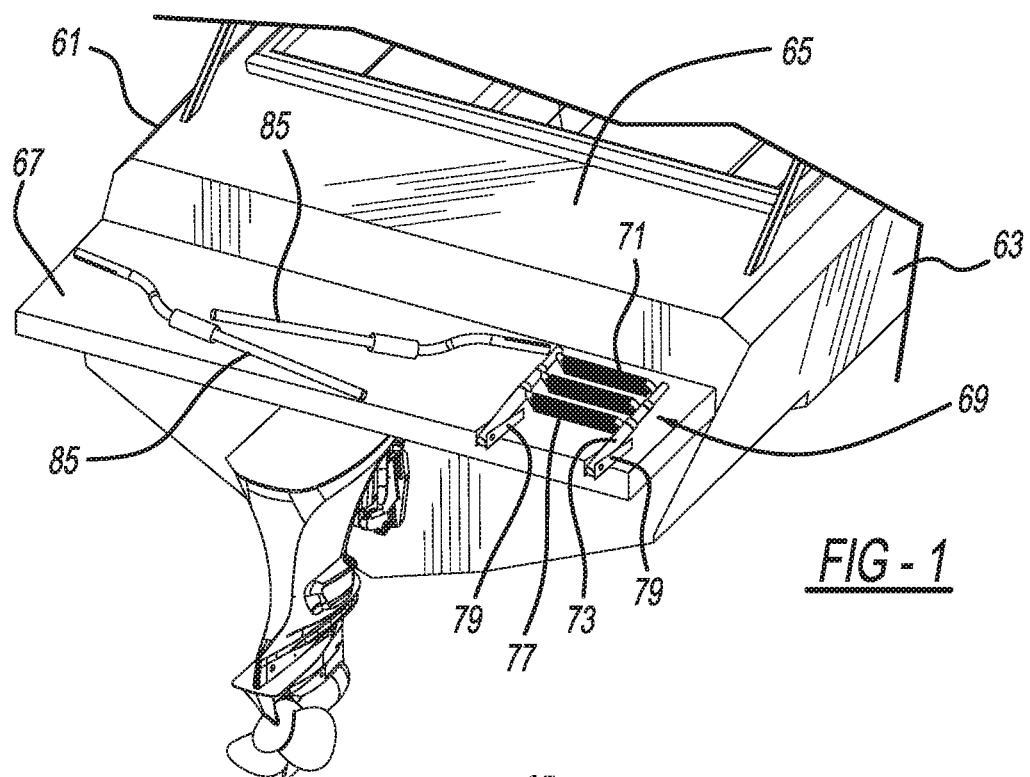
FIG. 1 is a fragmentary perspective view showing a boat employing a ladder apparatus of the present invention, in a stowed position.
Figure 2:
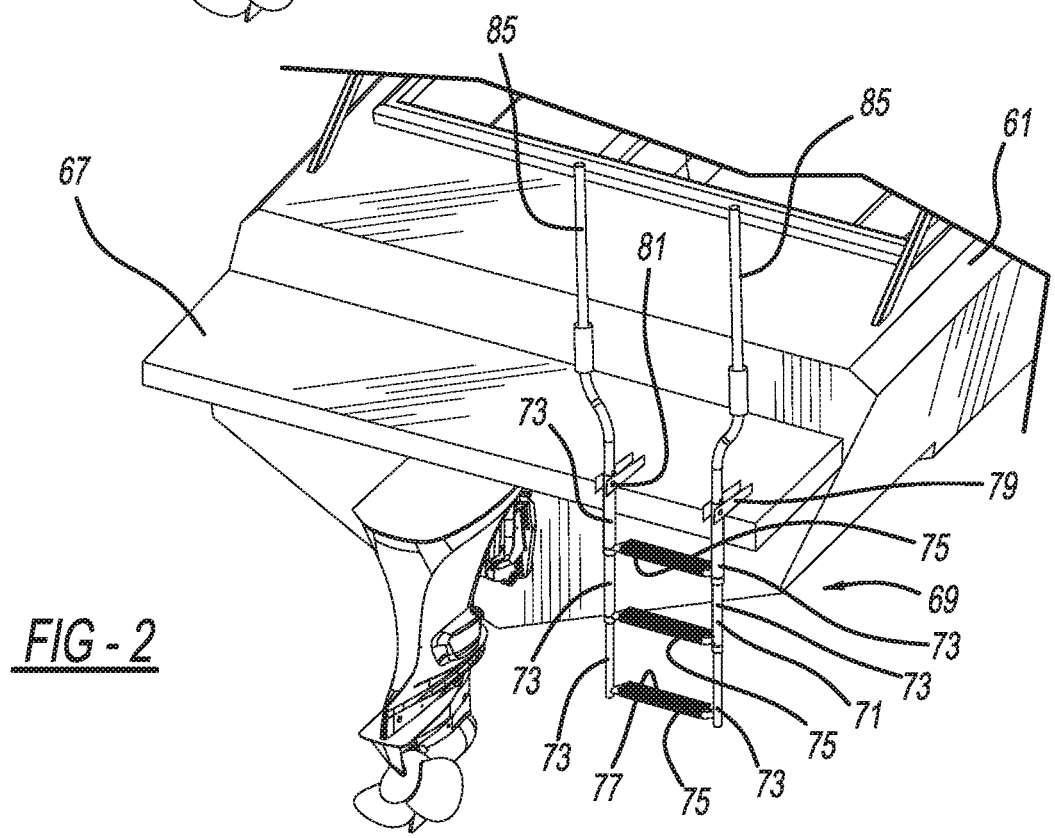
FIG. 2 is a fragmentary perspective view showing the boat employing the ladder apparatus, in a functional and generally vertically oriented position.
Figure 3:
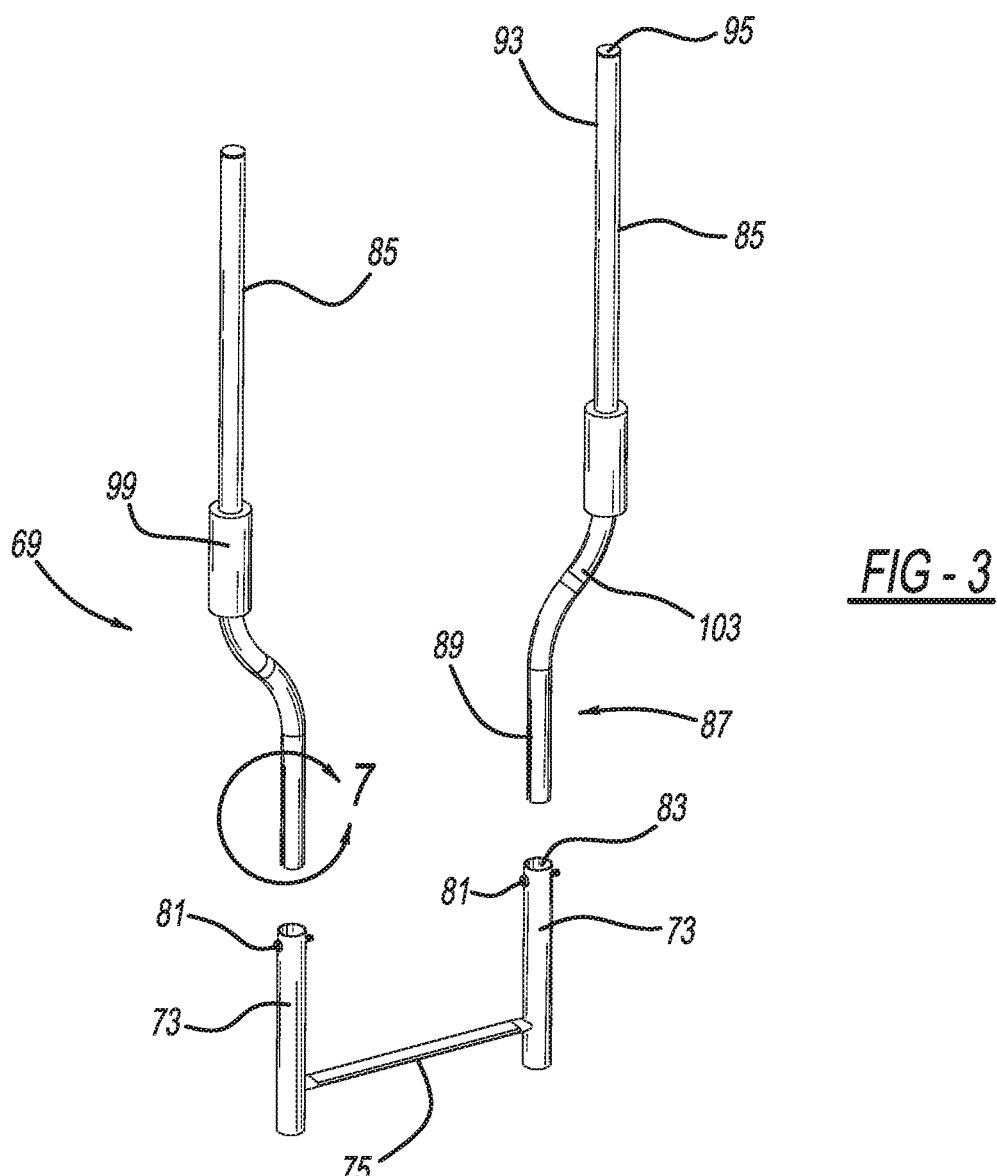
FIG. 3 is a partially exploded perspective view showing a first embodiment extension handle employed with the ladder apparatus.
Figure 4:
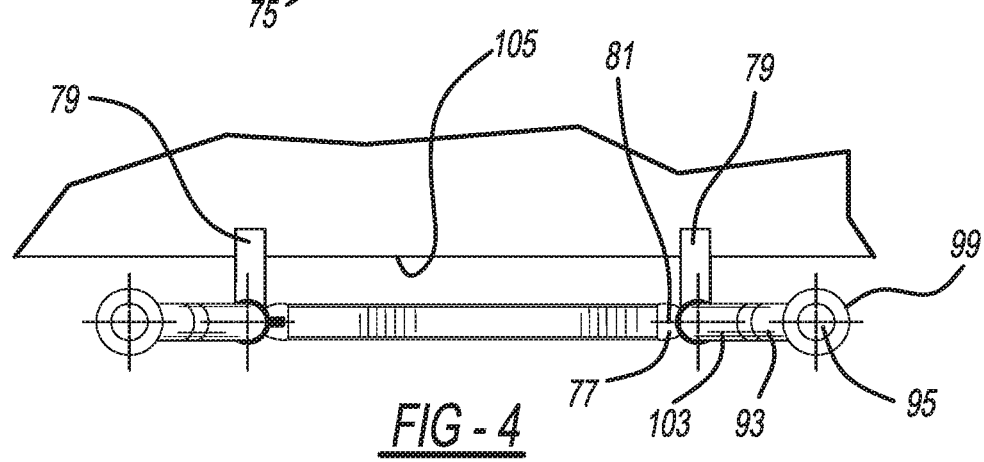
FIG. 4 is a top elevational view showing the first embodiment extension handle employed with the ladder apparatus.
Figure 9:
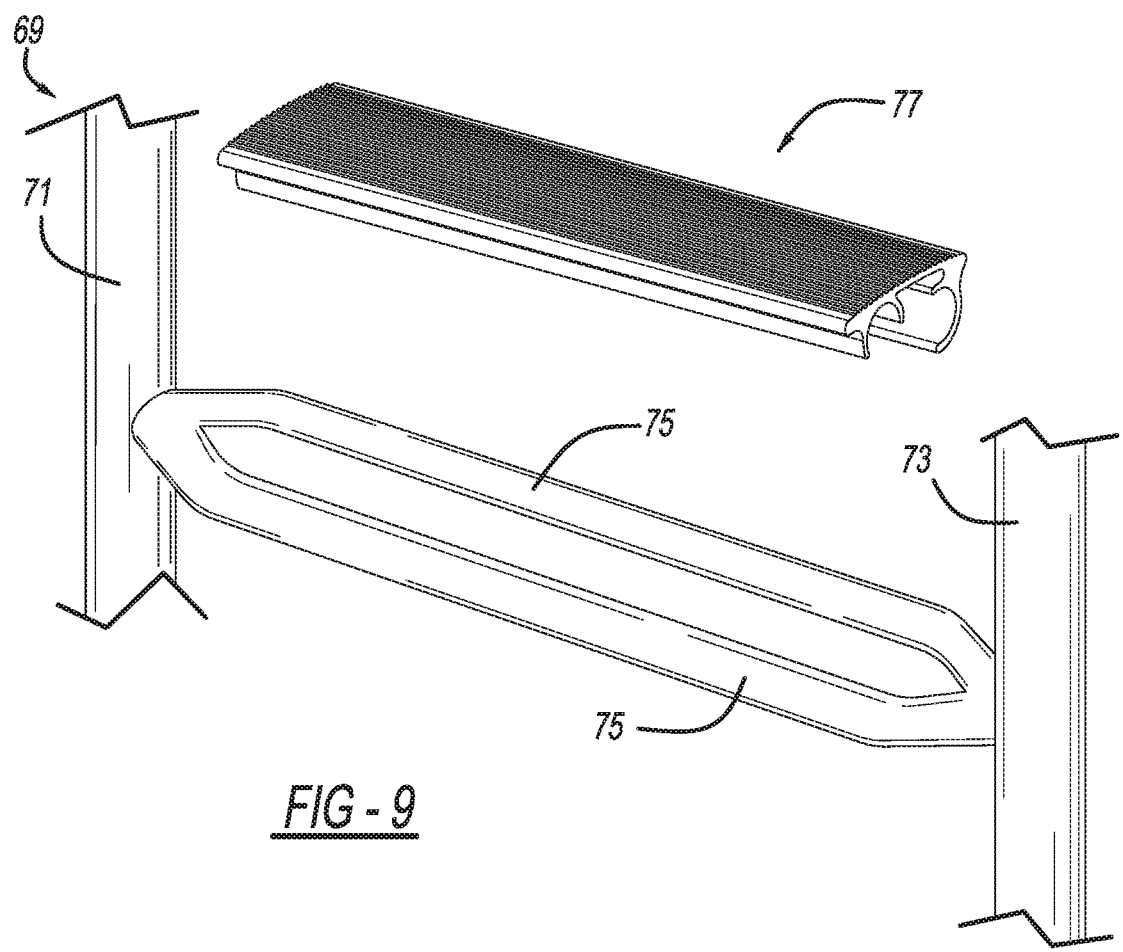
FIG. 9 is an exploded perspective view showing a first embodiment of a snap-on step employed with the ladder apparatus.
Figure 10:
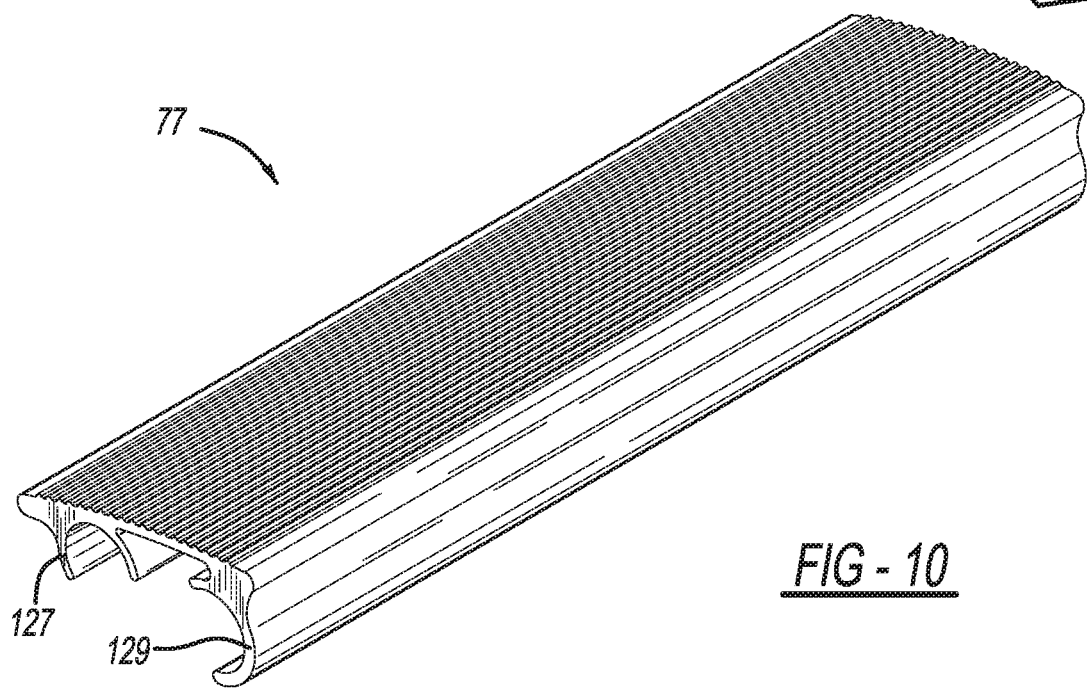
FIG. 10 is a perspective view, from an opposite direction to that of FIG. 9, showing the first embodiment step employed with the ladder apparatus.
Figure 11:
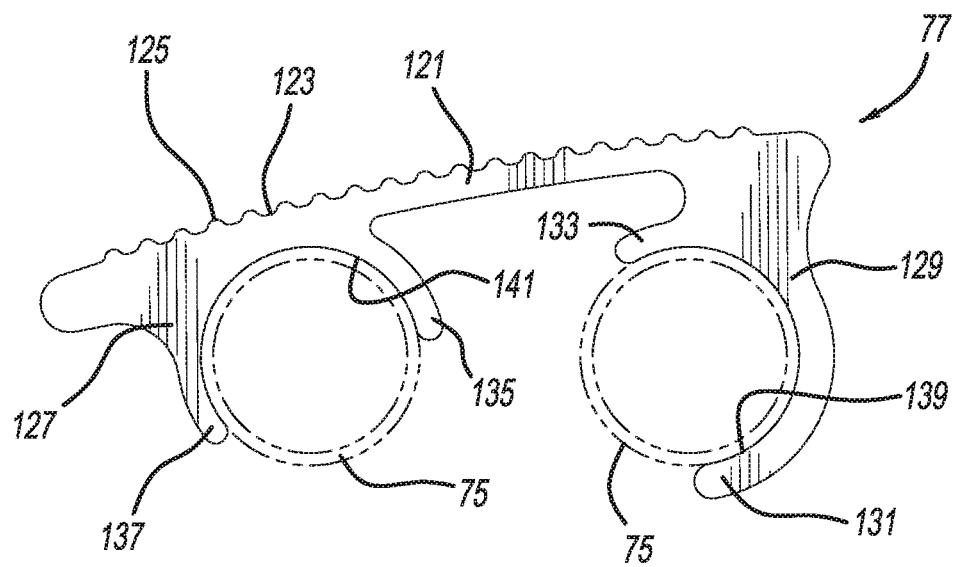
FIG. 11 is an end elevational view showing the first embodiment step employed with the ladder apparatus.
Figure 12:
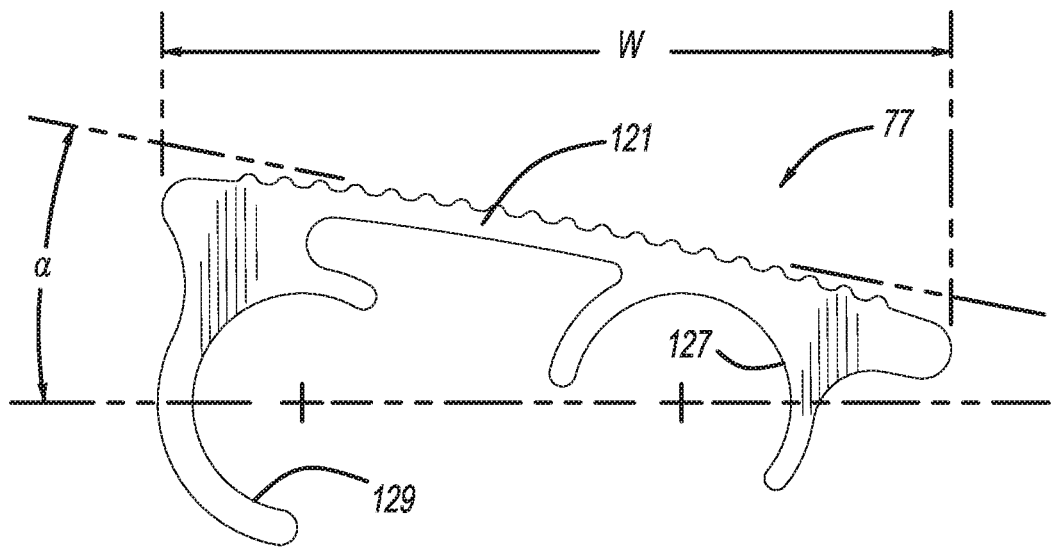
FIG. 12 is an end elevational view, taken opposite that of FIG. 11, showing the first embodiment step employed with the ladder apparatus.
Figure 15:
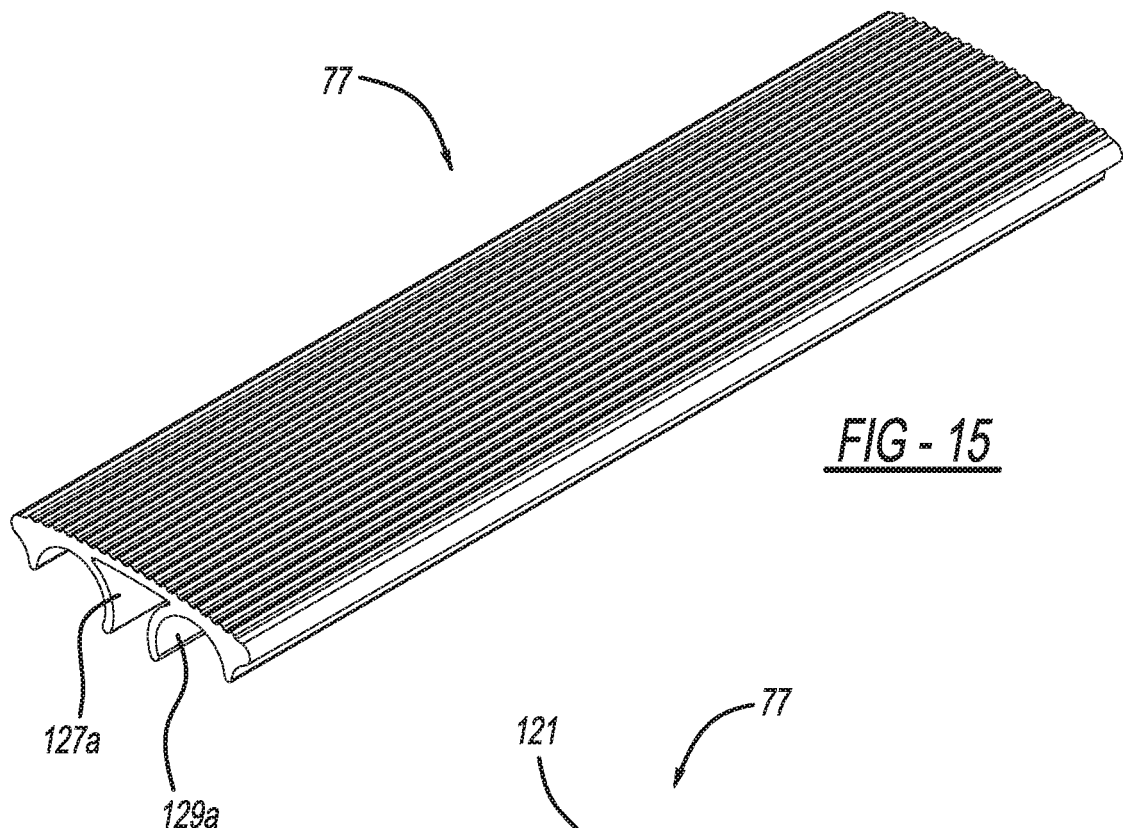
FIG. 15 is a perspective view showing a second embodiment of a snap-on step employed with the ladder apparatus.
Figure 16:
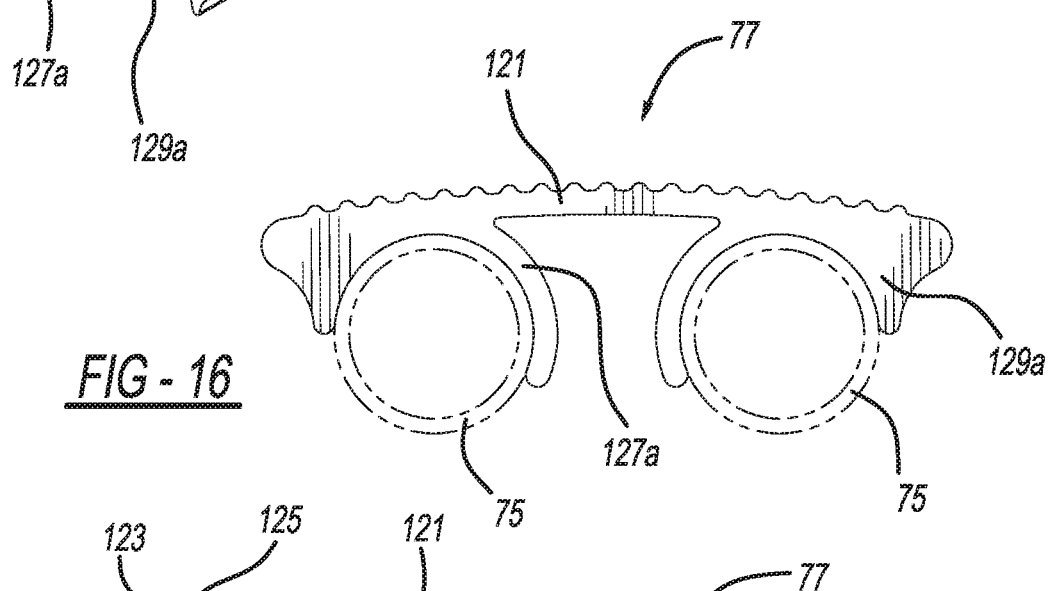
FIG. 16 is an end elevational view showing the second embodiment step employed with the ladder apparatus.
Figure 17:
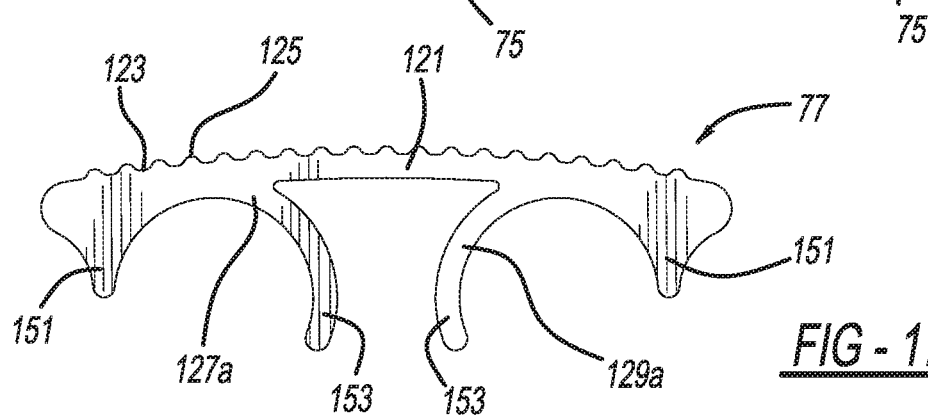
FIG. 17 is an end elevational view, taken opposite to that of FIG. 16, showing the second embodiment step employed with the ladder apparatus.
Figure 20:
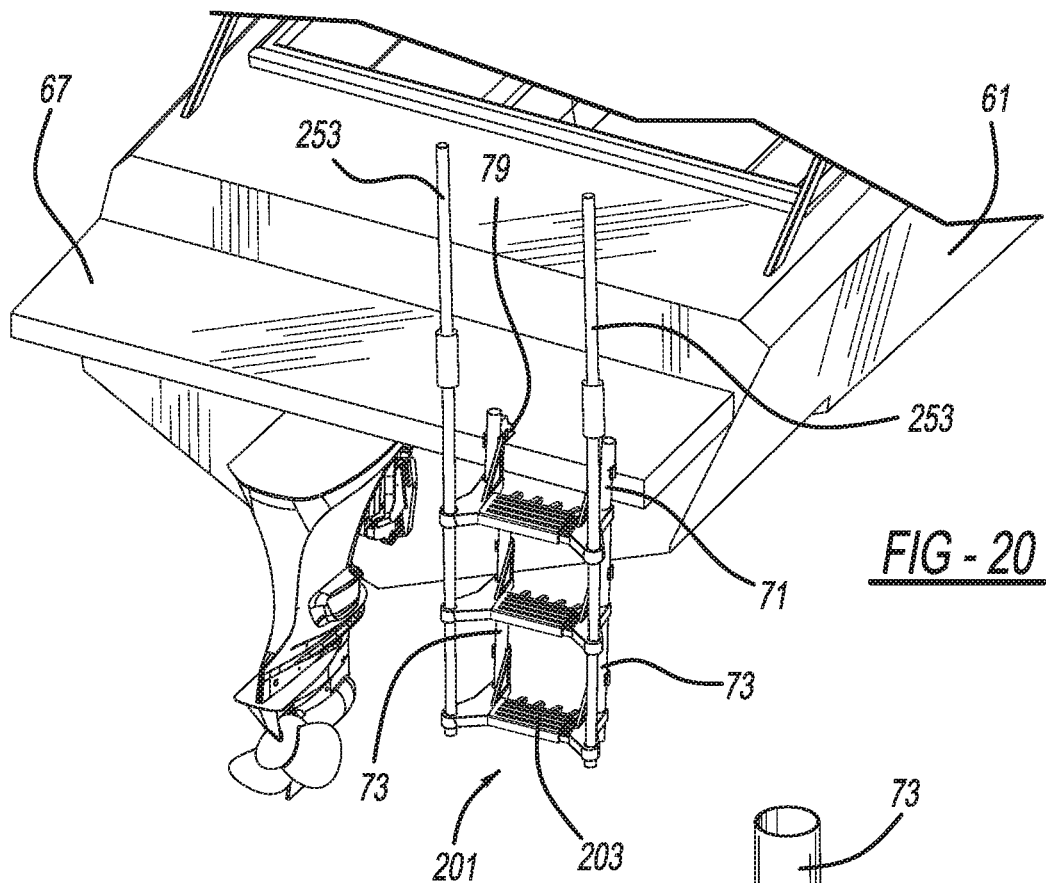
FIG. 20 is a fragmentary perspective view showing the boat employing a ladder apparatus with a first embodiment of an expandable retrofit step, in a functional position.
Figure 21:
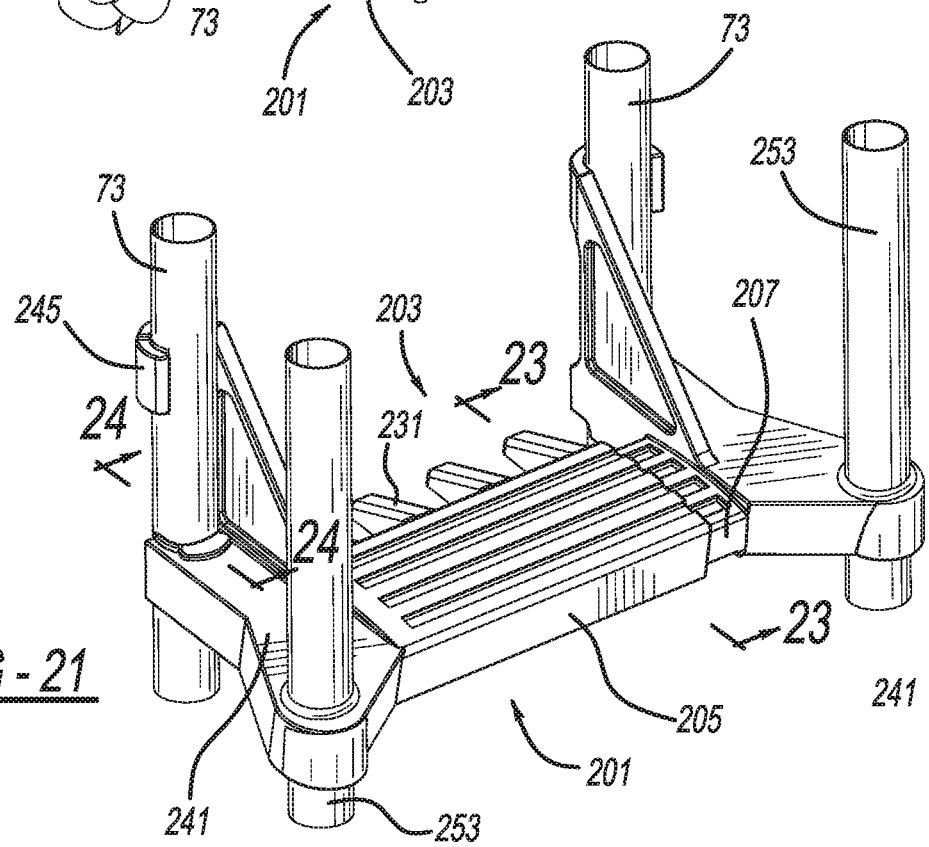
FIG. 21 is a perspective view showing the first embodiment expandable step employed with the ladder apparatus.

Referring to FIGS. 1 and 2, a recreational vehicle boat 61 includes a hull 63 and upper generally horizontal surfaces 65 and 67, forming part of a deck and swim platform, respectively. A ladder apparatus 69 is used to allow swimmers to climb out of the water and into boat 61. For all of the embodiments disclosed herein, ladder apparatus 69 includes a preexisting or original ladder 71 which has multiple tubular rails 73 on both the left and right sides which are telescopically extendable to a generally vertically elongated and functional orientation (shown in FIG. 2), to a collapsed and inboard-rotated generally horizontal orientation (shown in FIG. 1). Original tubular step structures 75 constitute preexisting steps between each pair of original rail sections 73 and are welded thereto. Furthermore, mounting brackets 79 are bolted, riveted or otherwise attached to horizontal surface 67 of boat 61. A bolt or other pivot pin 81 laterally extends through a center of each upper rail 73 and pivotably secures an upper portion of the upper rail 73 to the associated mounting bracket 79. An end cap is removed to expose a hollow internal opening 83 in each upper end of existing rail 73.

Ladder apparatus 69 additionally includes at least one and preferably two extension handles 85, as can be viewed in FIGS. 1-8. Each extension handle 85 is a hollow tubular member preferably made of aluminum or stainless steel, but alternately could be extruded from a polymeric material. A coupling lower end section 87 of each extension handle 85 has a pair of longitudinally elongated slots 89 openly accessible to its lower end 91. The slots are laterally aligned with and parallel to each other for each handle 85. An outer diameter of each lower coupling section 87 is slightly less than an inner diameter of the corresponding rail section 73 such that coupling end 87 can be linearly slid into the corresponding rail section 73. When inserted, pivot 81 is received within slots 89 such that at least three inches, and more preferably at least seven inches, of each slot 89 can be slid downwardly past pivot 81 when fully installed. Pivot 81 deters extension handle 85 from rotating about its longitudinal axis and, when taken in combination with the significant length of extension handle 85 that is inserted into rail 73, extension handle 85 is rigidly mounted to the existing ladder rail. It is noteworthy that extension handle 85 is inserted and removed from the preexisting ladder 71 in a manual, tool-free and fastener-free manner. Existing ladder 71 can be collapsed and rotated about its pivots 81 when stowed, after extension handles 85 are removed therefrom for separate stowage.

Furthermore, floatation structures are incorporated into each extension handle 85. Two different types of floatation structures are optionally included. A first is defined within an upper section 93 of each extension handle between a capped distal end 95 and an internal foam or other polymeric plug 97 inserted therein above slots 89. This provides an internal air pocket. A second floatation structure is an annular foam cylinder 99 which has an internal through-bore 101. Upper section 93 is slid into through-bore 101 of foam cylinder 99 in a snuggly fitting manner. Either or both of the aforementioned floatation structures may be employed depending on the material used for each extension handle to create water floatation thereof in case the user inadvertently drops the extension handle overboard.

Different configurations of the present extension handle 85 are employed. For example, FIG. 8 illustrates a longitudinally straight configuration where upper section 93 and lower coupling section 87 are vertically coaxial in its upstanding and lateral directions. This is beneficial as being inexpensive to manufacture and easy to stow. The configurations illustrated in FIGS. 2-4 and 6 employ a bend 103 in a middle section of each extension handle 85. This bend 103 is laterally offset along a plane defined by vertical centerlines of rails 73 outboard (in other words, rearward for a stern ladder) of the adjacent boat surface whether it be the rearmost boat surface 105 of the swim platform, deck or stern. This laterally offset and parallel orientation of the upper section relative to the lower coupling section of each extension handle 85 allows for greater width between the pair of extension handles as compared to the existing rails 73 thereby making it easier for larger adults to pass between the extension handles when entering the boat.

Moreover, the configuration of FIG. 5 provides both an inboard and laterally wider three-dimension bend 103 between upper section 93 and lower coupling section 87 of each extension handle 85. This embodiment allows for improved leverage against the extension handles 85 to allow the swimmer to pull himself or herself more easily inboard into the boat. The aforementioned slots, floatation structure and bends are interchangeably useable for all of these preceding and following ladder configurations, they may also be employed with ladders that are not telescopically extendable, and that are not pivotable relative to the boat, although certain advantages may not be achieved. All of the present extension handles are also usable with preexisting original or wheeled recreational vehicle ladders to access roof storage. Furthermore, the bent configurations are also aesthetically pleasing.

Reference should now be made to FIGS. 9-14 which illustrate a first embodiment of a snap-in step 77 of the present ladder apparatus 69. Step 77 includes an upper tread wall 121 upon which are multiple laterally elongated grooves 123 and ridges 125 defining a slip-resistant tread pattern on an upper surface thereof for gripping by the swimmer's feet when using the preexisting boat-mounted ladder 71. Step 77 further includes a pair of tube-receiving formations or receptacles 127 and 129 each being defined by a pair of flexible projections 131, 133, 135 and 137. Interior cavity surfaces 139 and 141 of receptacles 129 and 127, respectively, have an arcuate and generally semi-circular cross-sectional shape, and are adapted to snap onto preexisting tubular step structures 75 of preexisting ladder 71 in a fastener-free manner. Thus, each receptacle engages opposite sides of the corresponding tube. At least one of the projections, such as 131, is elongated longer in a cross-sectional view than the corresponding opposed projection, such as 133.

In this embodiment, a bottom surface of receptacle 129 is positioned lower than a bottom-most surface of receptacle 127. Furthermore, a neck is located between a top of receptacle 129 and tread wall 121. This provides an ergonomically desirable tilt α of at least 5° and more preferably at least 10°, from a tangent of a middle point of upper tread surface when it is arcuate (or a plane if flat) relative to a horizontal plane defined between laterally elongated centerlines of receptacles 129 and 127. The preferred arcuate end-view nature of the upper tread surface provides a neutral or generally horizontal planar portion upon which the feet contact regardless of off-vertical tilting of the ladder. Step 77 is preferably extruded from a polypropylene or TPE polymeric material (although other materials may be used) and is flexible to allow the receptacles to be snapped onto a middle section of each preexisting metal tube 75 in a retrofit manner.

The present step 77 advantageously provides a larger surface area and also a larger inboard-outboard width W. The apex of angle α is outboard away from the boat to achieve easier foot entry. A laterally elongated access opening of receptacle 127 faces forwardly toward the boat and generally perpendicularly to elongated access opening of receptacle 129 which is predominantly downwardly facing toward the water. This provides a pivoting snapping installation of step 77 onto tubes 75 to ease assembly. This step provides a greater and more comfortable gripping surface for the swimmer's feet as compared to traditional thinner width treads or slippery tubes. The present step is also more secure when installed as compared to most conventional tread inserts. The exposed upper, inboard and outboard surfaces of tread wall 121, the neck and exposed surfaces of projections 137 and 131, additionally provide an aesthetically pleasing and ornamental design.

Another embodiment of step 77 is illustrated in FIGS. 15-19. This embodiment step 77 is essentially the same as that of the prior embodiment except that the present one employs essentially downwardly facing access slots for each receptacle 127a and 129a. Nevertheless, projections 151, closest to inboard and outboard edges are shorter and less flexible than are the opposed projections 153 of each tube-receiving receptacle. The different lengths and stiffnesses of projections create improved attachment forces of step relative to the underlying tube structures 75 as compared to if the projections were all of the same length and flexibility. Receptacles 127a and 129a are mirror images of each other. This tread surface of step 77 lies flatter upon tube structure 75 than did the prior embodiment but for the curved side-view shape which provides a visually appealing exterior shape.

Thus, both embodiments of the snap-on step advantageously achieve aesthetic as well as functional advantages over the prior traditional small treads. It should also be appreciated that alternate tread patterns can be employed such as a knurl pattern, herringbone pattern, repeating square pattern, repeating raised pyramidical pattern, repeating raised dome pattern, or the like. While at least ten elongated and parallel grooves are preferred, more can be employed.

An expandable step aspect of the present ladder apparatus 201 is illustrated in FIGS. 20-38. More specifically, a first embodiment expandable step 203 is illustrated in FIGS. 20-26. Preexisting original ladder 71 is rotatably mounted to boat 61 as previously described hereinabove. Multiples of expandable step 203 are retrofit mounted to original vertically oriented rails 73 and original horizontally oriented steps 75 in a snap-on, tool-free and fastener-free manner.

Each expandable step 203 includes a laterally elongated outer sub-step 205 and a laterally elongated inner sub-step 207. Outer sub-step 205 is defined by a closed, generally rectangular or D-shaped cross-sectional wall which defines a hollow central cavity 209 therein. Outer sub-step 205 further includes an upper tread surface 211 defined by an anti-slip and foot grippable pattern such as multiple alternating grooves 213 and ridges 215 which are laterally elongated and parallel to each other. Relief apertures may optionally be provided in a bottom of outer sub-step 205 for cost and weight savings if injection molded. A plurality of spaced apart teeth 231 project from a boat-facing inboard edge of outer sub-step 205. A tapered upper surface 233 and backside ribs 235 are also provided on each tooth 231. This has both aesthetic and functional benefits.

Furthermore, inner sub-step 207 has an upper tread surface 217 defined by parallel, alternating ridges 219 and grooves 221 laterally elongated thereon. Inner sub-step 207 has a plurality of downwardly extending ribs along an underside thereof if injection molded. Inner sub-step 207 linearly and laterally slides into and out of hollow cavity 209 of outer sub-step 205 in a telescopic manner. Floatation foam may optionally be attached to an underside of inner sub-step 207.

Injection molded end sections 241 attach to proximal ends of sub-steps 205 and 207 in a snap-fit manner or with separate fasteners such as screws or rivets. The end section-to-sub-step assembly is done in the factory and need not be done by the boat user. Each end section 241 has a generally triangularly shaped gusset 243 upstanding from a top surface thereof. A clasp or hook 245 is mounted to an inboard edge of gusset 243 in an integrally single piece molded manner. Each hook 245 has an internal surface of a generally semi-circular or C-cross-sectional shape 247. Furthermore, a generally semi-circular or C-shaped surface 248 also defines a recess in a boat-facing inboard surface of each end section 241 below gusset 243. Accessible openings in each hook 245 and recess 248 for each side generally face toward each other, and vertical centerlines through hook 245 and recess 248 are coaxially aligned and generally perpendicular to a nominal plane or median tangent of sub-steps 205 and 207.

Polymeric or rubber inserts 249 of differing internal diameters and shapes are optionally insertable into the internal surfaces of each hook 245 and recess 248 to allow for snug engagement to a corresponding preexisting original rail 73. FIG. 24 shows insert 249 as having a circular internal and external cross-sectional shape and an alternate embodiment is shown in FIG. 25 as having a square or rectangular internal cross-sectional shape. It should also be appreciated that oval or other rail shapes may also be employed. Differing internal diameter inserts 249 also allow for engagement of hooks 245 and recesses 248 with the different diameters of each smaller telescopic rail of original ladder 71.

Moreover, a through-hole 251 is provided within a flange of each end section 241. A straight tubular handle 253 is inserted through the aligned holes 251 of the multiple expandable steps 203 and the handle is temporarily retained in place by an annular collar 255 affixed to handle 253 adjacent an upper surface of the top expandable step. Supplemental handles 253 provide additional stability to each retrofit expandable step 203 such that a pair of steps, a rail and a handle on each side define a four bar linkage-type mechanism.

Figure 26:
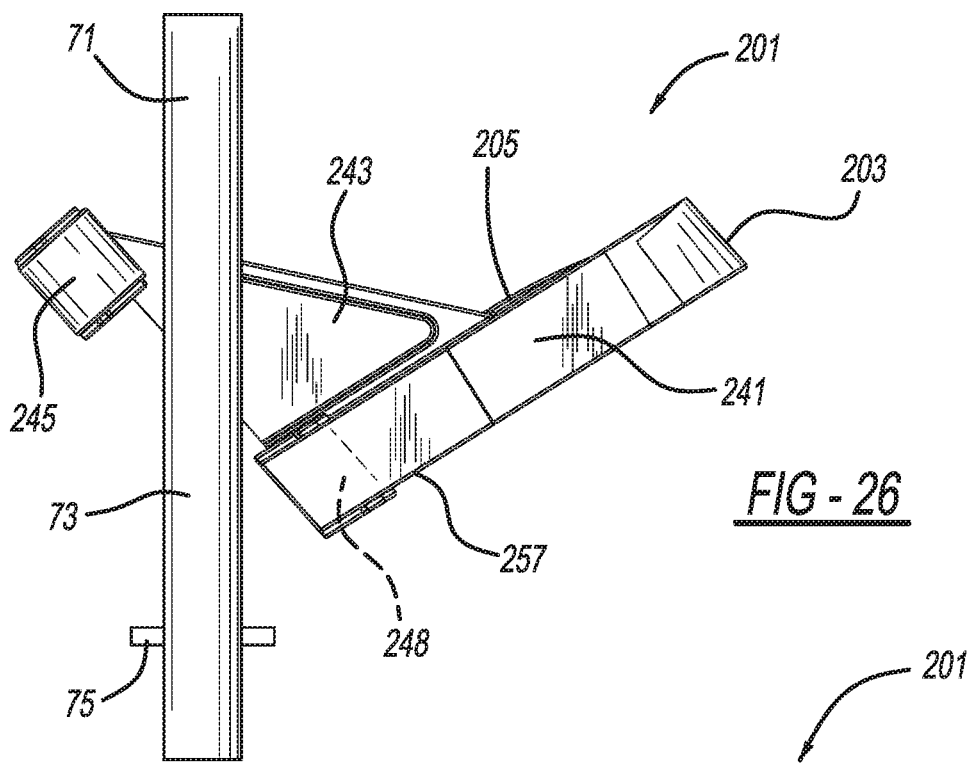
FIG. 26 is a side elevational view showing the first embodiment expandable step employed with the ladder apparatus, in a partially installed orientation.

Referring now to FIGS. 23 and 26, snap-on installation of each expandable step 203 requires the user to first position hooks 245 on a boat-facing side of existing rails 73 while recesses 248 are aligned on an opposite outboard side of rails 73. A lower abutment surface 257 of outer sub-step 205 and/or teeth 231 is positioned above and outboard of pre-existing step 75 for initiation of installation. Subsequently, the user rotates expandable step 203 such that hooks 245 snuggly engage inboard sides of original rails 73 while outboard sides of the original rails are snuggly engaged within recesses 248. Simultaneously, abutment surface 257 of expandable step 203 rests on top of and contacts against the associated original step 75. Thus, when a swimmer steps upon expandable step 203, the swimmer's weight is transferred from tread surface 211 to end sections 241, into existing rail 73 via cantilevering forces provided through hooks 245 and recesses 248, and also to existing step 75. It is noteworthy that expandable step 203 can be easily removed and stowed by simply linearly sliding out supplemental handles 253 from end sections 241 and then reverse pivoting of expandable step 203 to disengage original step 75 and rails 73. Then the preexisting ladder can be telescopically collapsed and pivoted onboard the boat. Furthermore, sub-steps 205 and 207 and advantageously provide a wider W inboard-outboard surface area which is easier for a foot to grip and more comfortable than prior skinny step or tread constructions. The sub-steps, end sections, gussets, hooks and inserts are preferably made from a polymeric material which can float in water if inadvertently dropped off of the boat.

Figure 27:
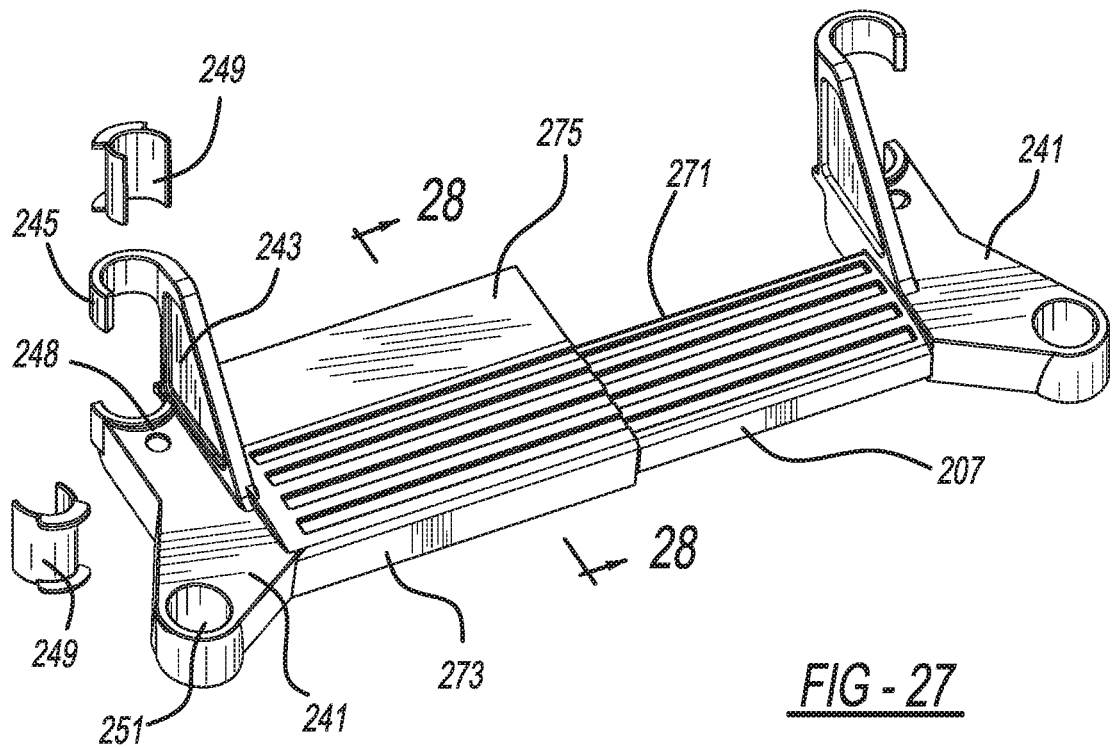
FIG. 27 is a partially exploded perspective view showing a second embodiment of an expandable step employed with the ladder apparatus.
Figure 28:
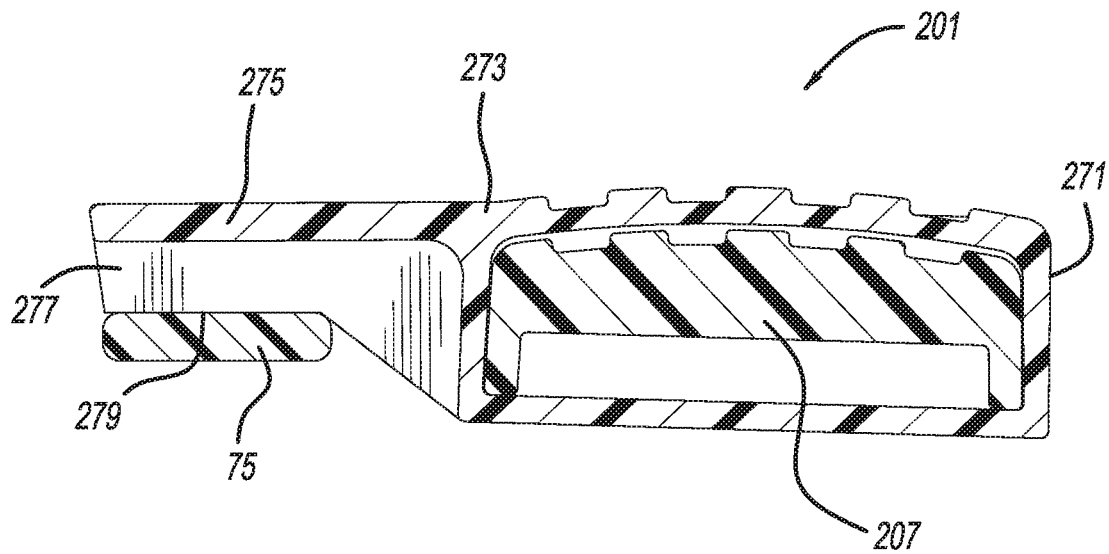
FIG. 28 is a cross-sectional view, taken along line 28-28 of FIG. 27, showing the second embodiment expandable step employed with the ladder apparatus.

As illustrated in FIGS. 27 and 28, another embodiment of ladder apparatus 201 employs an expandable step 271 like that of the prior embodiment, however, an outer sub-step 273 includes a generally flat upper extension wall 275 from which a set of spaced apart structural ribs 277 downwardly project, approximately half a vertical thickness of the overall outer sub-step 273. An abutment surface 279 located at a bottom of ribs 277 contacts upon existing step 75 when installed. This version provides additional foot contacting surface area which may optionally have a set of tread grooves and ridges on the upper surface thereof.

Figure 29:
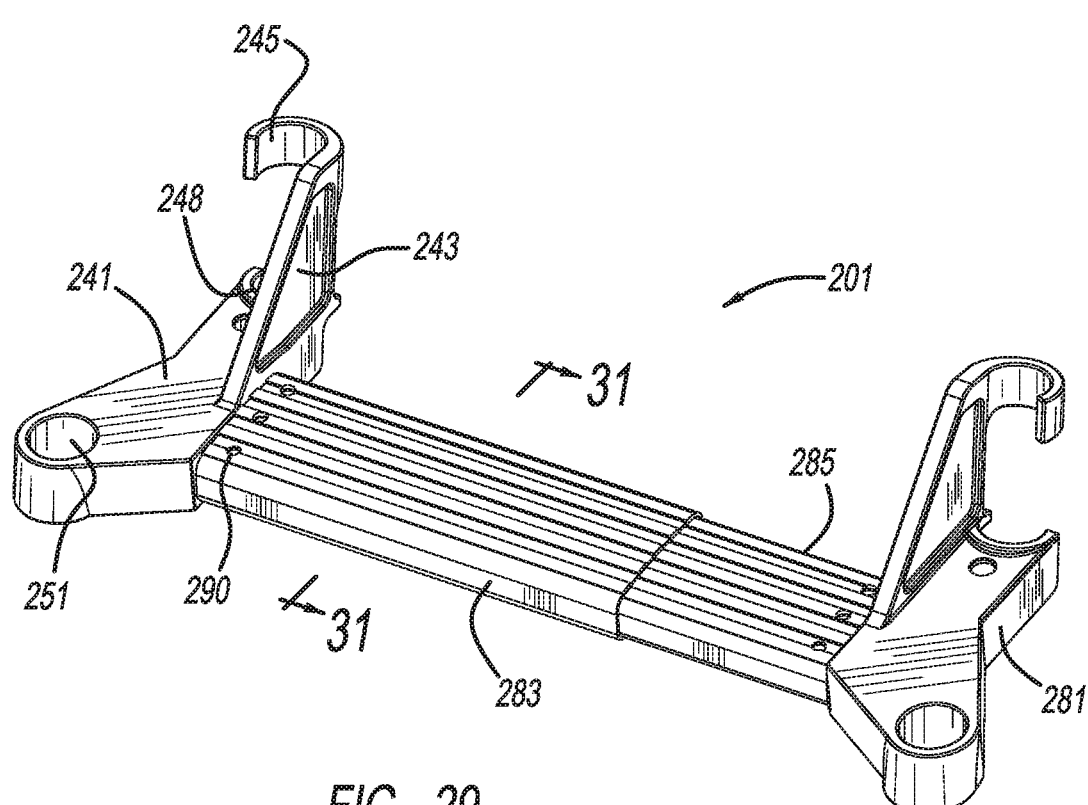
FIG. 29 is a perspective view showing a third embodiment of an expandable step employed with the ladder apparatus.
Figure 30:
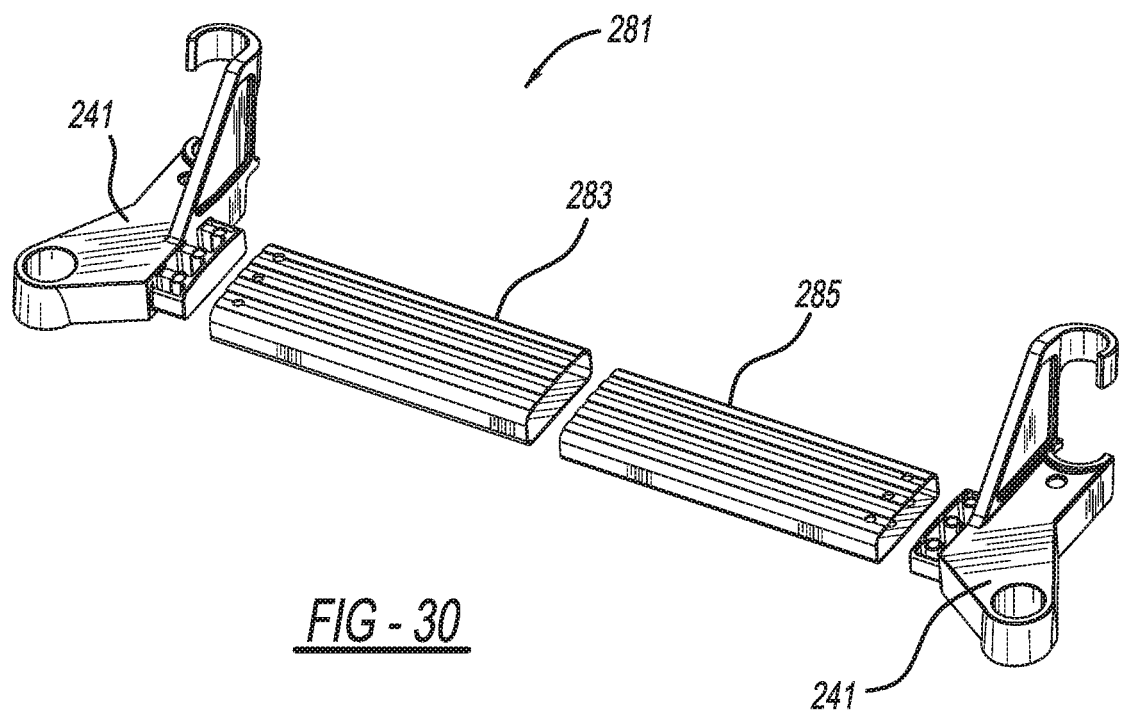
FIG. 30 is an exploded perspective view showing the third embodiment expandable step employed with the ladder apparatus.
Figure 31:
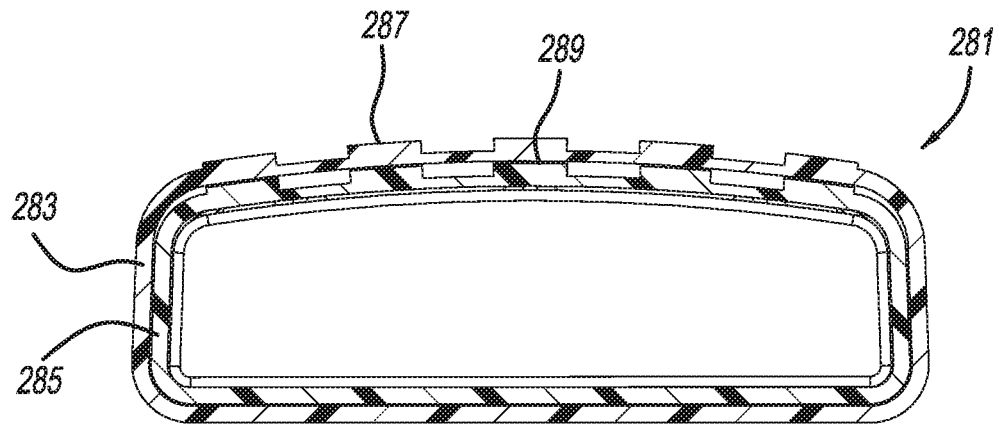
FIG. 31 is a cross-sectional view, taken along line 31-31 of FIG. 29, showing the third embodiment expandable step employed with the ladder apparatus.
Figure 32:
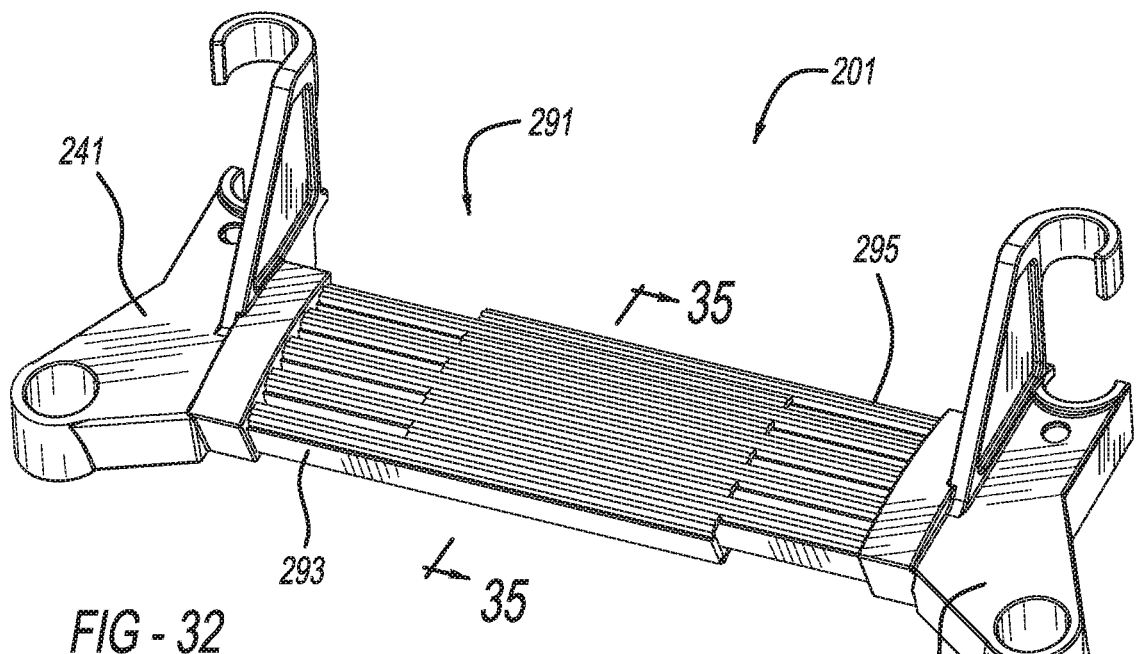
FIG. 32 is a perspective view showing a fourth embodiment of an expandable step employed with the ladder apparatus.
Figure 33:
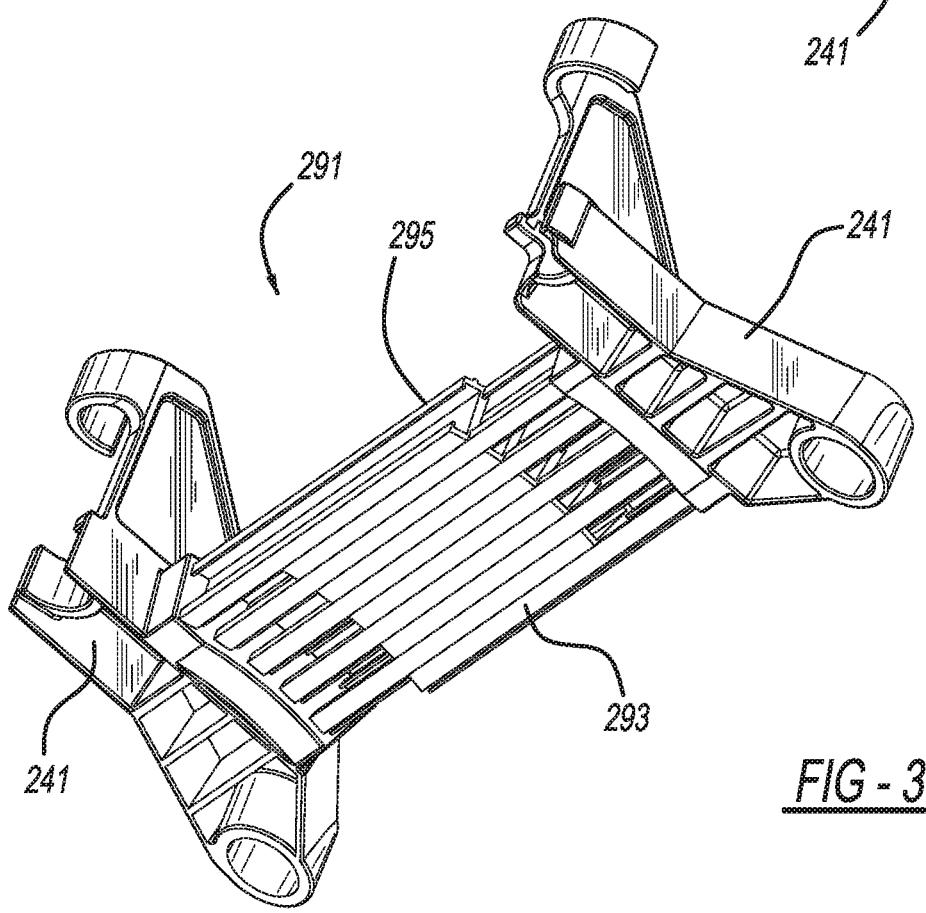
FIG. 33 is a perspective view, taken opposite that of FIG. 32, showing the fourth embodiment expandable step employed with the ladder apparatus.

Referring to FIGS. 29-31, another embodiment of an expandable step 281 of ladder apparatus 201 employs an extruded outer sub-step 283 and an extruded inner sub-step 285 which are telescopically expandable to each other. Outer sub-step 283 has a uniform and constant cross-sectional shape and a hollow center while inner sub-step 285 also has a constant and uniform cross-sectional shape with a hollow center. The cross-sectional shapes of inner and outer sub-steps 283 and 285, respectively, are of a generally rectangular or D-cross-sectional shape with elongated, parallel grooved and ridged tread surfaces 287 and 289 on tops thereof. Fasteners 290, such as rivets or screws, brazing (if metal) or sonic welding (if polymeric) may be used to secure proximal ends of sub-steps 283 and 285 to their respective end sections 241 in a factory, pre-assembled manner. The sub-steps are preferably aluminum with an anodized hard coating, but may alternately be of a polymeric material. End sections 241 are otherwise essentially the same as that in the prior embodiments. This extruded embodiment is lower cost to manufacture and tool, however, the prior injection molded embodiments provide more structural rigidity and support. Foam and/or end caps (with an air pocket therebetween) may optionally be added within the inner sub-step to assist with floatation.

Another variation of expandable steps 281 is shown in FIGS. 52-55. Sub-steps 283 and 285 and injection molded end sections 241 are essentially like that in FIGS. 29-31. Steps 283 and 285 are outwardly spaced away from original boat-mounted tubular steps 75 by gap G. Furthermore, the original steps 75 fit within a notched out receptacle 601 in each bottom inboard corner of end sections 241. Notched receptacles 601 provide more use stability while reducing weight, material costs and manufacturing complexity as compared to the overlapping embodiments shown in FIGS. 23 and 28, by way of comparison.

Additionally, a foam, rubber or soft elastomeric polymer cover 603 is mounted upon upper, inboard and outboard walls of each outer sub-step 285. Cover 603 can be co-extrusionally molded or adhesively bonded to each more rigid sub-step 285 if permanent attachment is desired. Alternately, cover 603 can be injection molded if an irregular tread pattern 605 and/or text 607 is desired, and then either adhesively or mechanically fastened, such as by rivets or screws, to the outer sub-steps. Moreover, screws, which may be countersunk below the outer surfaces of the cover, provide removable mounting advantages. Sub-steps 283 and 285 have a uniform and hollow cross-sectional shape and are preferred extruded metal such as aluminum. Alternately, the sub-steps can be extruded or injection molded from a polymeric material.

Reference should now be made to FIGS. 32-35 for yet another embodiment of ladder apparatus 201. This expandable step embodiment 291 includes multiple left-side beams 293 and multiple right-side beams 295 which laterally slide relative to each other to expand or contract. Each beam is an extruded and laterally elongated member having a generally C-cross-sectional shape with a hollow center 297. Each beam includes inwardly projecting and generally vertically facing fingers 299 adjacent an elongated opening thereof. A generally vertically elongated and straight spine 301, opposite the opening of each beam, includes an undercut channel 303 at upper and lower portions thereof. Thus, fingers 299 of one set of beams engage with channels 303 of the immediately adjacent beams in a slideable tongue-in-groove like manner. Ridges 305 and/or grooves are provided on an upper surface of each beam to create a tread surface or pattern, which is above the tongue-in-groove interlocks to reduce inadvertent foot pinching. Each beam has a uniform and constant cross-sectional shape, and is preferably extruded from aluminum or alternately a polymeric material. Proximal ends of the beams are pre-assembled to their adjacent end sections 241 via snap-fit, screw or rivet fasteners, or by welding. End sections 241 are otherwise identical to those previously discussed hereinabove. This expandable step embodiment is advantageous in that sub-step beams 293 and 295 provide a substantially coplanar (or constant if curved) tread surface without a varying height therebetween when the sub-steps are expanded.

FIG. 36 illustrates a further embodiment of ladder apparatus 201. In this embodiment, outer sub-step 321 is optionally integrally molded with end section 323. Similarly, inner sub-step 325 is integrally molded with its end section 327. However, holes for a supplemental handle are not provided with this embodiment. It should be appreciated that the features of this embodiment may be mixed and matched with any of the prior expandable step embodiments and vice versa.

An alternate embodiment of an expandable step 241 of ladder apparatus 201 is shown in FIGS. 37 and 38. Expandable sub-steps 243 and 245 are telescopically expandable or contractible relative to each other. Upstanding collar formations or clasps 247 are either integrally molded with or separately created and coupled to the proximal ends of each sub-step 243 and 245 with laterally and outwardly facing openings. Fasteners 249, such as screws or rivets, or sonic welding, may be used to couple clasps 247 to each sub-step. Each clasp 247 has a generally semi-circular or C-cross-sectional shape which coincides with half of an outer diameter of original preexisting rail 73. Inserts of differing diameters or shapes may optionally be provided as previously discussed herein. A flexible polymeric or fabric strap 252 is removably attached to a clasp-mounted attachment 253, such as a barb, buckle, snap or Velcro® hook-and-loop fastener, surrounding the side of original rail 73 opposite clasp 247. A bottom abutment surface of outer sub-step 243 rests upon the smaller original step when installed.

All of the preceding expandable step embodiments allow for lateral size adjustability depending upon the specific preexisting rail spacing to which the expandable step is being retrofit thereto, since such varies ladder-to-ladder. The present expandable step embodiments are ideally suited for retrofit use with telescopically collapsible existing ladders where the rail diameters are of differing sizes. Moreover, it should also be appreciated that the expandable steps of the present embodiments may be used with fixed ladders that do not rotate and also with wheeled recreational vehicle ladders.

FIGS. 39-46 pertain to a retrofit telescopic ladder 351 attached to a preexisting original boat-mounted ladder 353 of a ladder apparatus 355. Existing original ladder 353 has telescoping rails 357, the uppermost of which is mounted to boat-attached brackets 359 via pivot pins 361. Horizontally elongated tubular metal, or alternately molded polymeric original steps 363 laterally span between rails 353 of each telescopic subsection.

Retrofit or supplemental ladder 351 includes multiple telescopic supplemental rails 371 on each side, for example at least three rail subsections and more preferably at least four rail subsections. Enlarged steps 373 are permanently mounted, such as by welding or brazing, to supplemental rails 371 wherein there is preferably one supplemental step 373 for each telescopic rail subsection. Thus, the rail subsections and steps of retrofit supplemental ladder 351 can be expanded for generally vertical functional use as shown in FIG. 42 or collapsed for stowage as shown in FIG. 34.

Each supplemental step 373 preferably has a generally flat middle portion 381, a downwardly or reverse turned outboard edge portion 383 and a downwardly bent or offset turned inboard edge portion 385. Downwardly turned inboard portion 385 of each step defines a laterally elongated hook laterally spaced toward a center between supplemental rails 371. Hooks 385 are removably positioned on top and inboard of each corresponding original step 363 of original ladder 353 when installed. The telescopic nature of retrofit supplemental ladder 351 allows for different vertical supplemental step-to-supplemental step 373 spacing variations between existing steps 363 of existing ladder constructions; for example, if expanded existing step-to-step 363 spacing is smaller than average then rails 371 and steps 373 of retrofit supplemental ladder may not need to be fully expanded in order for the uppermost two or three hooks 385 to be securely engaged to original steps 363.

FIGS. 44-46 show a clamp 391 mounted to an underside surface 401 of an uppermost step 373 of retrofit supplemental ladder 351. Clamp 391 includes a mounting bracket 393, a manually actuatable handle 395, an overcenter linkage assembly 397 and an abutment clamping bumper 399. When the boat user rotates handle 395 from the unclamping position, as illustrated in FIG. 45, to the clamping positions of FIGS. 44 and 46, abutment bumper 399 will compress existing step 363 between it and underside surface 401 of supplemental step 373. It should be appreciated, however, that other clamping constructions may be employed.

Each supplemental step 373 is preferably stamped from aluminum or stainless steel, but may alternately be injection molded, extruded or compression molded from a polymeric material. Tread patterns may be stamped or molded into an upper surface thereof or a high-friction coating or applique may be alternately adhesively bonded upon middle portion 381 of each step 373. Hook portion 385 is laterally smaller than a majority of middle step portion 381 and outboard edge portion 373 of each step to allow the hook portion to more easily fit between different spacing rails of the existing ladder. Furthermore, a majority of each step is outboard of the retrofit and existing rails 371 and 357, respectively. It is also optionally envisioned that holes and supplemental upwardly elongated handles can be employed in the supplemental steps to add stability.

Retrofit supplemental ladder 351 of the present ladder apparatus 355 advantageously provides a larger foot gripping surface area, a more comfortable step area and better foot accessibility to each step as compared to the existing and prior ladders. Furthermore, the present retrofit supplemental ladder optionally provides a greater quantity of steps and steps positioned lower into the water than existing and prior ladder constructions, but while allowing easy removability for stowage of the existing and retrofit ladders.

FIGS. 41-43 illustrate an extension handle 421 integrally welded as a single piece with an uppermost one of supplemental rails 371. Extension handle 421 has a vertically and longitudinally elongated segment 423 which is offset from but parallel to a longitudinal vertical centerline of the corresponding supplemental rail 371 of retrofit supplemental ladder 351. Extension handle 421 is shown on only one side of retrofit supplemental ladder 351; however, such extension handles 421 may be positioned for both supplemental rails 371.

Figure 51:
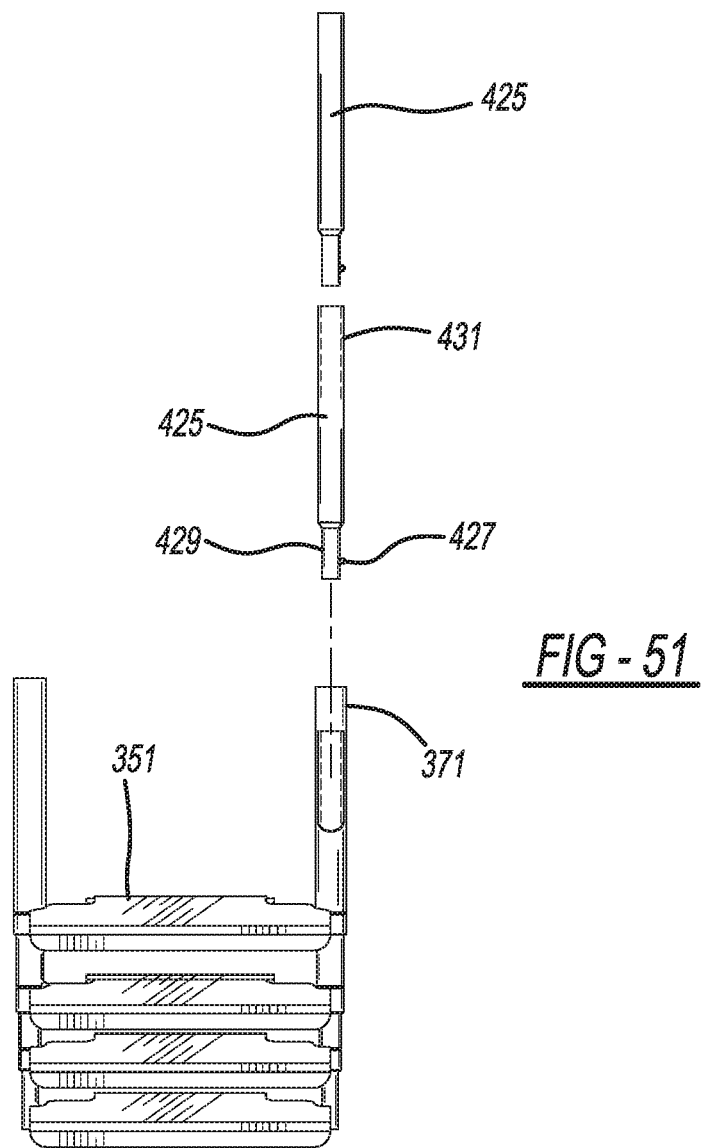
FIG. 51 is a rear elevational view showing a fifth embodiment of a telescopic retrofit ladder employed with the ladder apparatus, shown in a collapsed orientation.
Figure 52:
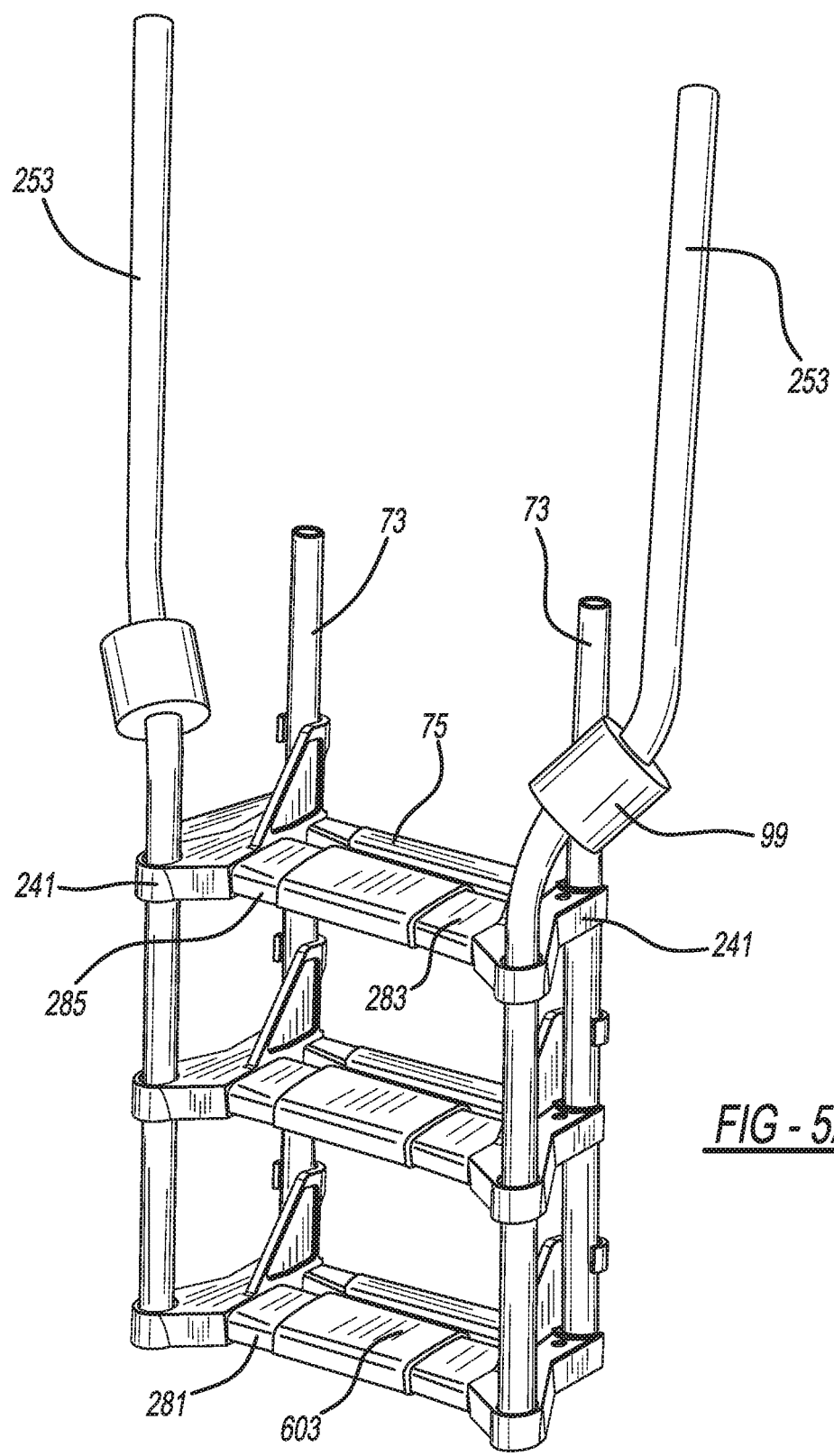
FIG. 52 is a perspective view showing another embodiment of an expandable step employed with the ladder apparatus.
Figure 53:
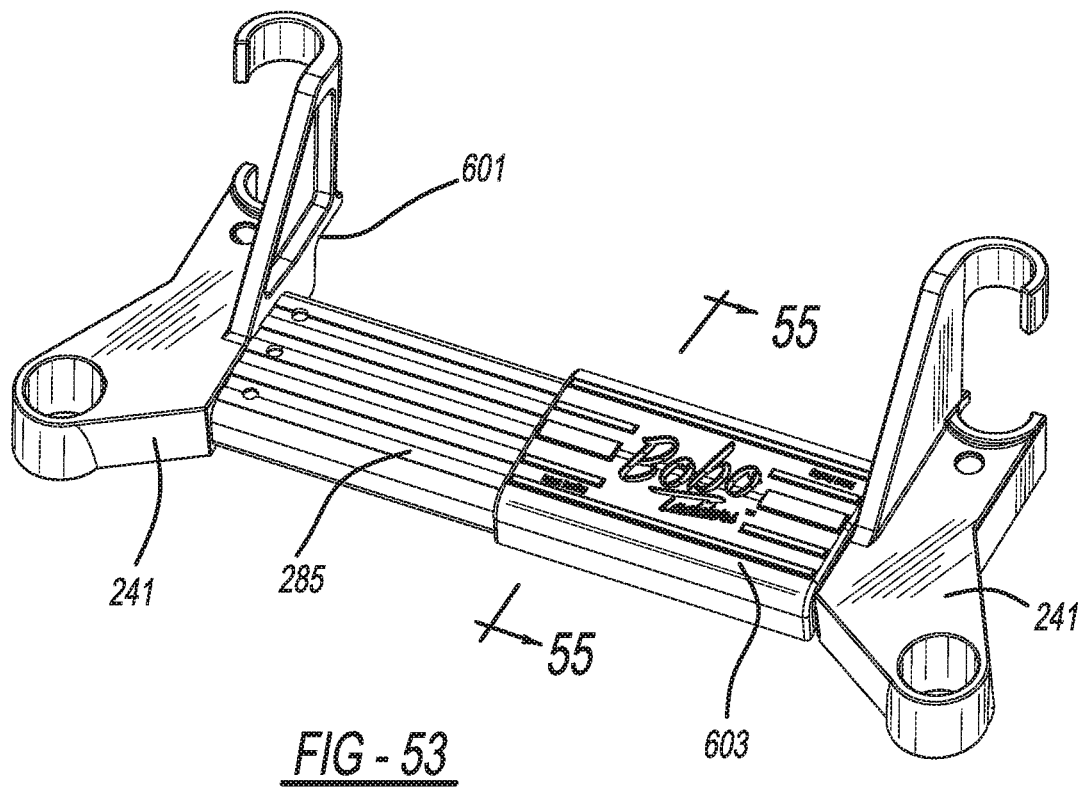
FIG. 53 is a perspective view showing the FIG. 52 embodiment expandable step employed with the ladder apparatus.
Figure 54:
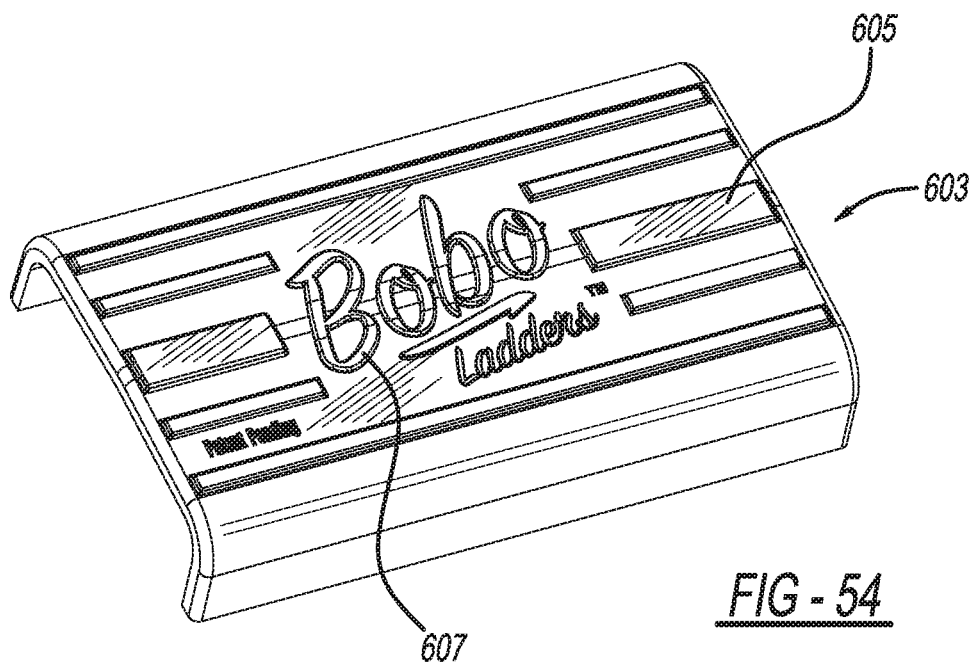
FIG. 54 is a perspective view showing a cover employed with any of the step embodiments of the ladder apparatus.
Figure 55:
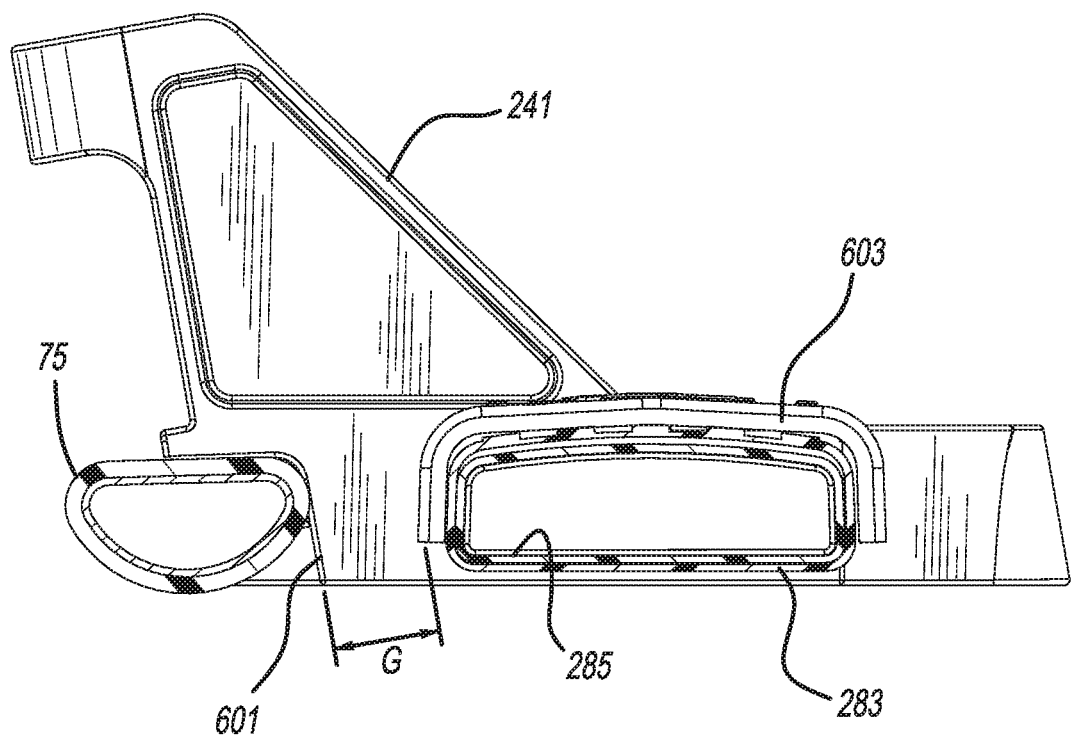
FIG. 55 is a cross-sectional view, taken along line 55-55 of FIG. 53, showing the expandable step and cover employed with the ladder apparatus.
Figure 60:
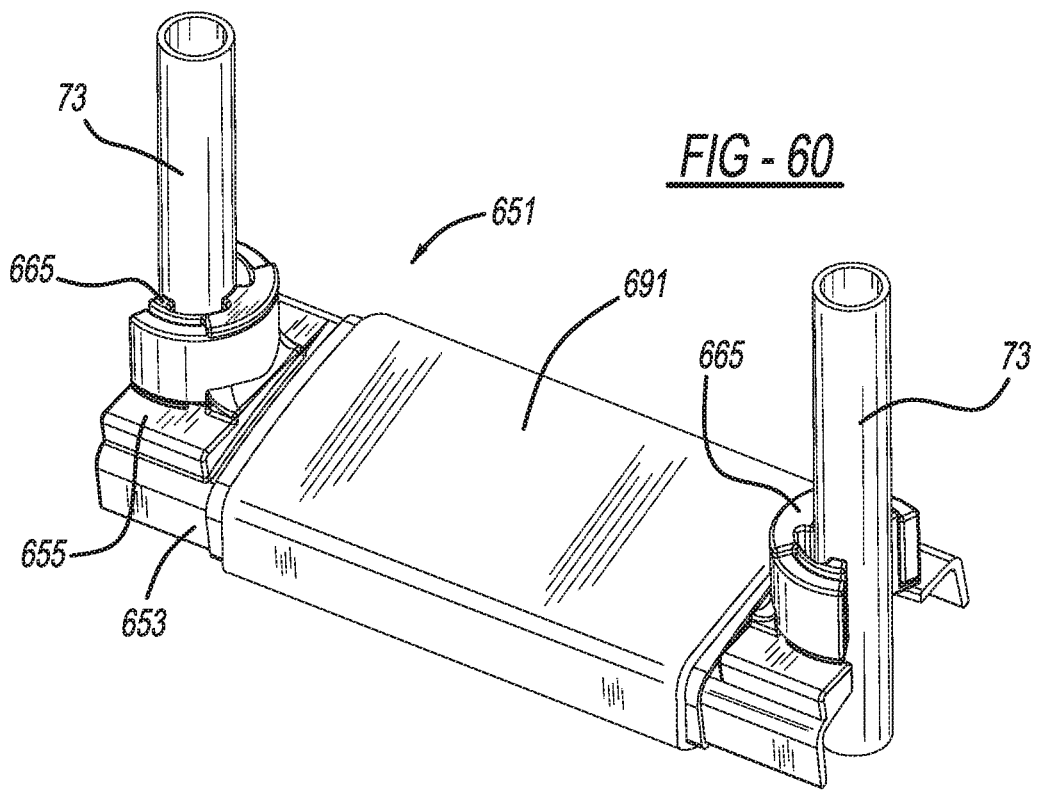
FIG. 60 is a perspective view showing another embodiment of an expandable step employed with a ladder apparatus.
Figure 61:
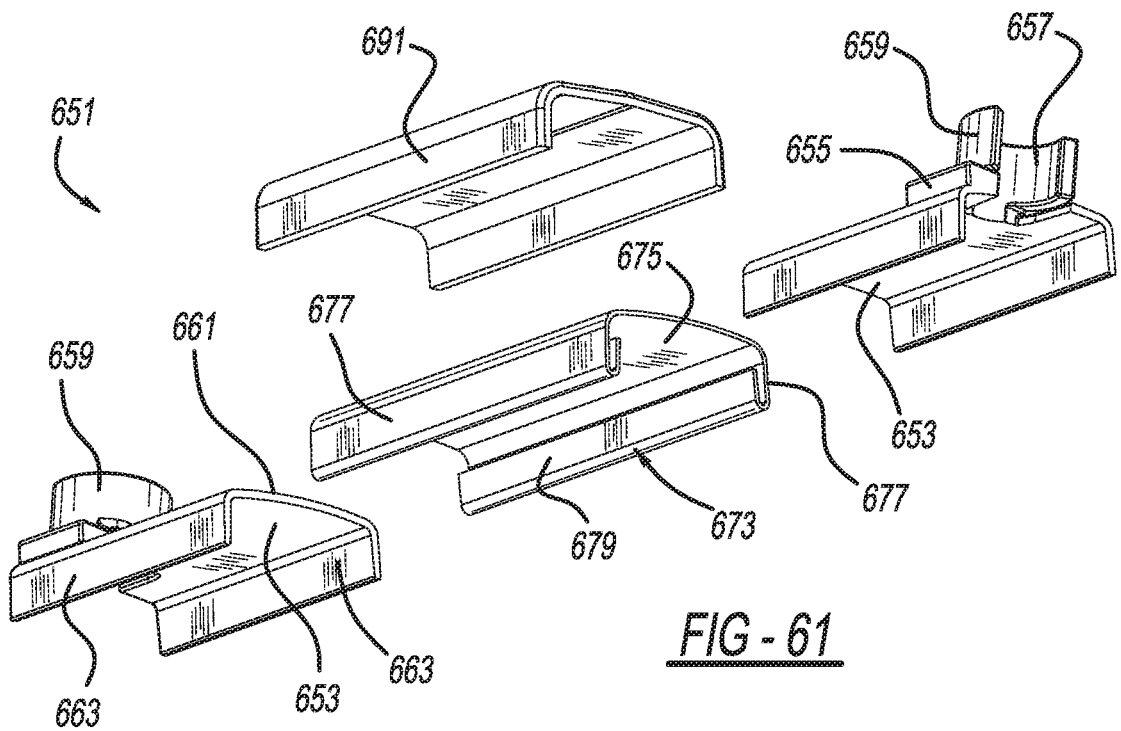
FIG. 61 is an exploded perspective view showing the FIG. 60 embodiment expandable step employed with the ladder apparatus.
Figure 64:
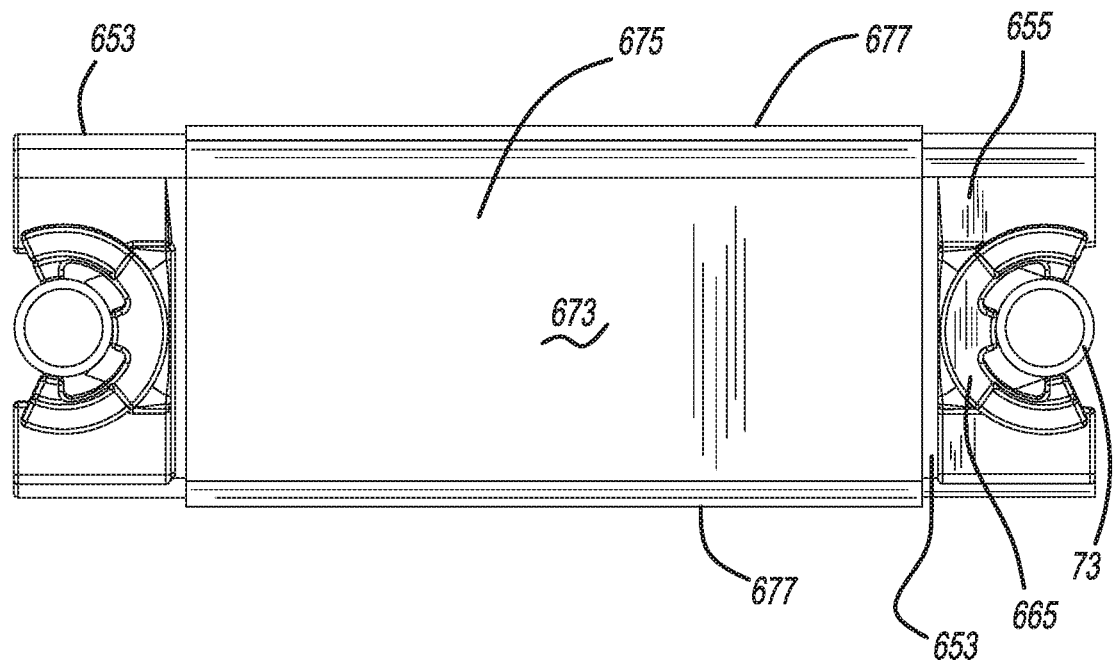
FIG. 64 is a top elevational view showing the FIG. 60 embodiment expandable step employed with the ladder apparatus, shown in the contracted position.
Figure 65:
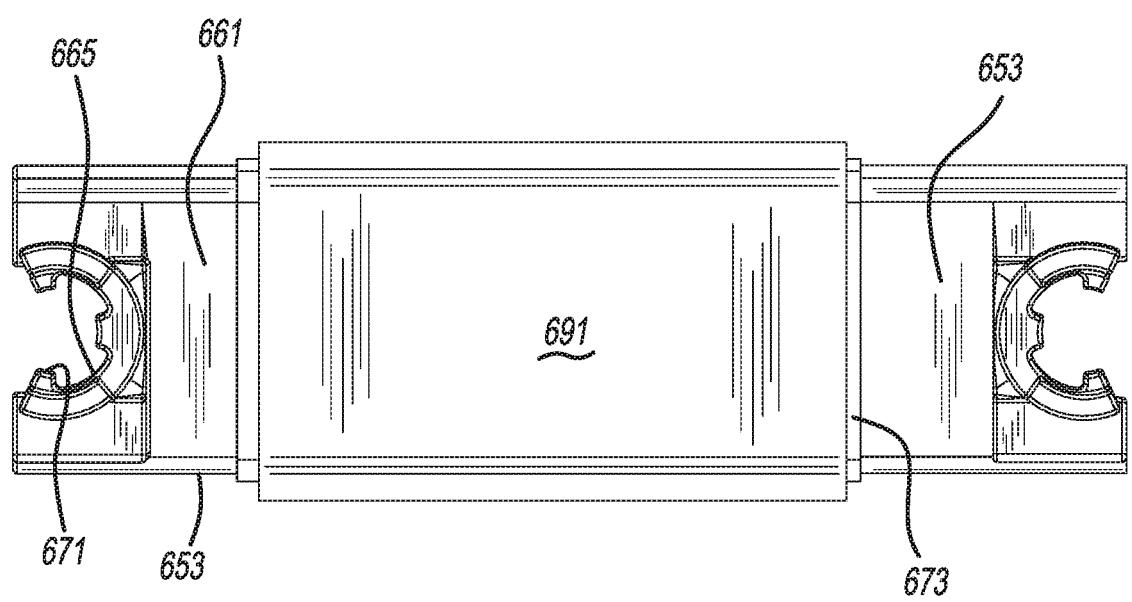
FIG. 65 is a top elevational view showing the FIG. 60 embodiment expandable step employed with the ladder apparatus, shown in the expanded position.
Figure 66:
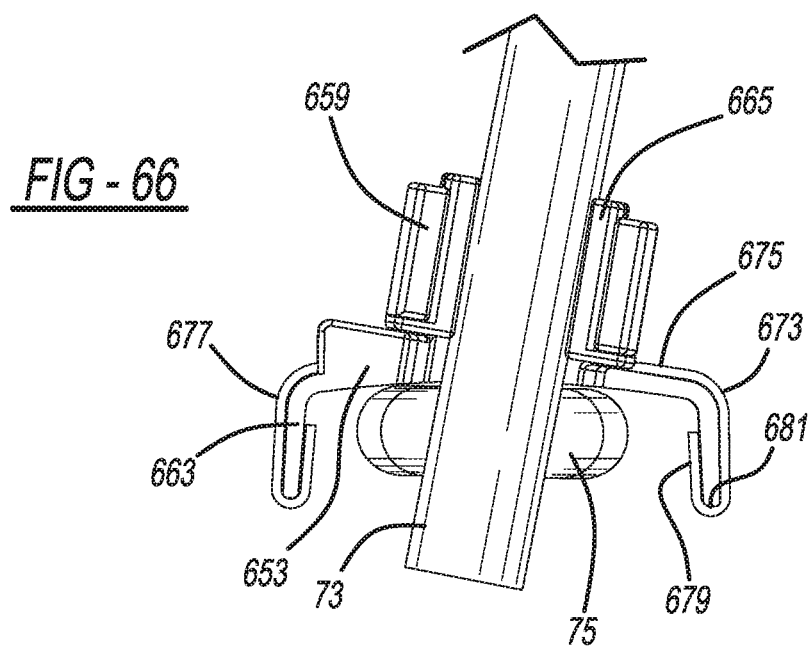
FIG. 66 is a side elevational view showing the FIG. 60 embodiment expandable step employed with the ladder apparatus.

FIG. 51 illustrates an embodiment where a pair of extension handles 425 are attached to one supplemental rail 371 in a removable manner for stowage. A leaf spring biased pin assembly 427 is optionally located on a more narrowly tapered coupling end 429 of each extension handle section 425 for receipt into a corresponding aperture in a side wall of the uppermost rail 371 and, for the multiple extension handle version shown, also on upper segment 431 of the lower of the extension handles 425. This sectional multi-handle construction can optionally be used for each rail, of an existing or supplemental ladder.

Figure 50:
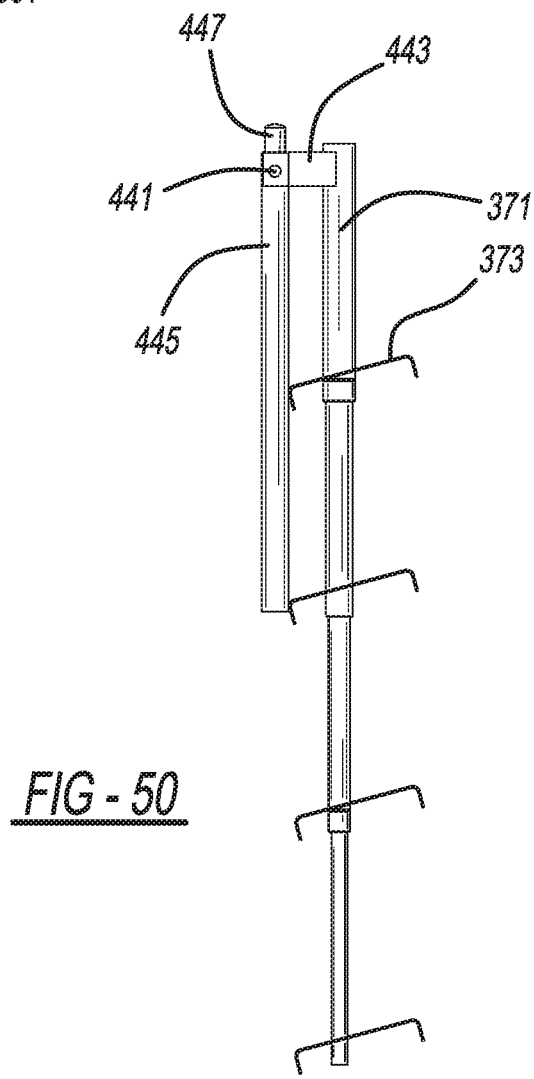
FIG. 50 is a side elevational view showing a fourth embodiment of a telescopic retrofit ladder employed with the ladder apparatus, and an extension handle is shown in a stowed orientation.

FIG. 50 illustrates an embodiment where a pivot pin 441 and associated bracket 443 couple an extension handle 445 to an uppermost supplemental rail 371. FIG. 50 illustrates extension handle 445 disengaged from supplemental rail 371 and rotated to a stowed position elongated offset from but generally parallel to a longitudinal centerline of supplemental rails 371. When installed to a functional position, the boat user manually rotates extension handle 445 to a vertical orientation coaxial with supplemental rail 371 such that a more narrowly tapered coupling end 447 is inserted into an open upper end of supplemental rail 371. Again, this pivoting extension handle construction can be optionally used on a single rail or both rails, for an existing ladder or supplemental ladder.

Another alternate embodiment retrofit supplemental ladder 501 is shown in FIGS. 47 and 48. In this embodiment, upwardly extending supplemental rails 503 are of a fixed and not telescopic nature and have multiple horizontally extending steps 505 spanning therebetween. Each rail 503 and step 505 preferably has a rectangular cross-sectional shape; however, alternate shapes may be employed. A pair of laterally spaced apart hooks 507 are pre-assembled to their corresponding supplemental rails 503 by welding, rivets or screws, adjacent an uppermost step 505. These hooks 507 removably engage to outboard areas of uppermost original step 363 of existing boat-mounted ladder 353. Additionally, side guides 511 project inboard from supplemental rails 503 for alignment with and contacting against lateral edges of the preexisting ladder rails.

A removable standoff 521 is provided to space retrofit supplemental ladder 501 away from boat hull 63. Standoff 521 can optionally position supplemental rails 503 to an outwardly angled orientation of at least 15° off of vertical, and more preferably at least 30° off of vertical with hooks 507 adjacent an apex of the angle. This advantageously allows supplemental ladder 501 to function as outwardly extending stairs with each lower step 505 more outwardly accessible than those above. Standoff 521 includes an inner shaft 523 and an outer shaft 525 within which the inner shaft slides. An adjustment bolt 527 and wing nut 529, cotter pin or other removable fastener, is inserted into aligned holes 531 of shafts 523 and 525 such that the inboard-outboard length of standoff 521 can be expandably adjusted or collapsed for stowage. In the FIG. 47 version, a generally U-shaped clevis 533 removably couples an outboard end of standoff 521 to a corresponding step 505 while an enlarged foot 535 rests against the boat hull.

FIG. 48 shows retrofit supplemental ladder 501 with its hooks 507 engaging existing step 363 of existing boat-mounted ladder 353. FIG. 48 also illustrates a pivotal connection 541 for one or more standoffs 521 to one or both supplemental rails 503. A tiltable foot is pivotally coupled to a corresponding shaft and rests against boat hull 63.

Figure 49:
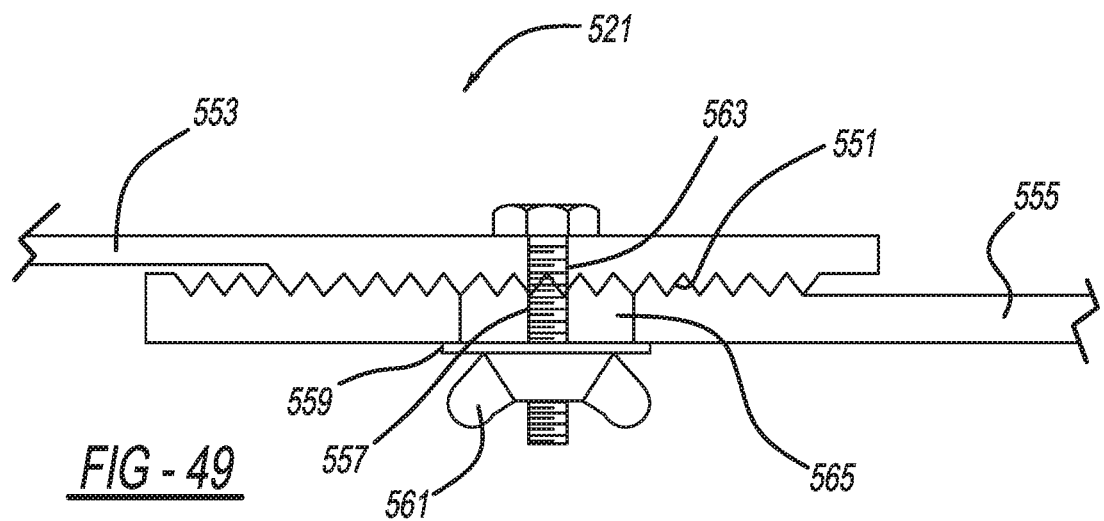
FIG. 49 is a diagrammatic top view showing an adjustable connection for a standoff employed with any of the ladders of the ladder apparatus.

FIG. 49 shows serrated teeth or projections 551 between an outboard shaft 553 and inboard shaft 555 of an alternate variation of standoff 521. Shafts 553 and 555 sit side-by-side of each other rather than the telescopic prior embodiments discussed hereinabove. An adjustable fastener including a bolt 557, washer 559 and wing nut 561, project through a hole 563 in shaft 553 and in an oversized elongated slot 565 of shaft 555. This allows for inboard-outboard length adjustability of standoff 521 for use with any of the preceding preexisting or supplemental ladder embodiments disclosed hereinabove.

Another embodiment ladder apparatus 651 can be observed in FIGS. 56-59. Pre-existing original boat-mounted ladder 353 includes pairs of generally vertical elongated telescoping rails 357 which are joined by original steps 363. A retrofit extension rail or handle 653 includes a tubular upper section 655 and a tubular lower section 657 which are both longitudinally elongated in generally vertical directions somewhat parallel to each other. An offset angled or stepped middle section 659 connects the upper and lower sections. Extension rail 653 is preferably metal such as aluminum or stainless steel.

Multiple pairs of stamped sheet metal hook-like attachments 681 are secured to lower section 657 in a laterally and longitudinally spaced apart manner, such as by welding or riveting. It is alternately envisioned that only two longitudinally spaced hooks, rather than the four shown, may be employed although the hooks may need to be wider to provide the desired stability. At least one of the hooks 681' has a longer projecting distal end 683 so as to make alignment and engagement with the pre-existing steps 363 easier. An inner and general C-shaped edge 685 of an upper hook, or all the hooks, may optionally be tapered with a widest dimension closest to the openly accessible distal ends. The hooks fit over the pre-existing steps either with both pairs adjacent an internal side of one rail assembly (e.g., the right rails as illustrated in FIG. 56) or each pair of hooks may straddle one rail assembly as illustrated in FIG. 57. In the straddling configuration, one upper hook and one lower hook are on one lateral side of the rail assembly while the other upper hook and the other lower hook are on the opposite lateral side of the same rail assembly. The double pairs of hooks allow for retrofit mounting of the extension handle on either the right or left pre-existing rails.

While the preferred extension handle 653 has a three-dimensional lateral and outboard diagonal offset, this hook construction may alternately be employed with a straight and coaxial upper and lower section arrangement. Furthermore, the removable hook attachments can be employed with a non-telescopic pre-existing ladder. Moreover, the extension handle and hooks can alternately be manufactured from polymeric, fiberglass or other materials. Internal and/or external foam may be provided in the tubular sections for floatation.

Another expandable and retrofit step assembly 651 of the present ladder apparatus can be observed in FIGS. 60-66. Expandable step 651 includes a pair of outer or end sub-steps 653 having an integrally formed and single piece end section 655. An inner surface of each outer sub-step 653 defines a substantially circular or C-shaped and outwardly opening recess 657 within a generally semi-cylindrical upstanding collar 659. Outer sub-step 653 has a generally downwardly opening U-shape defined by a primarily horizontally elongated upper wall 661 and generally vertically extending front and back walls 663 projecting from edges thereof. Optionally, elongated reinforcement ribs may also project from an underside of upper wall 661 if additional stiffening is desired.

A substantially C-shaped grommet 665, molded from an elastomeric material, is press-fit within recess 657 of each collar 659 for engagement around the associated tubular rail 73 of the boat or recreational vehicle-mounted ladder. Grommet 665 has barb-like hooks 671 facing each other adjacent the opening thereof which are resiliently compressible to snap-fit about rail 73 when pushed therepast during tool-free and fastener-free installation or removal. Different interior diameter grommets 665 may be provided as a kit with the expandable step such that the user can select the grommet size most appropriate to snuggly fit around the diameter of the pre-existing ladder rail 73.

A central sub-step 673 has a generally U-shape with a downwardly facing opening defined by an upper wall 675 of a generally horizontally and laterally elongated configuration with generally vertically extending walls 677 projecting from forward and backward edges thereof. Upturned flanges 679 project from bottom edges of walls 677 and define a laterally elongated channel 681 therein. Central sub-step 673 serves as a structural reinforcement upon which an elastomeric and generally U-shaped tread 691 is attached, such as by an adhesive, rivets or the like. Central step 673 is preferably extruded or stamped from a sheet of aluminum, although other rigid and lightweight materials may alternately be employed.

The inboard end portions of outer sub-steps 653 slideably engage within central sub-step 673 wherein walls 663 are slideably trapped within channels 681 of central step 673 in a tongue and groove manner. Thus, outer sub-steps 653 may be expanded from the extracted position illustrated in FIG. 62 to the laterally and outwardly expanded position of FIG. 63. The bottom surfaces of outer sub-steps 653 rest on top of original ladder steps 75.

Advantageously, this embodiment can accommodate a variety of original ladder step configurations of different shapes and sizes while providing a larger and more accessible step surface. Furthermore, this embodiment advantageously accommodates different rail-to-rail widths with a rigid and aesthetically pleasing construction. Moreover, this embodiment expandable step minimizes foot-pinching concerns between adjacent multi-height sub-steps.

Figure 67:
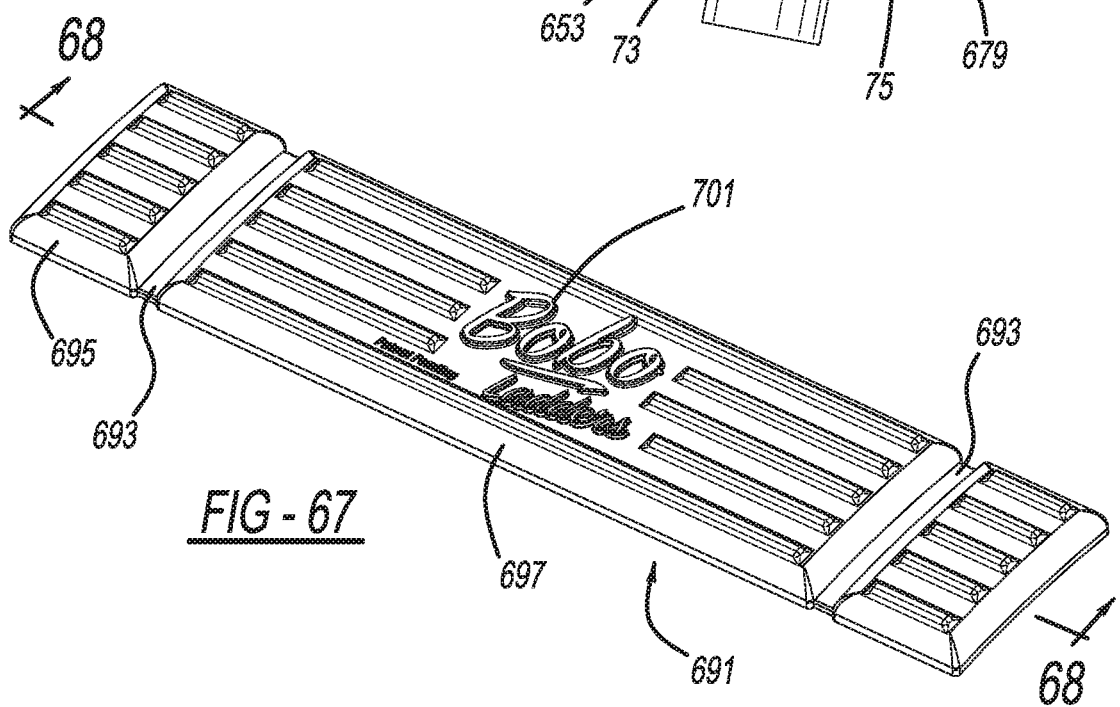
FIG. 67 is a top elevational view showing a tread variation of the FIG. 60 embodiment expandable step employed with the ladder apparatus.
Figure 68:
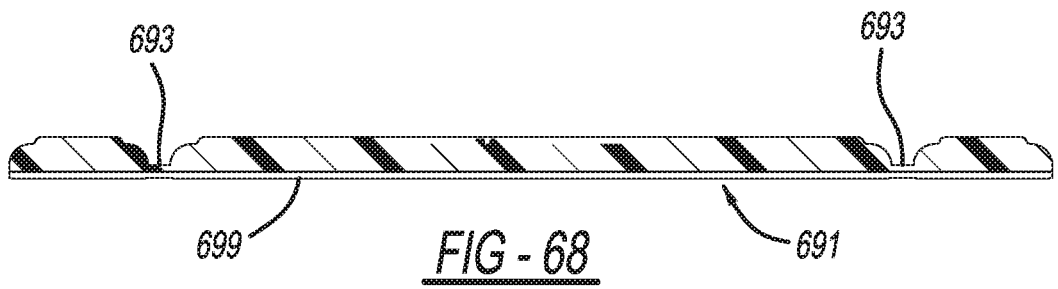
FIG. 68 is a perspective cross-sectional view, taken along lines 68-68 of FIG. 67, showing the tread variation of the FIG. 60 embodiment expandable step employed with the ladder apparatus.
Figure 69:
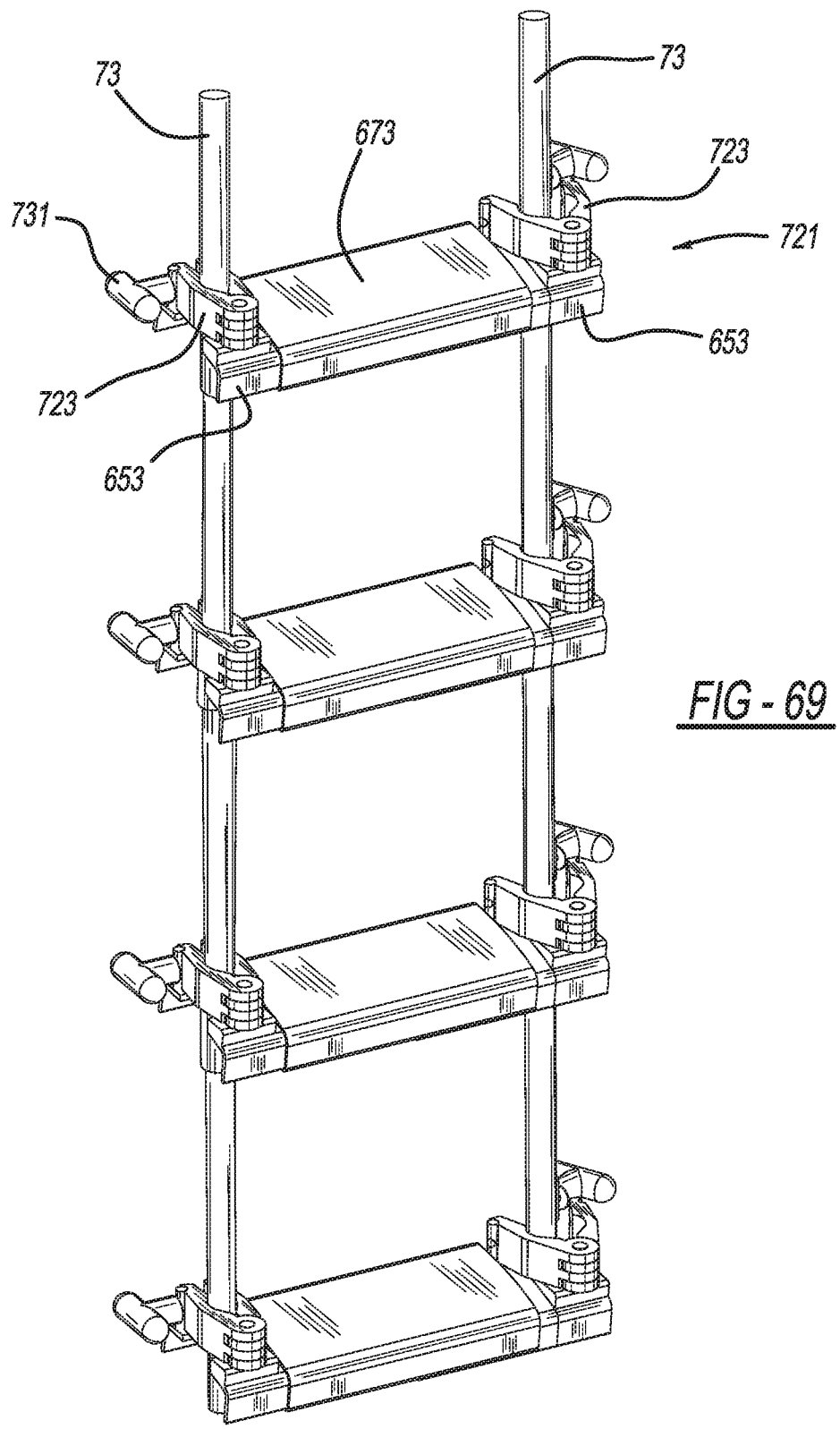
FIG. 69 is a perspective view showing another embodiment expandable step employed with a ladder apparatus, illustrating a left side clamp closed and a right side clamp open.

As can be seen in FIGS. 67 and 68, a planar version of tread 691 is optionally provided in a user kit with one or more fore-and-aft elongated grooves 693 so that the user may sever outboard end sections 695 from a main body section 697 depending upon the desired rail-to-rail length of the expandable step 651. In this version, tread 697 has a flat bottom surface 699 without downwardly projecting front and back walls. Tread 691 of the FIG. 61 configuration may be extrusion molded while the version of the FIG. 67 arrangement may be injection molded to contain a logo 701, text or other patterned indicia thereupon.

Reference should now be made to FIGS. 69-72 for another expandable step embodiment for the ladder apparatus. The present exemplary expandable step 721 includes the interlocking central sub-step 673 and outer sub-steps 653 of the prior embodiment except the present construction employs a different mechanism for removable attachment to the existing boat or recreational vehicle-mounted ladder rails 73. A clamp 723 is pivotably coupled to each outer sub-step 653 through a pivot pin 725 located adjacent to a rearward edge thereof to provide a more rounded appearance and end surface facing the user during use. Each clamp includes a pair of fingers 727 and 729 which each have a curved recess 731 to conform around lateral outside surfaces of existing rail 73.

Figure 70:
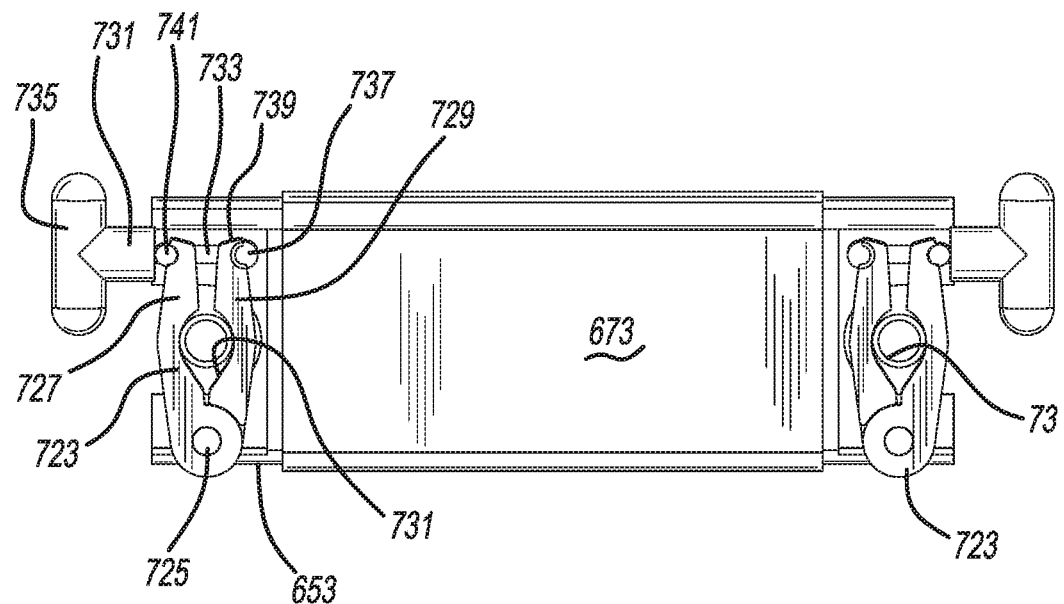
FIG. 70 is a top elevational view showing the FIG. 69 embodiment expandable step employed with the ladder apparatus, illustrating the left side clamp closed and the right side clamp open.
Figure 71:
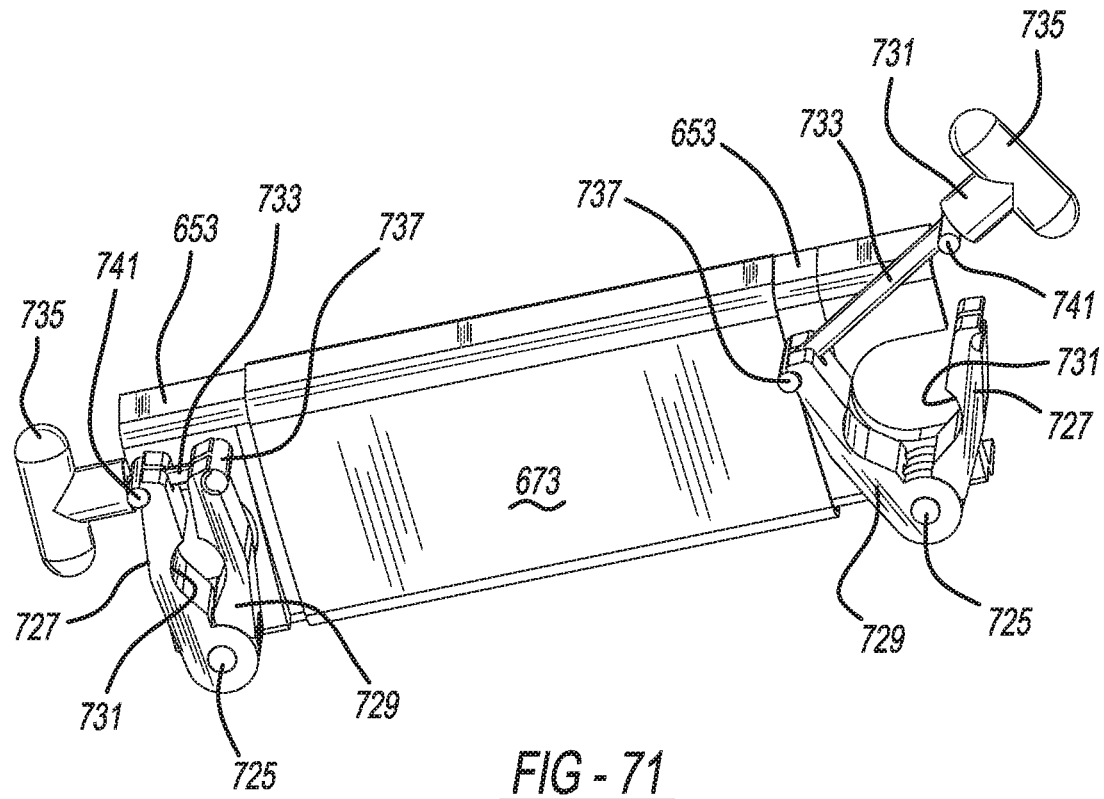
FIG. 71 is a perspective view, taken opposite that of FIG. 69, showing the expandable step embodiment employed with the ladder apparatus, illustrating the left side clamp closed and the right side clamp open.
Figure 72:
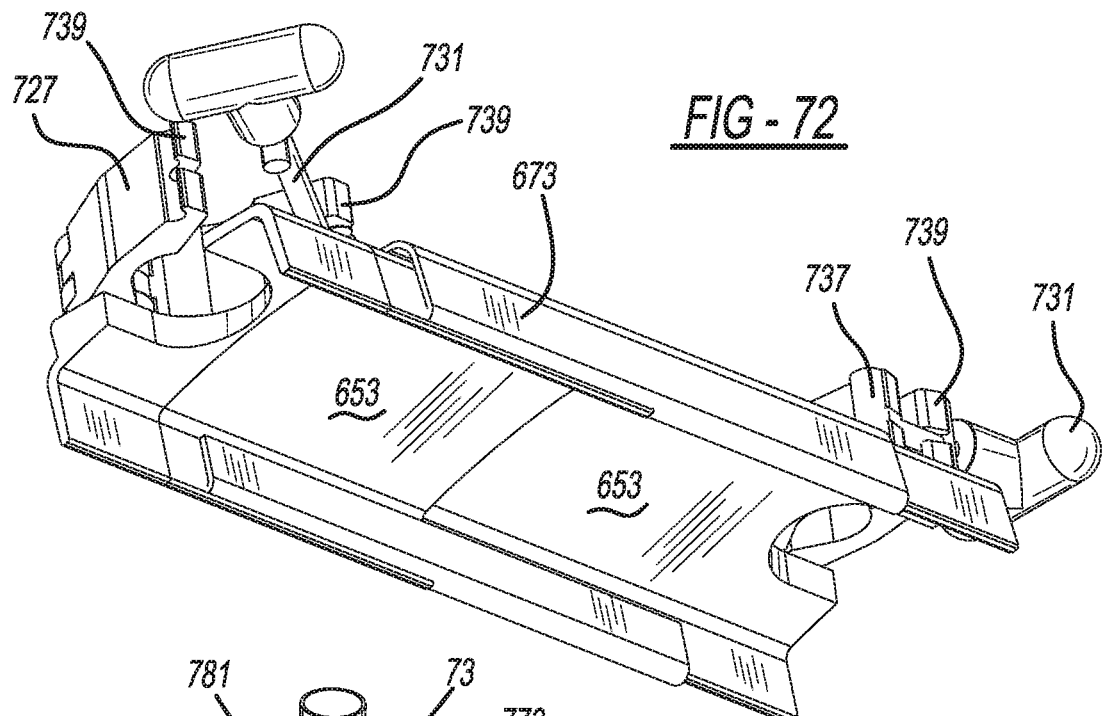
FIG. 72 is bottom perspective view showing the FIG. 69 embodiment expandable step employed with the ladder apparatus, illustrating the left side clamp open and the right side clamp closed.

A clamp lock employs a somewhat T-shaped bolt 731 which has a laterally elongated shaft 733 and a fore-and-aft elongated crossing handle 735. Alternately a different elongated fastener rod with a generally circular knob or loop thereon may be employed. A cylindrical fulcrum head 737 crosses shaft 733 at a distal end and is received within a mating semi-cylindrical groove adjacent a distal end 739 of finger 729. An intermediate cylindrical locking post 741 crosses a middle portion of shaft 733 and removeably engages within a generally semi-cylindrical groove of finger 727. The vertically elongated grooves face away from each other. Thus, T-bolt 731 has its intermediate post 741 disengaged from the groove of finger 727 to allow the user to push open fingers 727 and 729 away from each other about pivot pin 725. This is the position shown in the right hand side of FIG. 71, which allows the user to insert the corresponding ladder rail 73 past spread apart distal ends 739 and into the facing recesses 731 of the clamping fingers. Thereafter, the user pushes together the distal ends of clamping fingers 727 and 729 and rotates T-bolt 731 about its fulcrum head 737 to re-engage intermediate post 741 with the corresponding groove of finger 727 in a locking and fastened manner. This locking and fastened position is illustrated in FIG. 70 and also the left side of FIG. 71. The locking T-bolt and distal ends of the clamping fingers face the boat or recreational vehicles and are advantageously positioned away from the user's feet forward of the ladder rail 73. Each clamp 723 is preferably injection molded from a polymeric material, and the clamp lock may optionally include a flexible tether coupled to the outer sub-step.

Reference should now be made to FIGS. 73-77. Another embodiment expandable step 771 of the present ladder apparatus has an outer and central sliding sub-step configuration like the immediately prior two embodiments. However, with the present exemplary construction, each outer sub-step 773 employs a different end section 775 and an associated clamping finger 777. End section 775 includes a partially circular cavity 779 within which is press fit an elastomeric insert 781 having resiliently compressible barbs 783 facing each other. Cavity 779 and the inserted internal surface of insert 781 correspond with a partially cylindrical recess 785 within an upstanding collar 787 formed in clamping finger 777. Thus, when in the installed and closed position, recess 785 and insert 781 will essentially surround an adjacent section of the generally vertically elongated boat or vehicle-mounted ladder rail 73.

Figure 73:
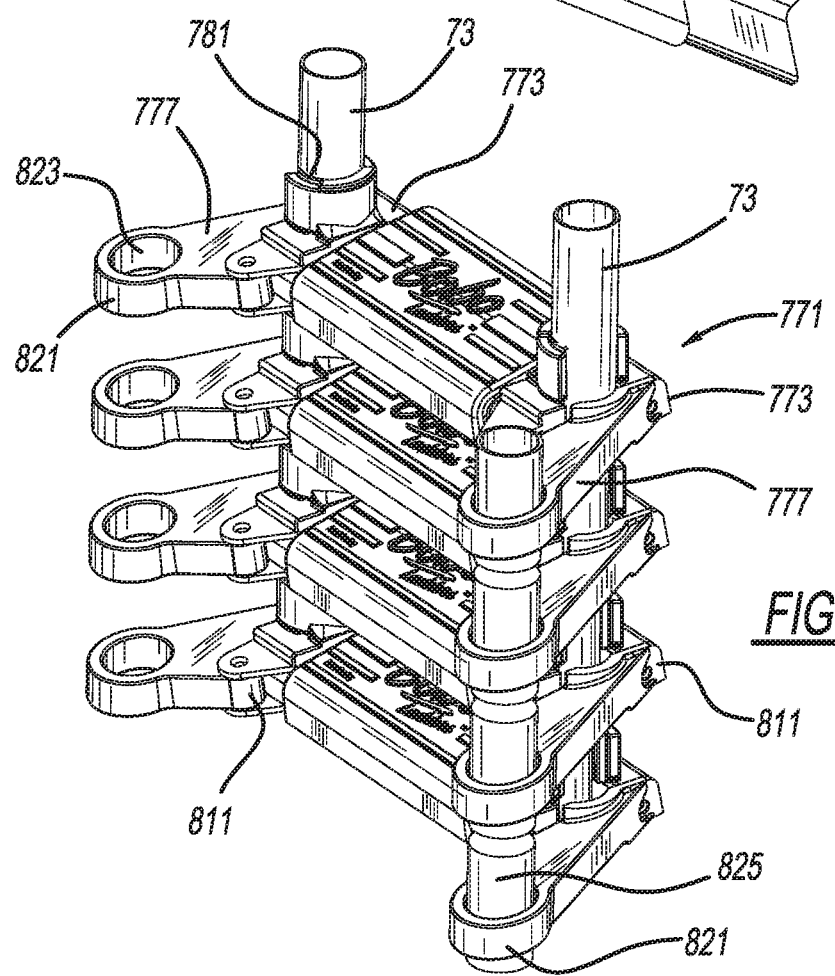
FIG. 73 is a perspective view showing another embodiment of an expandable step employed with a ladder apparatus.
Figure 74:
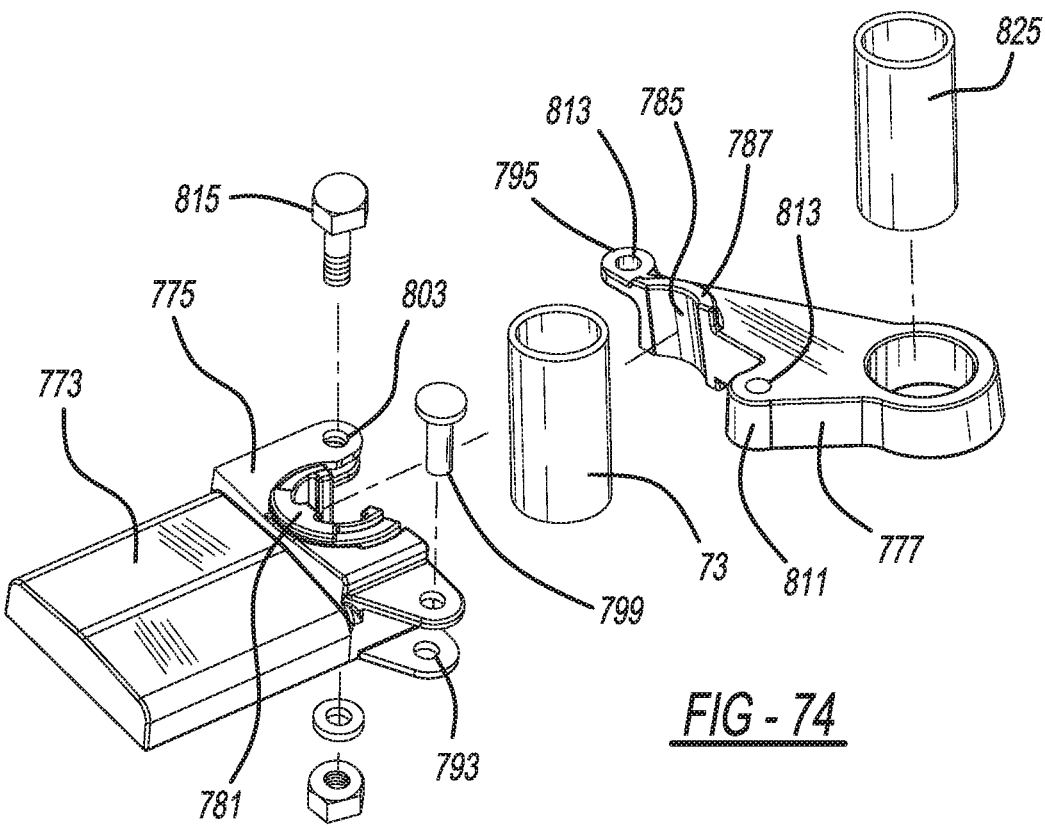
FIG. 74 is a perspective view showing the FIG. 73 embodiment expandable step employed with the ladder apparatus.
Figure 75:
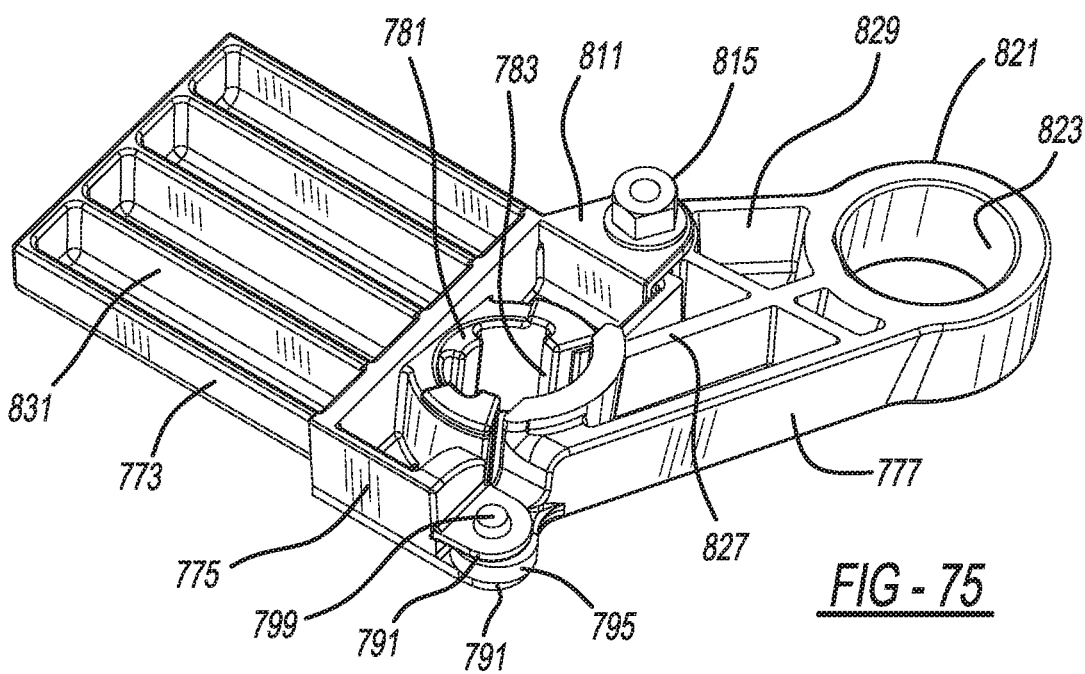
FIG. 75 is a bottom perspective view showing the FIG. 73 embodiment expandable step employed with the ladder apparatus.
Figure 76:
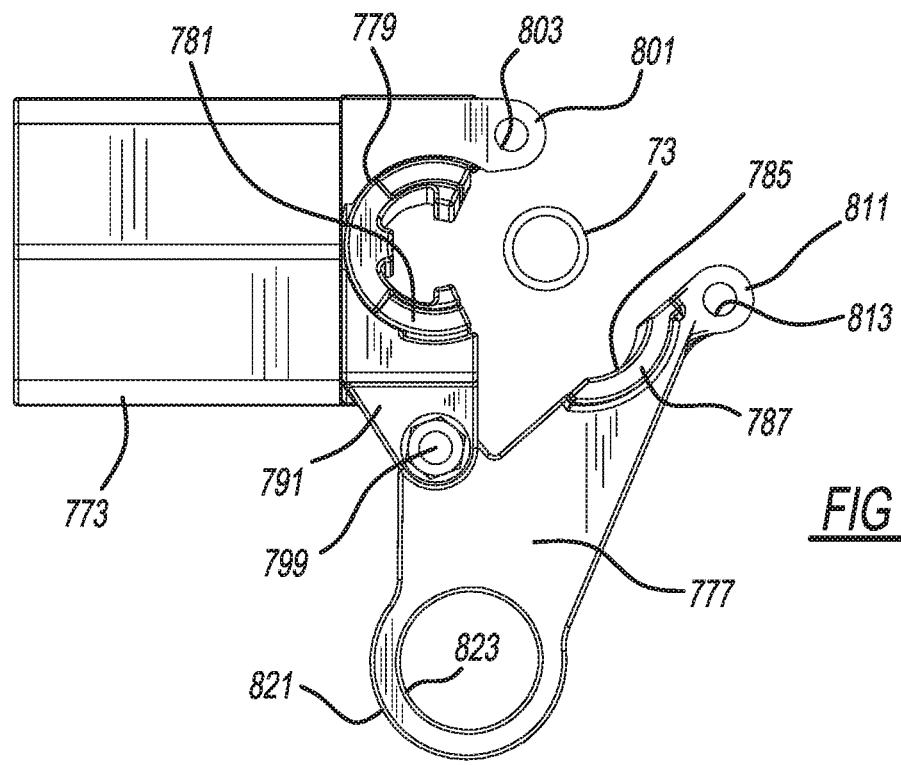
FIG. 76 is a perspective view showing the FIG. 73 embodiment expandable step employed with the ladder apparatus illustrated in an openly pivoted position.
Figure 77:
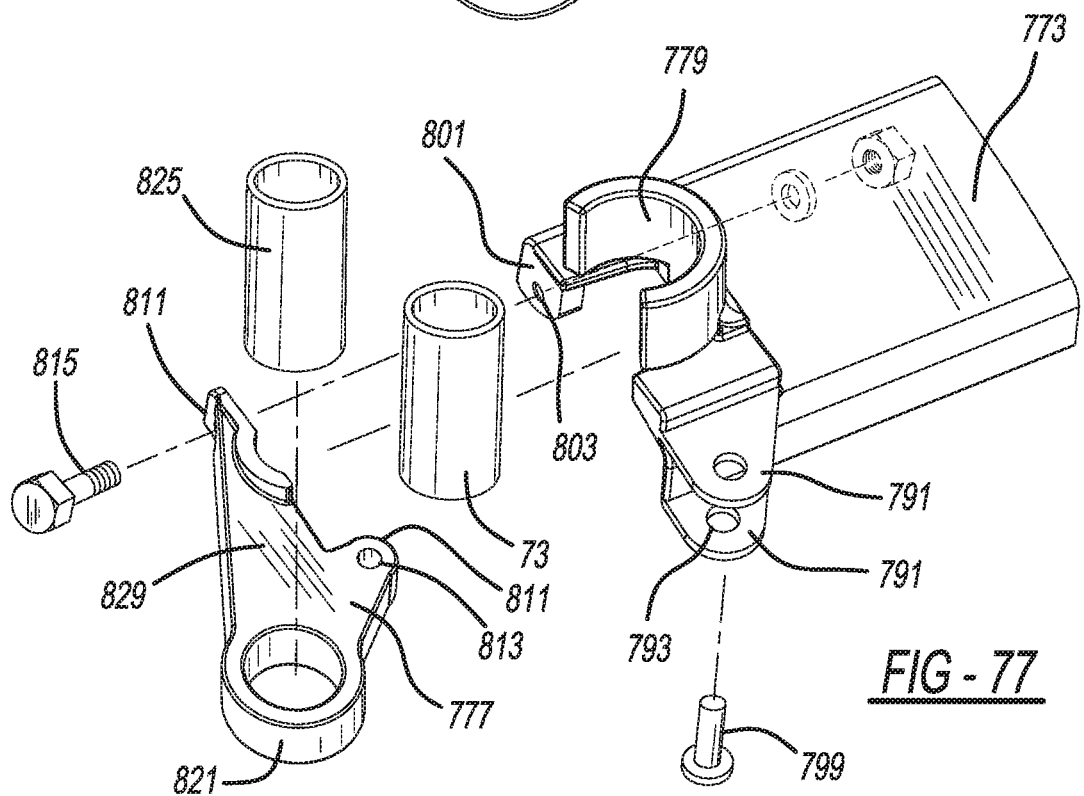
FIG. 77 is a perspective view showing the FIG. 73 embodiment expandable step employed with the ladder apparatus.

At least one, and more preferably a pair, of bifurcated pivot tabs 791 laterally and generally horizontally project from an outboard wall of end section 775 and have coaxially aligned holes 793 therethrough. One or more flanges 795 generally horizontally projecting from an exterior of clamping finger 777 have an internal hole 797 therethrough which is positioned between hole 793. A rivet or shoulder bolt and nut fastener 799 couple together tabs 791 and flange 795 through their corresponding holes to allow the user to rotate clamping finger 777 along a generally horizontal plane about the vertical fastener axis between a closed installation position (as shown in FIGS. 73 and 75) to an open position (see FIG. 76) to allow the expandable step to be installed or removed from the existing ladder.

One or more locking tabs 801, with correspondingly aligned holes 803, project from a side of cavity 779 opposite that of pivot tabs 791. These locking tabs 801 are shown in a generally horizontally extending configuration in FIGS. 74-76 and in a generally vertically extending configuration in FIG. 77. One or more fastening flanges 811 project from a wall of clamping finger 777 and have a hole 813 therein. A shoulder bolt, having a head and threaded shaft with a washer and nut, cotter pin or other removable fastener 815, extends through holes 803 and 813 so the user can secure the openable end of clamping finger 777 in the closed and clamping position.

Additionally, clamping finger 777 includes an annular projection 821 with a circular hole 823 therethrough which engages around an adjacent portion of a supplemental and generally vertically elongated handle 825. A pin or snuggly fitting insert may secure a lower end of handle 825 to a bottom one of the steps; however, clearance is provided between the other holes 823 and the handle to allow sliding therebetween when the steps are telescopically collapsed for storage. Crossing ribs 827 are injection molded into a bottom side of a gusset section 829 of clamping finger 777. Furthermore, side to side and laterally elongated ribs 831 are preferably injection molded into a bottom side of sub-step 773. It should be appreciated that alternate rib configurations and shapes may be employed. Outer sub-step 773 and clamping finger 777 are preferably made from a polymeric material but may alternately be cast or machined from a metallic material.

Figure 78:
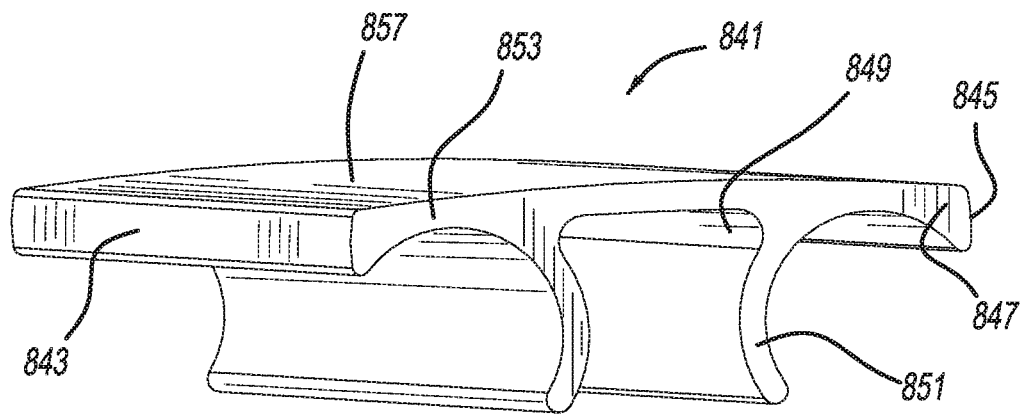
FIG. 78 is a perspective view showing another embodiment of a snap-on step employed with a ladder apparatus.
Figure 79:
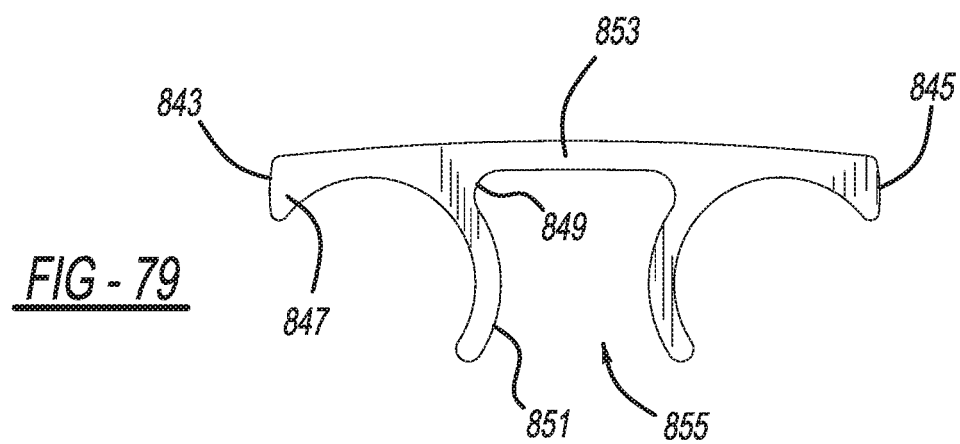
FIG. 79 is an end-elevational view showing the FIG. 78 embodiment step employed with the ladder apparatus.
Figure 80:
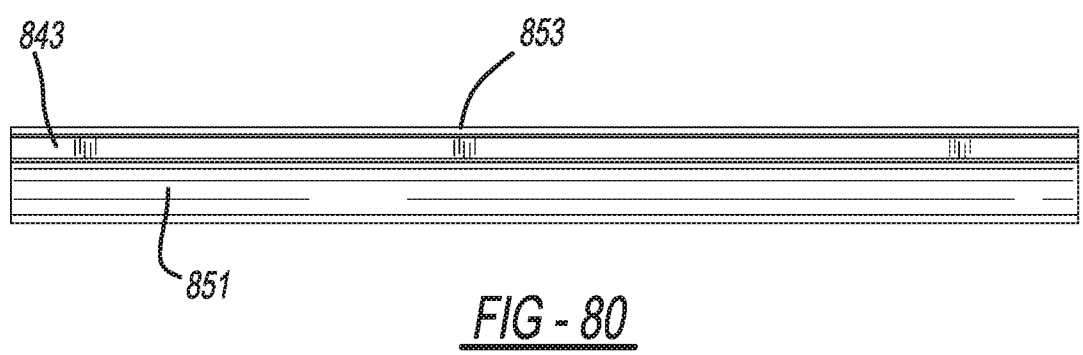
FIG. 80 is a rear elevational view showing the FIG. 78 embodiment step employed with the ladder apparatus.

Another embodiment of a step 841 employed with the ladder apparatus is illustrated in FIGS. 78-80. This exemplary embodiment step 841 is essentially the same as the FIG. 15-19 construction except that the present one has more vertically oriented front and rear edges 843 and 845, respectively, albeit with a slight curve. Furthermore, projections 847 are slightly shorter in the vertical direction than are those of the prior embodiment. Additionally, an intersection 849 between intermediate arcuate projection 851 and an underside of a tread wall 853, within a centrally elongated cavity 855, employs a larger radius than with the prior embodiment. This tread or step is preferably extruded, or alternately injection molded, from rigid polyvinyl chloride. Elongated grooves, a knurl pattern, logos or other foot-gripping surfaces may be employed upon an upper surface 857 of step 841.

FIGS. 81-102 show another embodiment of a supplemental extension handle 901 for the present ladder apparatus 903. Extension handle 901 is an elongated and hollow tube with a capped or otherwise closed, upper and free distal end 905. A lower proximal and coupling end 907 is disposed on an opposite end of handle 901. The terms "upper", "lower", "outward" and "rearward" are with reference to the installed usage orientation. A laterally outward bend 909 (as best observed in FIGS. 82 and 87) positions the useable upper portion of handle 901 laterally outboard of the boat or vehicle-mounted ladder rail 73. Furthermore, an intermediately disposed rearward bend 911 (best illustrated in FIGS. 83 and 87) is located between outward bend 909 and distal end 905, and places the useable upper portion of the handle rearwardly spaced from a longitudinal axis (and exterior surface) of existing ladder rail 73. This exemplary embodiment additionally provides a grippable upper segment 913, disposed between rearward bend 911 and distal end 905, in a generally laterally straight and vertical orientation yet in a rearwardly diagonally angled and straight orientation. This can best be observed in FIGS. 82 and 83. Finally, a curved and somewhat hook-like segment 915 is located between segment 913 and distal end 905, and projects in both laterally outboard and rearward directions with distal end 905 being somewhat downwardly, rearwardly and outboardly facing. It should be appreciated that alternately shaped extension handles may only have the rearward and outward bends without the additional direction changes although some of the desired functional advantages may not be fully realized.

Foam may optionally be placed inside handle 901 and/or a cylindrical foam collar 921 may be press-fit about an outside portion of handle 901, preferably adjacent proximal coupling end 907. This allows flotation in water. Handle 901 is preferably extruded then bent, or hydro-formed stainless steel, but may alternately be aluminum or a rigid polymeric material.

The present embodiment extension handle 901 includes a coupling extension socket 923. A first version of socket 923 is illustrated in FIGS. 86 and 89-91. This version employs a hollow head 925 defined by a straight multi-grooved section 927 and a circularly extending flange 929. Head 925 is press-fit and then either raised, MIG-welded, crimped or adhesively bonded inside of proximal coupling end 907 of handle 901.

Furthermore, a shaft 931 of socket 923 longitudinally projects from head 925. Shaft 931 has a bifurcated shape defining a longitudinally elongated slot 933 open to a distal end 935 thereof. Tapered internal and external surfaces 937 are also provided on the distal end of shaft 931. Moreover, an exterior of shaft 931 has a generally cylindrical shape.

FIG. 92 shows another embodiment extension handle of the present ladder apparatus. This construction is essentially the same as that shown in the FIG. 86 configuration, however, an alignment guide 951 has an upper section 953 affixed to an exterior of proximal coupling end 907 of extension handle 901 such as by welding, adhesive bonding, rivets, screws or the like. A lower section 955 of guide 951 longitudinally projects beyond the distal end of socket shaft 931 for initial insertion into the mating rail or bracket component. Moreover, an intermediate section 957 is laterally spaced away from the adjacent external surface of shaft 931 of the socket to allow the mating component wall to be slid therebetween. An interior surface of guide 951 has a partially cylindrical cross-section shape. Guide 951 assists in the user aligning and guiding insertion of the extension handle into the mating component, and may have a rounded or taper leading end 959 to assist in this regard.

FIGS. 93-96 illustrate another embodiment of a socket 941 employed with extension handle 901 and the ladder apparatus of the FIGS. 81-88 embodiment. However, the present socket 941 employs a differently shaped and solid shaft 943. Shaft 943 projects from a generally cylindrical head 945 having a knurled section 947 and a circularly projecting flange 949. Shaft 943 is longitudinally elongated with a pair of oppositely facing external surfaces 951 with a partially cylindrical shape on each. Furthermore, a pair of oppositely facing elongated flat surfaces 953 each span between the partially spherical surfaces 951. A tapered leading end 955 is also provided to ease insertion into the mating component. This version of shaft 951 is ideally suited for insertion into an upper end of an existing ladder rail which employs flat head screws for the ladder pivot 79 (see FIG. 81). This socket is preferably machined or cast from stainless steel.

Another embodiment socket 961 can be observed in FIGS. 97-100. This embodiment socket employs a hollow head 963 having a generally cylindrical external surface and a circularly projecting circumferential flange 965. A shaft 967 has a longitudinally elongated external surface with a generally cylindrical shape. This external surface, however, is interrupted by a pair of oppositely facing and longitudinally elongated grooves or partial-slots 969 which have a solid center wall 971 therebetween defining a somewhat H-shape when viewed from its leading end 973. A taper 975 is internally disposed within each slot 969 to assist in socket insertion into the coupling member, however, leading end 973 preferably has a flat end face. It is envisioned however that the end face may have a curved or otherwise tapered shape, although some of the advantages may not be fully achieved. Socket 961 is preferably machined or cast from stainless steel and is ideally suited for attachment within a smaller tube diameter for the extension handle, while the shaft shape maintains the strength at smaller diameters. The slots prevent rotation and allow the socket to fit over cap screws employed with the coupling member, such as with the existing ladder rail 73.

FIGS. 101 and 102 illustrate another exemplary embodiment of an extension handle 981 employed with the present ladder apparatus. Handle 981 may be of any of the embodiments discussed herein and is preferably a hollow metallic tube. A hollow tubular reinforcement insert 983 is positioned in a press-fit, adhesively bonded, braised, welded or riveted manner inside a proximal coupling end 985 of handle 981. Reinforcement insert 987 has a longitudinally elongated throughslot 987 pierced or cut therein which is openly accessible toward its leading end 985 prior to its insertion within handle 981. After they are attached together, proximal coupling end 985 of handle 981 and the adjacent portion of reinforcement insert 983 are stamped or hydro-formed to have oppositely facing external flats 989 bordered by generally partially-cylindrical external surfaces 991. This allows for alignment to the coupled member when inserted without the need for a separately inserted socket.

Returning to FIGS. 81-85, one or more coupling brackets 1001 are attached to one or both existing ladder rails 73 for removeably attaching any of the preceding extension handles thereto. Bracket 1001 includes a mount 1003 having a generally cylindrical and tubular shape moveably surrounding a portion of rail 73. The bottom portion of mount 1003 has a first openly accessible detent or recess 1005 and an offset second detent or recess 1007 of a different height. Bracket 1001 additionally includes a receptacle 1009 also having a tubular and longitudinally elongated generally cylindrical shape. Receptacle 1009 is coupled to mount 1003 by one or more structural plates 1011. Longitudinal axes extending through a center of mount 1003 and receptacle 1009 are generally parallel to each other and also generally vertical when in use. Moreover, a laterally and generally horizontal pin or rod 1013 is affixed to span within the opening of receptacle 1009.

Figure 81:
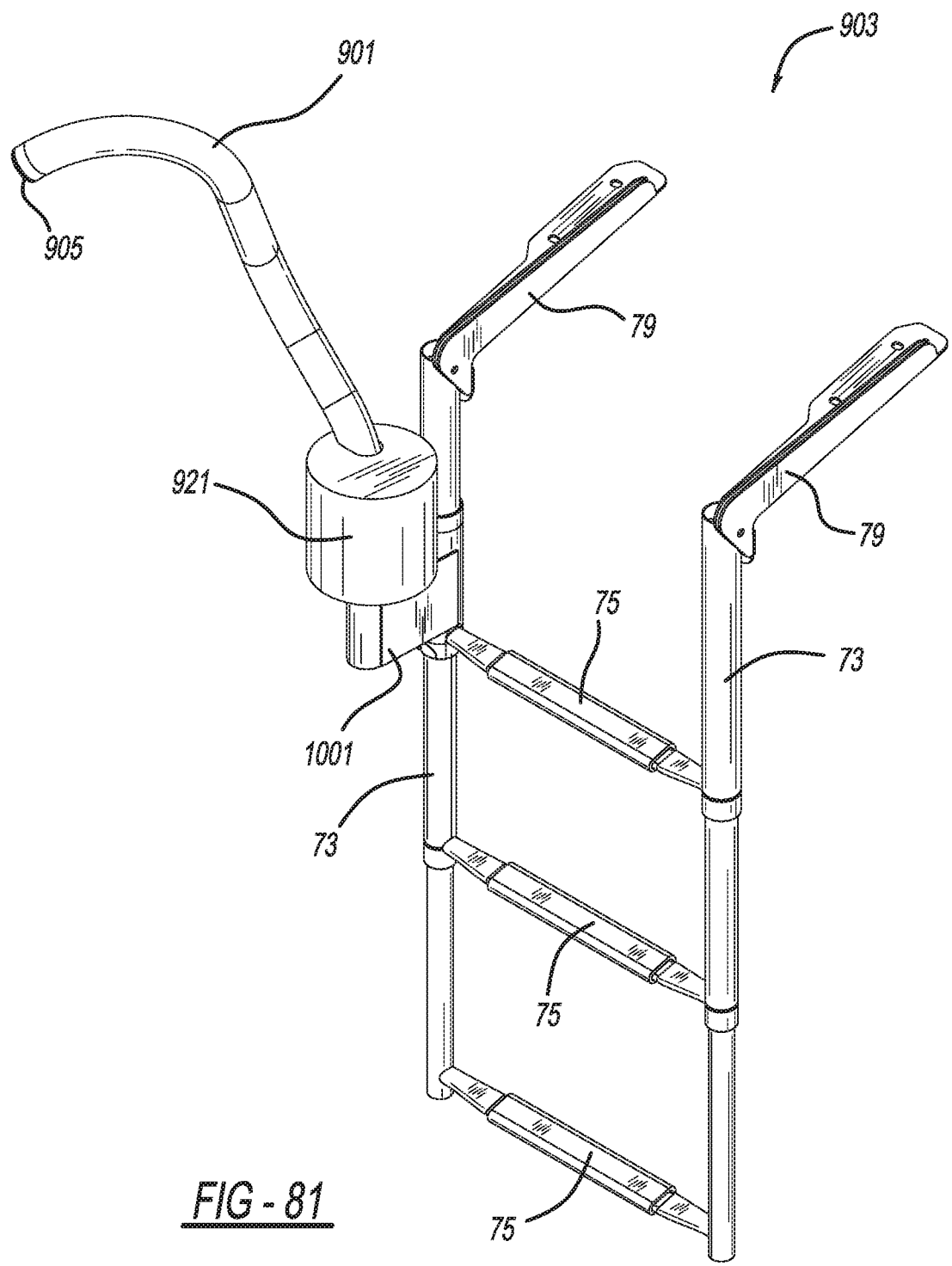
FIG. 81 is a perspective view showing another embodiment extension handle employed with a ladder apparatus.
Figure 84:
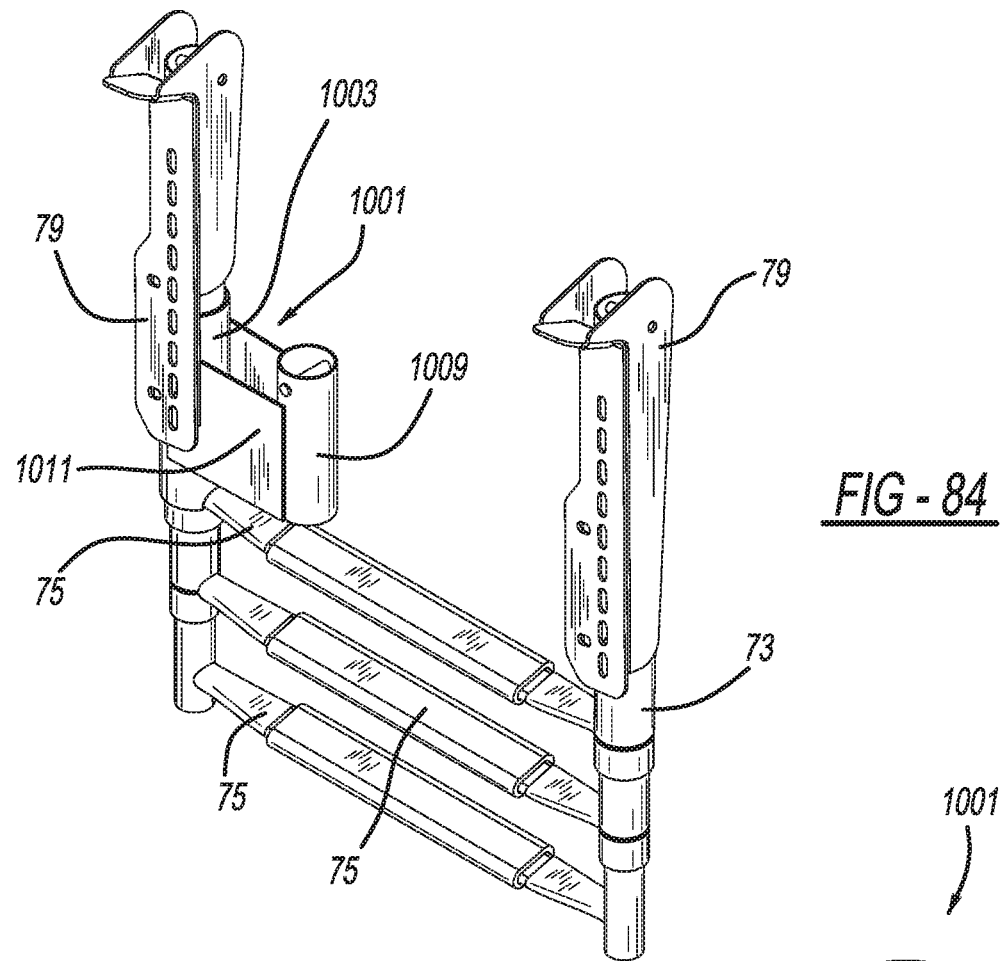
FIG. 84 is a perspective view showing the FIG. 81 embodiment extension handle employed with the ladder apparatus, illustrating the handle removed and a receptacle bracket in a stowed position.
Figure 85:
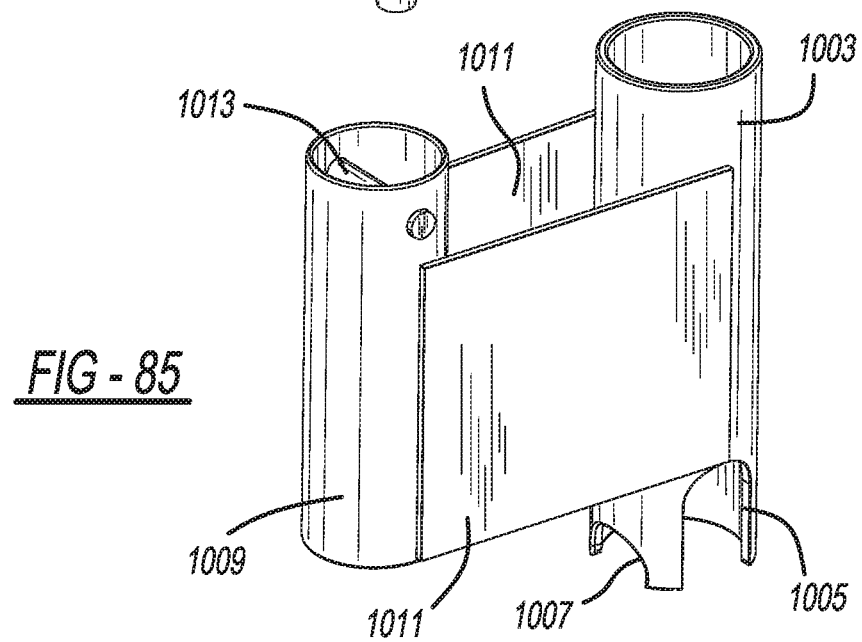
FIG. 85 is a perspective view showing the receptacle bracket used with the FIG. 81 embodiment extension handle employed with the ladder apparatus.
Figure 89:
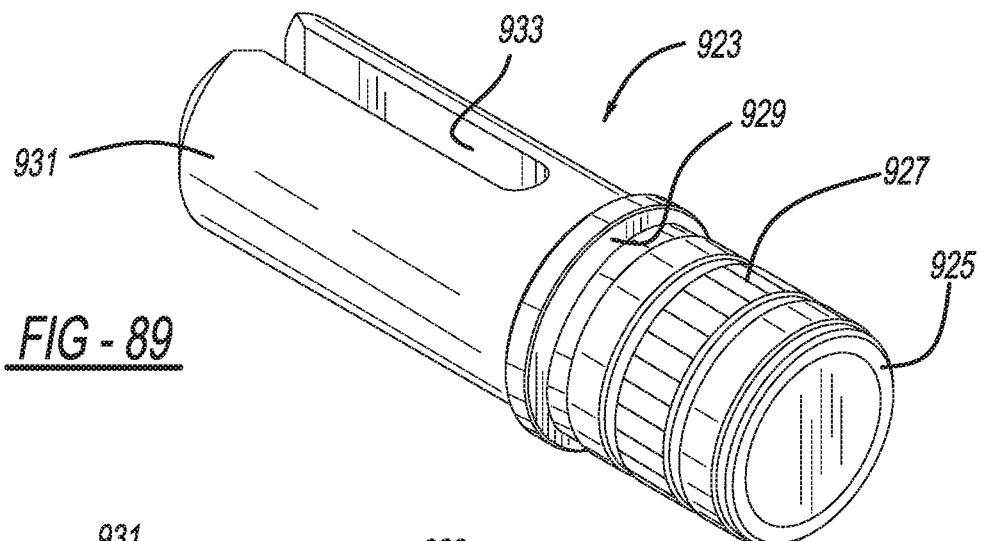
FIG. 89 is a perspective view showing an end socket insert of the FIG. 81 embodiment extension handle employed with the ladder apparatus.
Figure 90:
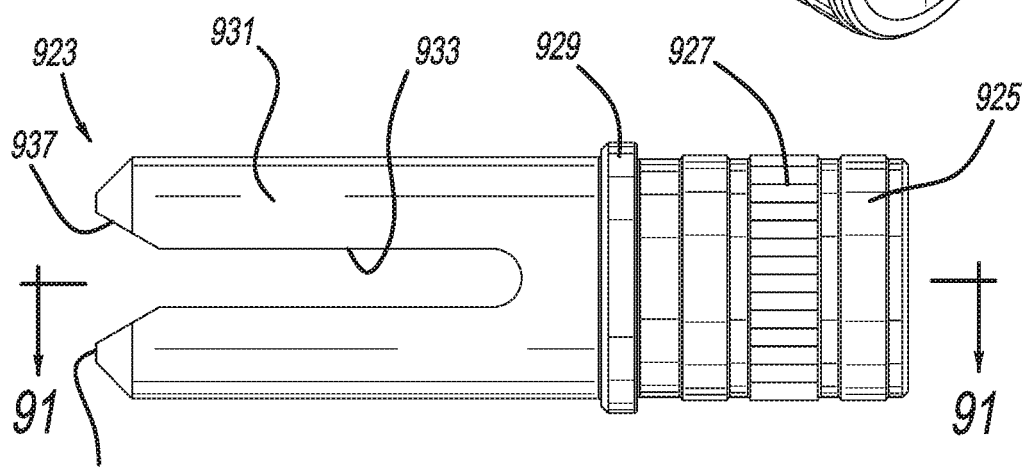
FIG. 90 is a side elevational view showing the end socket insert of the FIG. 81 embodiment extension handle employed with the ladder apparatus.
Figure 91:
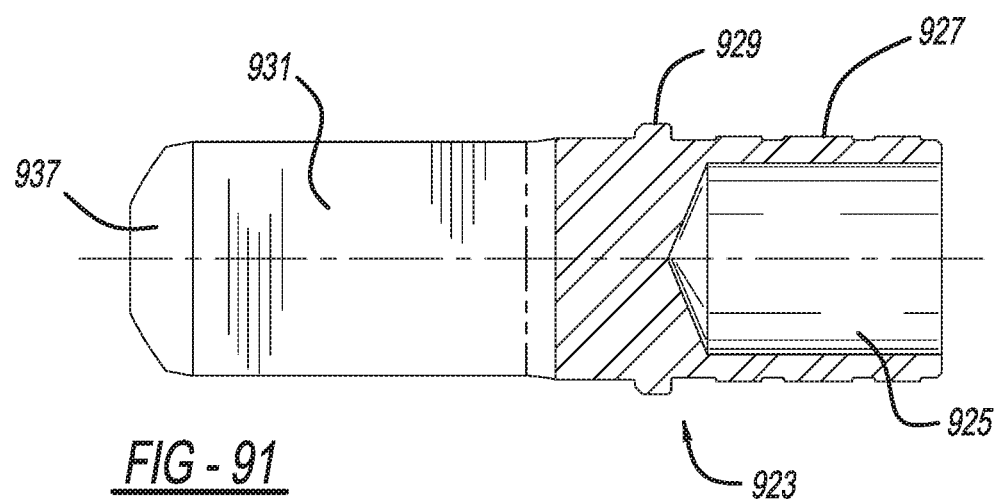
FIG. 91 is a cross-sectional view, taken along line 91-91 of FIG. 90, showing the end socket insert of the FIG. 81 embodiment extension handle employed with the ladder apparatus.

In use, mount 1003 is rotatable about existing rail 73 from a stowed position, as can be observed in FIG. 84, to a functional use position as shown in FIGS. 81 and 83. In the stowed position, receptacle 1009 is generally co-planar with both rails 73 and positioned therebetween, with extension handle 901 removed. In this orientation, second recess 1007 engages with the outboard portion of the adjacent step to deter undesired rotation of the bracket. Pivot brackets 79 can also be collapsed against rails 73 when bracket 1001 is stowed and the ladder is rotated to its stowed position.

In the functional usage position, however, the user slightly upwardly lifts the bracket and then rotates it until receptacle 1009 is rearward of associated rail 73 at which point the deeper recess 1005 engages with step 75 to deter undesired rotation therefrom. Thereafter, the bifurcated and slotted coupling in the extension handle, whether using a socket or integrally slotted, is inserted within receptacle 1009 and for engagement with rod 1013 in a tool-free, fastener-free and removable manner. Bracket 1001 is preferably made from a metallic material.

Figure 103:
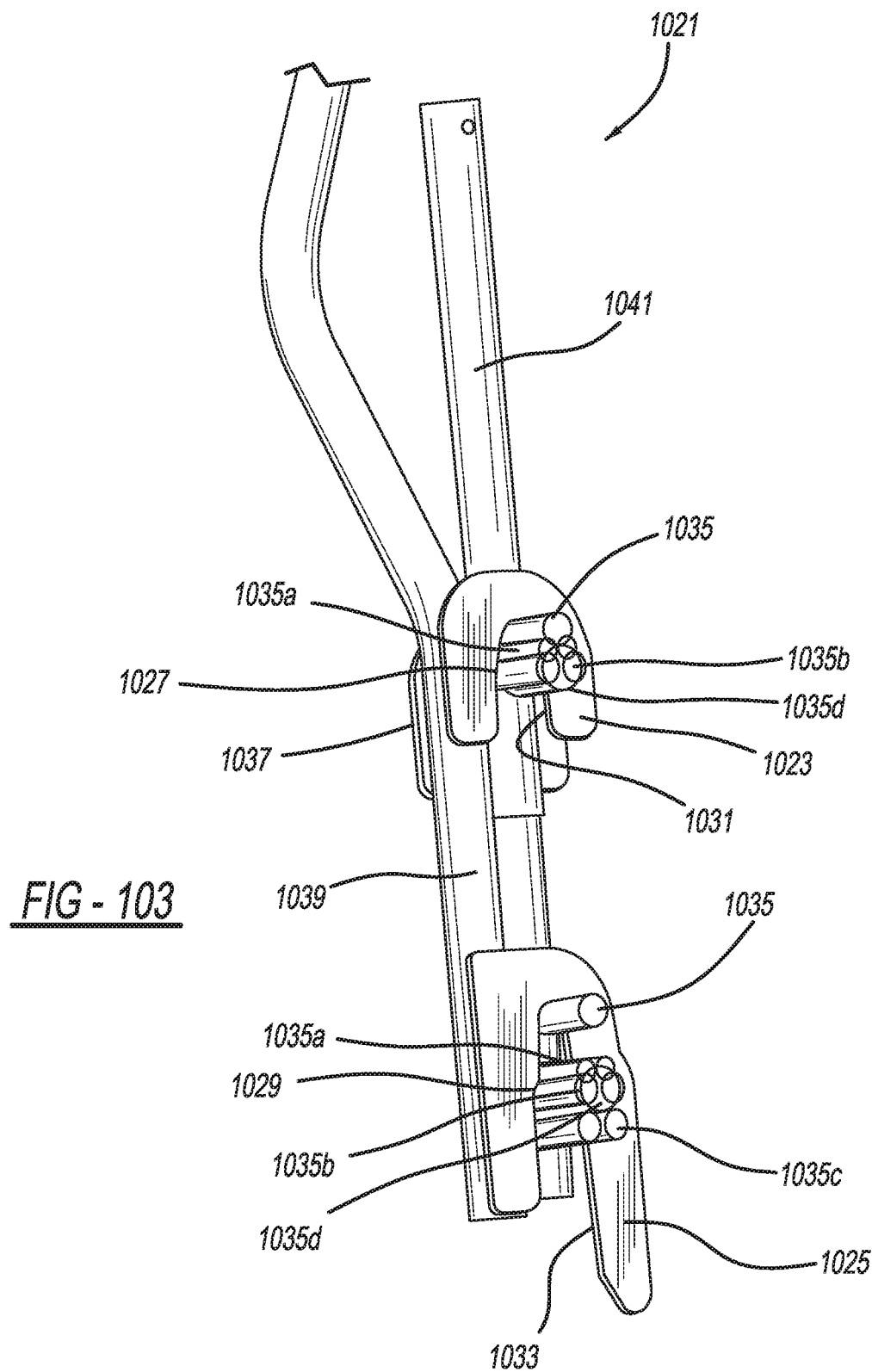
FIG. 103 is a perspective view showing another embodiment of an extension handle employed with a ladder apparatus.

As can be observed in FIGS. 103-105, another embodiment of a retrofit extension handle 1021 of the present ladder apparatus is similar to that of FIGS. 56-59. However, each hook 1023 and 1025 of the present embodiment handle 1021 has an internally offset edge 1027 and 1029 at a middle area of each generally inverted U-shaped slot 1031 and 1033. This offset edge accommodates different sizes, shapes and placement of ladder steps 1035, 1035a, 1035b, 1035c and 1035d. Furthermore, a generally rectangular plate 1037, with rounded corners, is welded to an opposite side of a handle tube 1039 than are hooks 1023 and 1025, thereby trapping a ladder rail 1041 therebetween.

Figure 106:
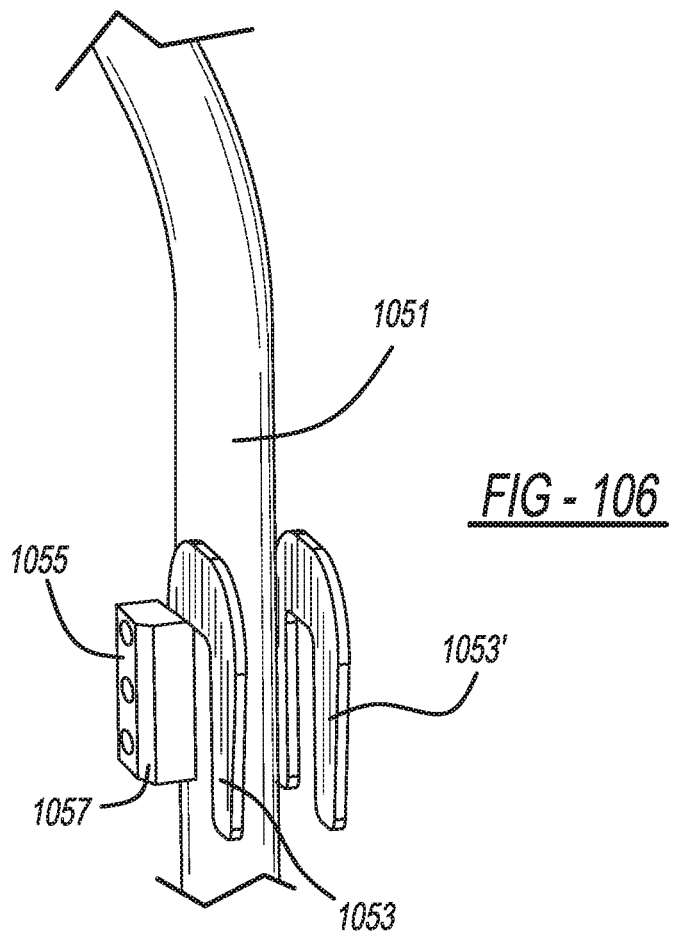
FIG. 106 is a fragmentary perspective view showing another embodiment of an extension handle employed with a ladder apparatus.
Figure 107:
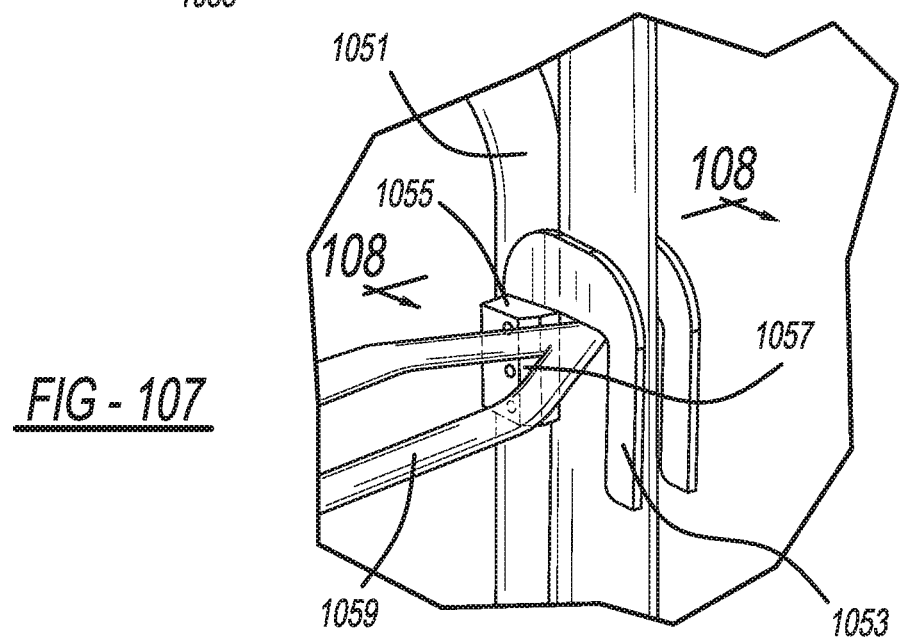
FIG. 107 is a perspective view showing the FIG. 106 embodiment extension handle employed with the ladder apparatus.
Figure 108:
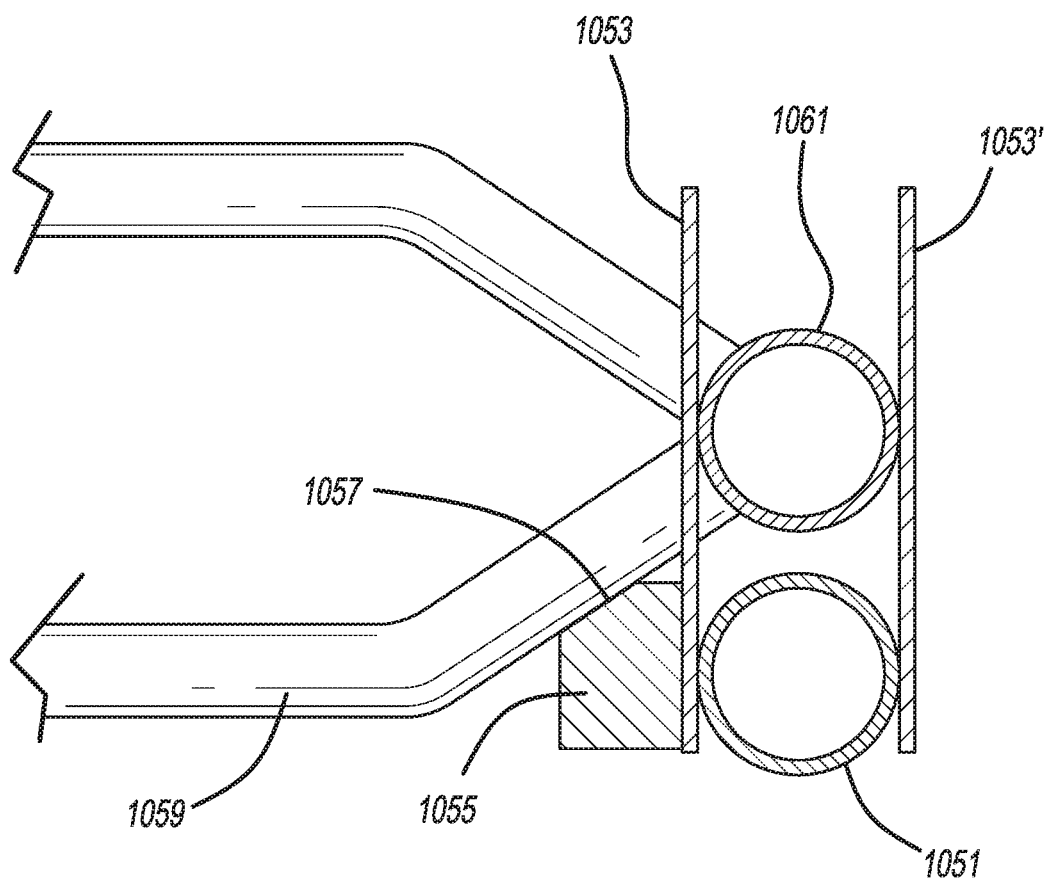
FIG. 108 is a cross-sectional view, taken along line 108-108 of FIG. 107, showing the FIG. 106 embodiment extension handle employed with the ladder apparatus.

Another embodiment retrofit extension handle 1051 can be seen in FIGS. 106-108. Handle 1051 employs hooks 1052 like those shown in FIGS. 56-59 or 103-105. However, the present construction additionally includes a block 1055 having a wedge or taper 1057 on a forward and inboard corner thereof. Taper 1057 serves to tighten the fit between hook 1053 and a step 1059 of a pre-existing ladder 1061 during installation. A vertically elongated and angled wedge or taper may additionally or alternately be provided on the block.

While various embodiments of the present ladder apparatus have been disclosed, other variations may be employed. All of the extension handle, snap-in step, expandable step and retrofit supplemental ladder constructions disclosed herein may be interchanged and mixed and matched with each other. While a stern mounted ladder apparatus has been illustrated, it should also be appreciated that the ladder apparatus can be employed on a side of a boat as well. Moreover, all of the preceding ladder embodiments may be employed with wheeled recreational vehicles in addition to watercraft. It is intended by the following claims to cover these and any other departures from the disclosed embodiments that fall within the true spirit of the invention.

The invention claimed is:

1. A boat or recreational vehicle ladder apparatus comprising:

(a) a ladder including a pair of longitudinally elongated rails with steps spanning between the rails;

(b) an elongated handle;
(c) a bracket comprising:
  a mount located around a section of one of the rails of the ladder;
  a coupling attached to the mount and an end of the handle being configured for removeable insertion into the coupling;
(d) the bracket being pivotable to a handle usable position about a rotational axis of the mount;
(e) the bracket being pivotable to a stowed position;
(f) the mount including a recess which assists in maintaining the bracket in one of the positions;
(g) a rod laterally extending through the coupling of the bracket in a direction substantially perpendicular to an insertion direction of the handle into the coupling, the rod spanning between opposite walls of the coupling when the bracket is in both its handle usable position and its stowed position, and the rod contacting against a longitudinally elongated surface of the handle when the handle is inserted into the coupling; and
(h) the end of the handle including at least one flat exterior face on a lateral side thereof which is insertable into the coupling.

2. The ladder apparatus of claim 1, wherein:
the ladder further including a pivot coupled to each of the rails adjacent upper ends thereof, and the ladder being telescopically collapsible;
the ladder is a boat ladder;
the handle includes a floatation structure;
the coupling of the bracket is located on a plane through the rails of the ladder when the bracket is in the stowed position; and
the bracket is located between an uppermost of the steps and the pivot.

3. The ladder apparatus of claim 1, wherein there are multiples of the recess in a bottom edge of the mount.

4. The ladder apparatus of claim 1, wherein the recess operably engages with one of the steps, and the rod is longitudinally located higher than an uppermost portion of the recess when the handle is inserted into the coupling.

5. The ladder apparatus of claim 1, wherein:
the handle includes outward and rearward bends;
at least a majority of a user-gripping area of the handle is substantially vertically oriented; and
the handle is a boat-ladder extension handle.

6. The ladder apparatus of claim 1, wherein the end of the elongated handle is insertable into an open top of the coupling of the bracket in a direction substantially parallel to a rotational centerline axis through the mount.

7. A boat ladder apparatus comprising:
(a) an elongated handle including a substantially straight lower end segment and an outwardly bent upper end segment, the handle being tubular with a cap at an end thereof;
(b) a mounting bracket adapted to be fastened to a substantially horizontal boat surface;
(c) a boat ladder comprising longitudinally elongated left and right rails with steps spanning between the rails, the rails including at least three telescopic and tubular sections, an uppermost of the rails being pivotably attached to the mounting brackets, and each of the steps including a substantially flat portion and a bent portion;
(d) a ladder rail-mount surrounding an uppermost one of the rails, the ladder rail-mount having a substantially cylindrical internal surface;
(e) a handle-coupling being attached to the ladder rail-mount, the handle-coupling including a pair of walls with a laterally elongated rod spanning between the walls;
(f) the handle being removably insertable into the handle-coupling in a longitudinal direction substantially parallel to the longitudinal orientation of the rails of the ladder; and
(g) a longitudinally elongated and substantially flat surface of the handle contacting against the rod when the handle is located in the handle-coupling, with a portion of the handle adjacent its end being located between the rod and an associated one of the rails.

8. The ladder apparatus of claim 7, wherein the handle-coupling is rotatable relative to the rails of the boat ladder.

9. The ladder apparatus of claim 7, wherein the outwardly bent upper end segment of the handle extend above and outboard of the boat ladder, further comprising multiple recesses located adjacent a bottom edge of the ladder rail-mount.

10. The ladder apparatus of claim 7, wherein a length of the mounting brackets is greater than a distance between an upper end of each of the rails of the ladder and an upper edge of each of the ladder-rail mounts.

11. The ladder apparatus of claim 7, further comprising:
a second elongated handle;
a second ladder rail-mount surrounding the other uppermost of the rails;
a second handle-coupling being attached to the second ladder rail-mount; and
the second handle being removeably insertable into the second handle-coupling.

* * * * *